US010893269B2

(12) United States Patent
Morigami et al.

(10) Patent No.: US 10,893,269 B2
(45) Date of Patent: Jan. 12, 2021

(54) IMAGE PROCESSING DEVICE AND METHOD

(71) Applicant: SONY CORPORATION, Tokyo (JP)

(72) Inventors: Yoshitaka Morigami, Tokyo (JP); Shuo Lu, Tokyo (JP); Takefumi Nagumo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 14 days.

(21) Appl. No.: 16/094,261

(22) PCT Filed: May 25, 2017

(86) PCT No.: PCT/JP2017/019493
§ 371 (c)(1),
(2) Date: Oct. 17, 2018

(87) PCT Pub. No.: WO2017/212930
PCT Pub. Date: Dec. 14, 2017

(65) Prior Publication Data
US 2019/0132590 A1 May 2, 2019

(30) Foreign Application Priority Data

Jun. 8, 2016 (JP) ................................. 2016-114357

(51) Int. Cl.
H04N 19/176 (2014.01)
H04N 19/119 (2014.01)
(Continued)

(52) U.S. Cl.
CPC ......... H04N 19/119 (2014.11); H04N 19/124 (2014.11); H04N 19/136 (2014.11);
(Continued)

(58) Field of Classification Search
CPC .... H04N 19/176; H04N 19/70; H04N 19/159; H04N 19/105; H04N 19/186;
(Continued)

(56) References Cited

U.S. PATENT DOCUMENTS

2003/0174896 A1 9/2003 Ridge
2008/0304569 A1 12/2008 Lee et al.
(Continued)

FOREIGN PATENT DOCUMENTS

JP 2014-090327 A 5/2014
JP 2014-204207 A 10/2014
(Continued)

OTHER PUBLICATIONS

ITU, High efficiency video coding, Series H: Audiovisual and Multimedia Systems Infrastructure of audiovisual services—Coding of moving video, Apr. 2015, pp. 1-610, Recommendation ITU-T H.265, ITU.

(Continued)

Primary Examiner — Dave Czekaj
Assistant Examiner — Samuel D Fereja
(74) Attorney, Agent, or Firm — Paratus Law Group, PLLC

(57) ABSTRACT

There is provided an image processing device and method capable of suppressing a decrease in subjective image quality. A size of a current block for a prediction process is set according to a size of a peripheral block situated on a periphery of the current block. The prediction process is to generate a predicted image of an image to be encoded. An intra prediction process is performed on the current block that has been set and the predicted image is generated. The image to be encoded is encoded using the predicted image that has been generated. The present disclosure can be (Continued)

applied to, for example, an image processing device, an image encoding device, or an image decoding device.

20 Claims, 28 Drawing Sheets

(51) Int. Cl.
*H04N 19/159* (2014.01)
*H04N 19/593* (2014.01)
*H04N 19/14* (2014.01)
*H04N 19/124* (2014.01)
*H04N 19/136* (2014.01)
*H04N 19/86* (2014.01)

(52) U.S. Cl.
CPC ........... *H04N 19/14* (2014.11); *H04N 19/159* (2014.11); *H04N 19/176* (2014.11); *H04N 19/593* (2014.11); *H04N 19/86* (2014.11)

(58) Field of Classification Search
CPC .. H04N 19/593; H04N 19/597; H04N 19/124; H04N 19/46; H04N 19/52; H04N 19/44; H04N 19/119; H04N 19/139; H04N 19/513; H04N 19/61; H04N 19/172; H04N 19/82; H04N 19/117; H04N 19/30; H04N 19/96; H04N 19/136; H04N 19/174; H04N 19/182; H04N 19/11; H04N 19/147; H04N 19/157; H04N 19/51; H04N 19/523; H04N 19/103; H04N 19/126; H04N 19/14; H04N 19/187; H04N 19/59; H04N 19/107; H04N 19/12; H04N 19/132; H04N 19/196; H04N 19/33; H04N 19/463; H04N 19/85; H04N 19/13; H04N 19/154; H04N 19/50; H04N 19/577; H04N 19/109; H04N 19/122; H04N 19/18; H04N 19/436; H04N 19/503; H04N 19/521; H04N 19/86; H04N 19/91; H04N 13/128; H04N 19/15; H04N 19/156; H04N 19/17; H04N 19/184; H04N 19/573; H04N 19/88; H04N 13/161; H04N 19/134; H04N 19/142; H04N 19/149; H04N 19/19; H04N 19/31; H04N 19/537; H04N 19/54; H04N 19/55; H04N 19/56; H04N 19/57; H04N 19/587
See application file for complete search history.

(56) References Cited

U.S. PATENT DOCUMENTS

| | | | |
|---|---|---|---|
| 2010/0158400 A1* | 6/2010 | Lu | H04N 19/176 382/238 |
| 2013/0251038 A1* | 9/2013 | Yokoyama | H04N 19/176 375/240.13 |
| 2014/0192862 A1* | 7/2014 | Flynn | H04N 19/117 375/240.03 |
| 2014/0301465 A1* | 10/2014 | Kwon | H04N 19/503 375/240.16 |
| 2016/0057433 A1 | 2/2016 | Kudo et al. | |

FOREIGN PATENT DOCUMENTS

| | | |
|---|---|---|
| JP | 2015-165644 A | 9/2015 |
| KR | 10-2013-0078569 A | 7/2013 |
| KR | 20130078569 A * | 7/2013 |
| WO | WO 2012/101781 A1 | 8/2012 |

OTHER PUBLICATIONS

Shang et al., Fast CU Size Decision and PU Mode Decision Algorithm in HEVC Intra Coding, 2015 IEEE International Conference on Image Processing, Sep. 27-30, 2015, pp. 1593-1597, IEEE, Quebec City, Canada.

Huang et al., Fast Algorithm of Coding Unit Depth Decision for HEVC Intra Coding, 2014 IEEE Visual Communications and Image Processing Conference, Dec. 7-10, 2014, pp. 458-461, IEEE, Valletta, Malta.

May 8, 2019, European Search Report issued for related EP Application No. 17810110.1.

Aug. 19, 2019, European Search Report issued for related EP Application No. 17810110.1.

* cited by examiner

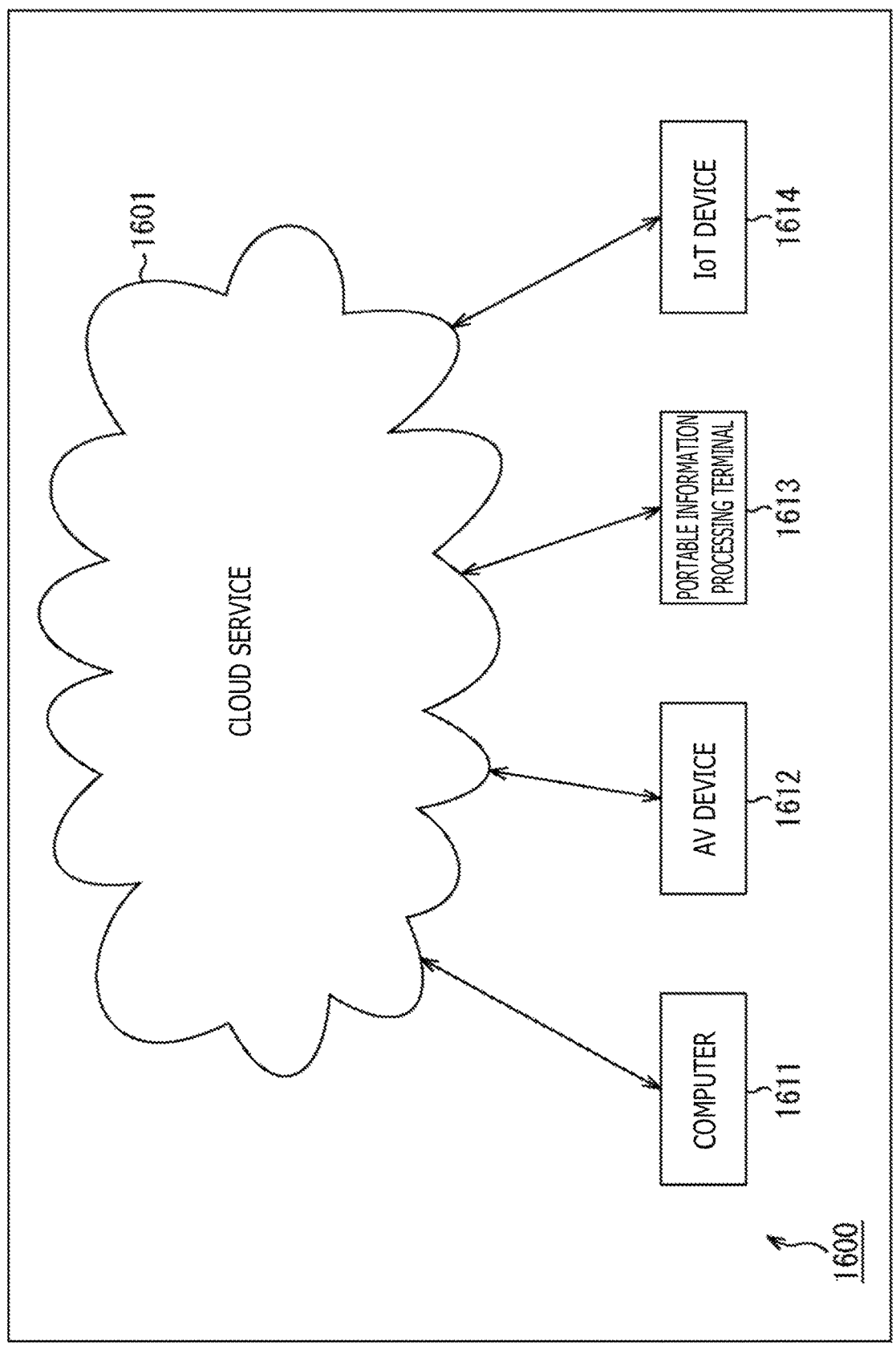

IMAGE PROCESSING DEVICE AND METHOD

CROSS REFERENCE TO PRIOR APPLICATION

This application is a National Stage Patent Application of PCT International Patent Application No. PCT/JP2017/019493 (filed on May 25, 2017) under 35 U.S.C. § 371, which claims priority to Japanese Patent Application No. 2016-114357 (filed on Jun. 8, 2016), which are all hereby incorporated by reference in their entirety.

TECHNICAL FIELD

The present disclosure relates to an image processing device and method, and particularly relates to an image processing device and method capable of suppressing a decrease in subjective image quality.

BACKGROUND ART

In recent years, the Joint Collaboration Team-Video Coding (JCTVC) has been standardizing an encoding method called High Efficiency Video Coding (HEVC) in order to achieve more improved encoding efficiency than MPEG-4 Part10 (Advanced Video Coding, hereinafter referred to as "AVC") (For example, refer to NPL 1). The JCTVC is a joint standardization organization of the International Telecommunication Union Telecommunication Standardization Sector (ITU-T) and the International Organization for Standardization/International Electrotechnical Commission (ISO/IEC).

In AVC and HEVC, a predicted image of an image to be encoded is generated for each block, and residual information between the image to be encoded and the predicted image is generated. Then, the residual information is encoded.

CITATION LIST

Non-Patent Literature

[NPL 1]
ITU-T, "SERIES H: AUDIOVISUAL AND MULTIMEDIA SYSTEMS Infrastructure of audiovisual services. Coding of moving video High efficiency video coding," ITU-T H.265 (V3), 2015 Apr. 29

SUMMARY

Technical Problem

In AVC and HEVC, however, these blocks are set on the basis of numerical performance such as RD costs. Therefore, in a case where the image to be encoded is an artificial image which has been generated artificially, there is a possibility that the subjective image quality is decreased.

The present disclosure has been made in view of the foregoing circumstances and makes it possible to suppress a decrease in subjective image quality.

Solution to Problem

An image processing device according to one aspect of the present technology includes: a block setting unit configured to set a size of a current block for a prediction process according to a size of a peripheral block situated on a periphery of the current block, the prediction process generating a predicted image of an image to be encoded; an intra prediction unit configured to perform an intra prediction process on the current block set by the block setting unit and generate the predicted image; and an encoding unit configured to encode the image to be encoded using the predicted image generated by the intra prediction unit.

A plurality of the peripheral blocks may include an upper block adjacent to an upper side of the current block and a left block adjacent to a left side of the current block. In a case where a size of the upper block and a size of the left block are identical to each other, the block setting unit may set the size of the current block to be identical to the size of the upper block and the size of the left block.

In a case where the size of the upper block and the size of the left block are not identical to each other, the block setting unit may set the size of the current block to be equal to or smaller than the size of one of the upper block and the left block that is smaller in size than the other of the upper block and the left block.

The peripheral block may be a reference block whose pixel value is referred to in the current block, and the block setting unit may set the size of the current block to be identical to a size of the reference block.

The peripheral block may be a reference block whose pixel value is referred to in the current block, and the block setting unit may set the size of the current block to be smaller than a size of the reference block.

The image to be encoded may be an artificial image generated artificially.

An artificial image determining unit configured to determine whether or not the image to be encoded is an artificial image generated artificially may be further included. In a case where the artificial image determining unit determines that the image to be encoded is the artificial image, the block setting unit may set the size of the current block according to the size of the peripheral block.

In a case where a user specifies that the image to be encoded is the artificial image, the artificial image determining unit may determine that the image to be encoded is the artificial image.

In a case where a monotonic increase or a monotonic decrease in pixel values occurs in a horizontal direction or a vertical direction, the artificial image determining unit may determine that the image to be encoded is the artificial image.

In a case where a number of high-frequency components is smaller than a predetermined criterion, the artificial image determining unit may determine that the image to be encoded is the artificial image.

In a case where a variation of pixel values is less than a predetermined criterion, the artificial image determining unit may determine that the image to be encoded is the artificial image.

An area determining unit configured to determine whether or not the current block is an artificial image area constituted by an artificial image generated artificially may be further included. In a case where the area determining unit determines that the current block is the artificial image area, the block setting unit may set the size of the current block according to the size of the peripheral block.

In a case where a user specifies that the current block is the artificial image area, the area determining unit may determine that the current block is the artificial image area.

In a case where a monotonic increase or a monotonic decrease in pixel values occurs in a horizontal direction or a vertical direction in the current block, the area determining unit may determine that the current block is the artificial image area.

In a case where a number of high-frequency components in the current block is smaller than a predetermined criterion, the area determining unit may determine that the current block is the artificial image area.

In a case where a variation of pixel values in the current block is less than a predetermined criterion, the area determining unit may determine that the current block is the artificial image area.

A first computing unit configured to calculate a difference in the current block between the image to be encoded and the predicted image generated by the intra prediction unit and generate a residual image; an orthogonal transform unit configured to perform an orthogonal transform on the residual image obtained by the first computing unit; and a quantization unit configured to quantize an orthogonal transform coefficient of the residual image obtained by the orthogonal transform unit may be further included. The encoding unit may encode a quantized coefficient of the orthogonal transform coefficient obtained by the quantization unit.

An inverse quantization unit configured to perform an inverse quantization on the quantized coefficient obtained by the quantization unit; an inverse orthogonal transform unit configured to perform an inverse orthogonal transform on an orthogonal transform coefficient obtained by the inverse quantization unit; a second computing unit configured to add the predicted image generated by the intra prediction unit to a residual image obtained by the inverse orthogonal transform unit and generate a local decoded image; and a deblocking filtering unit configured to apply a deblocking filter to the decoded image obtained by the second computing unit may be further included.

The intra prediction unit and the encoding unit may perform respective processes using a method conforming to an ITU-T H.265|ISO/IEC 23008-2 High Efficiency Video Coding.

An image processing method according one aspect of the present technology includes: setting a size of a current block for a prediction process according to a size of a peripheral block situated on a periphery of the current block, the prediction process generating a predicted image of an image to be encoded; performing an intra prediction process on the current block that has been set and generating the predicted image; and encoding the image to be encoded using the predicted image that has been generated.

In an image processing device and method according to one aspect of the present technology, a size of a current block for a prediction process is set according to a size of a peripheral block situated on a periphery of the current block. The prediction process is to generate a predicted image of an image to be encoded. An intra prediction process is performed on the current block that has been set and the predicted image is generated. The image to be encoded is encoded using the predicted image that has been generated.

Advantageous Effect of Invention

According to the present disclosure, an image can be processed. In particular, a decrease in subjective image quality can be suppressed.

BRIEF DESCRIPTION OF DRAWINGS

FIG. 5 is a diagram illustrating an example of how subjective image quality is decreased.
FIG. 6 is a diagram illustrating an example of how subjective image quality is decreased.
FIG. 28 is a block diagram illustrating an example of a schematic configuration of a network system.

DESCRIPTION OF EMBODIMENTS

Hereinafter, modes for carrying out the present disclosure (hereinafter, referred to as embodiments) will be described. It is noted that description will be made in the following order.
1. First Embodiment (Image Encoding Device)
2. Second Embodiment (Pre-processing unit)
3. Third Embodiment (Pre-processing unit)
4. Fourth Embodiment (Others)

1. First Embodiment

<HEVC Block Size>

In recent years, the Joint Collaboration Team-Video Coding (JCTVC) has been standardizing an encoding method called High Efficiency Video Coding (HEVC) in order to achieve more improved encoding efficiency than MPEG-4 Part10 (Advanced Video Coding, hereinafter referred to as "AVC"). The JCTVC is a joint standardization organization of the International Telecommunication Union Telecommunication Standardization Sector (ITU-T) and the International Organization for Standardization/International Electrotechnical Commission (ISO/IEC).

In the HEVC standard, a predicted image of an image to be encoded is generated for each block and residual information between the image to be encoded and the predicted image is generated. Then, the residual information is encoded. Further, the sizes of these blocks are set on the basis of the numerical performance such as RD costs. In the case of the HEVC standard, the sizes of these blocks can be set from 64×64 to 8×8. It is noted that the Motion Compensation (MC) block size can be set from 64×64 to 8×8, while the Discrete Cosine Transform (DCT) size can be set from 32×32 to 4×4.

With this HEVC standard, in a case where an image to be encoded is an artificial image which has been generated artificially, there is a possibility that the subjective image quality of a decoded image is decreased.

<SG Image>

Figure 1:
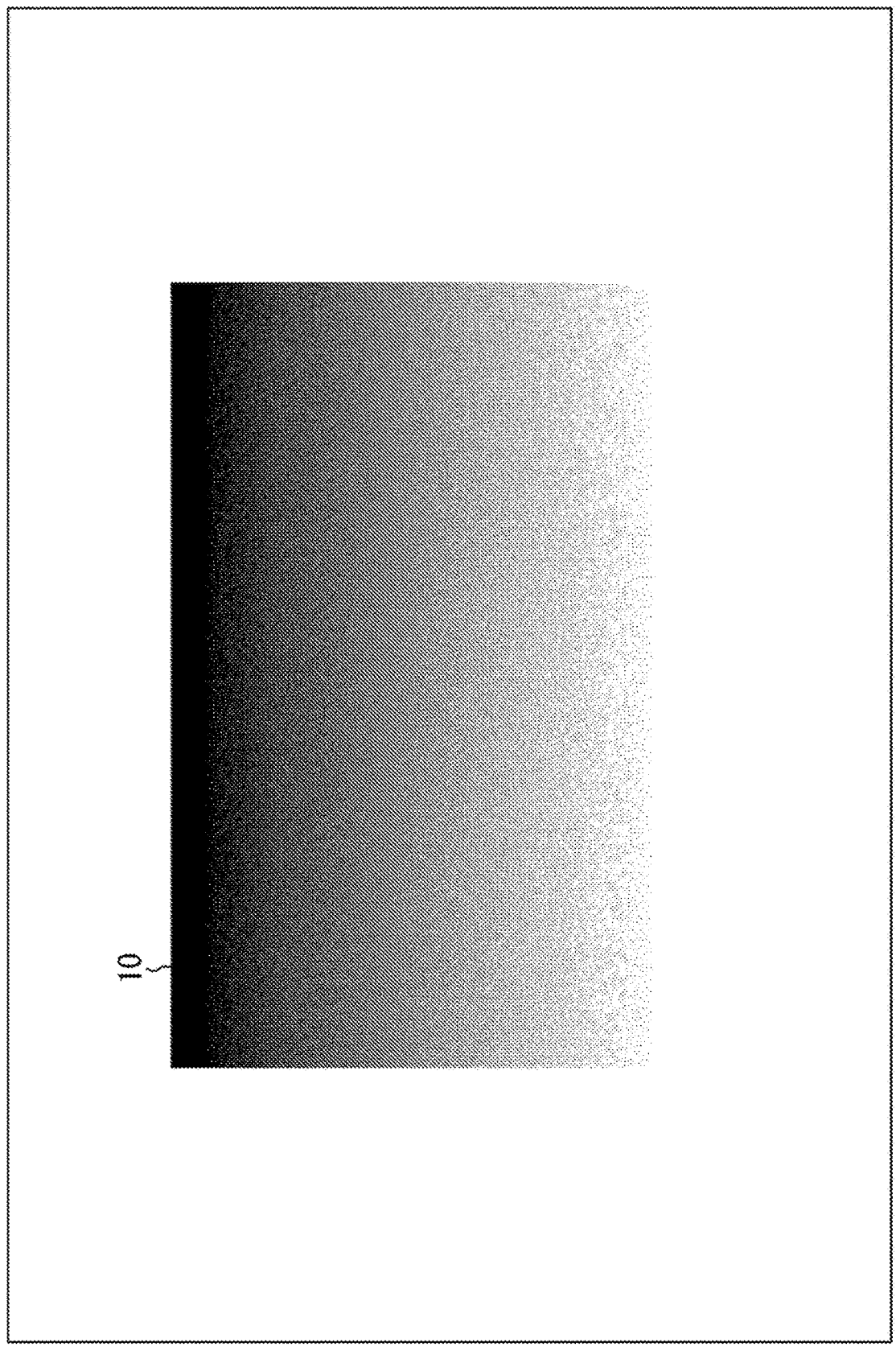
FIG. 1 is a view of an exemplary SG image.

An artificial image will be described. An artificial image is an image that is not a natural image such as a captured image. Examples of the artificial image include: an SG image that is a measurement signal for business; a Computer Graphics (CG) image generated by a computer; subtitles; and an animation image. An image 10 illustrated in FIG. 1 is an exemplary SG image. As illustrated in the example of the image 10, an SG image generally includes ramp signals (monotonically increasing or monotonically decreasing pixel values) in the vertical direction or horizontal direction.

Generally, in comparison with a natural image, an artificial image has characteristics such as: more monotonic increases or more monotonic decreases in pixel values in the vertical direction or horizontal direction; fewer noise components (high-frequency components); and less variation of pixel values. In other words, in comparison with a natural image, the change in the image is a little or the regularity of the change is strong in the artificial image.

<Boundary Filtering Process>

Incidentally, HEVC adopts a boundary filtering process (which is also called a boundary smoothing process) as a way of further increasing intra prediction efficiency. The boundary filtering process is to suppress discontinuity that is generated between a prediction reference image and a predicted image in a simple prediction mode such as DC prediction and horizontal/vertical prediction.

Figure 2:
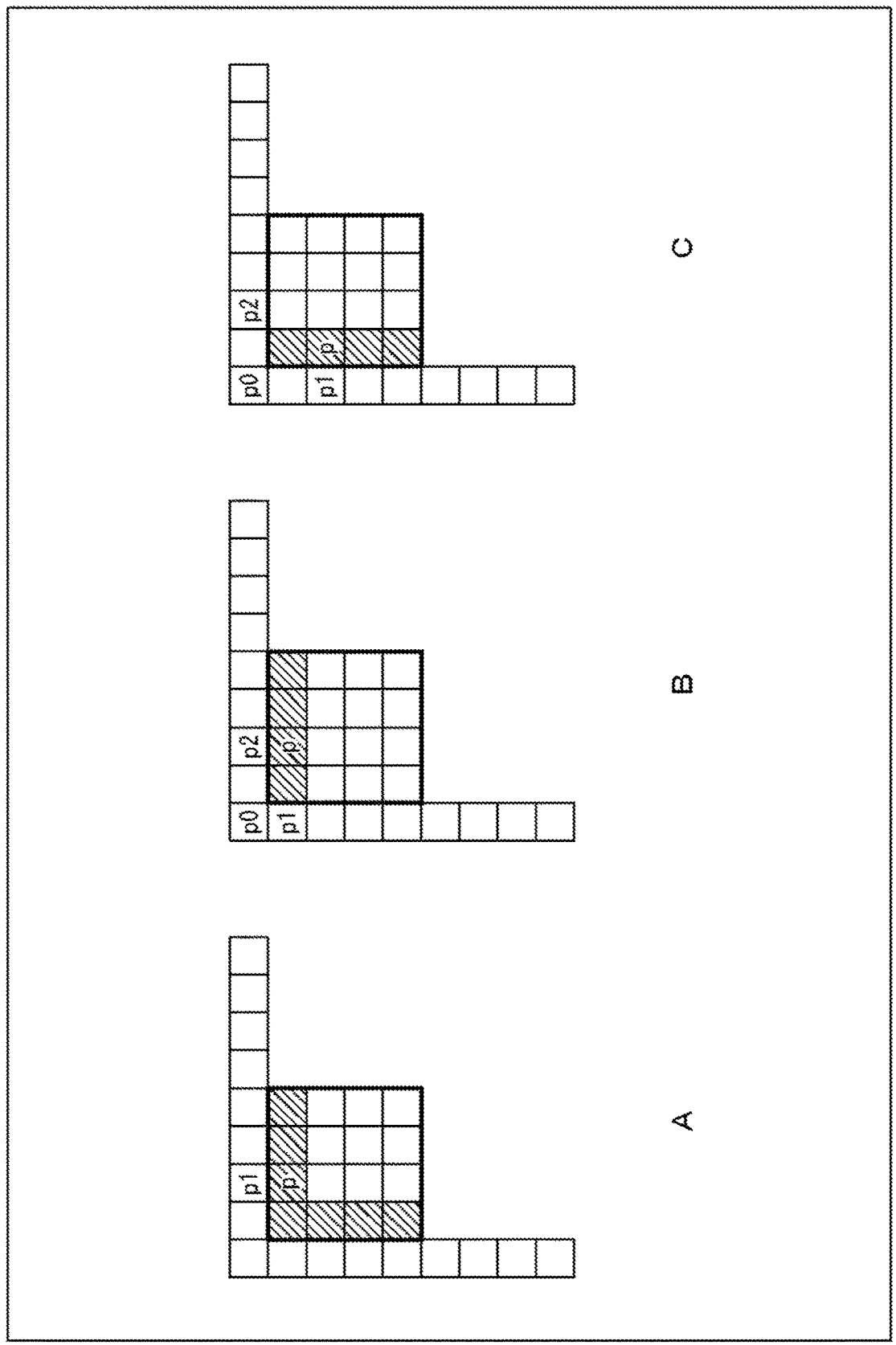
FIG. 2 is a diagram illustrating examples of a boundary filtering process.

FIG. 2 is a diagram describing the boundary filtering process. In FIG. 2, each small square represents a pixel, and 4×4 pixels surrounded by bold lines represent current blocks. A of FIG. 2 illustrates an example of how the boundary filtering process is performed in the case of the DC prediction. In the case of the DC prediction, the filtering process is performed on the pixels in a diagonal line pattern, as indicated in the following equation (1).

$$predSamples[0][0]=(p[-1][0]+2*dcVal+p[0][-1]+2)>>2$$

$$predSamples[x][0]=(p[x][-1]+3*dcVal+2)>>2, \text{ with } x=1\ldots nTbS-1$$

$$predSamples[0][y]=(p[-1][y]+3*dcVal+2)>>2, \text{ with } y=1\ldots nTbS-1 \quad (1)$$

It is noted that dcVal is an average value of peripheral pixels (pixels other than pixels in the current blocks illustrated in FIG. 2 (pixels in an area that is not surrounded by bold lines)). For example, the filtering process is performed on a pixel p in A of FIG. 2 by referring to the value of a peripheral pixel p1, as indicated in the following equation (2).

$$p=(p1+3*dcVal+2)>>2 \quad (2)$$

B of FIG. 2 illustrates an example of how the boundary filtering process is performed in the case of the horizontal prediction. In the case of the horizontal prediction, the filtering process is performed on the pixels in the diagonal line pattern, as indicated in the following equation (3).

$$predSamples[x][y]=Clip1_Y(p[-1][y]+((p[x][-1]-p[-1][-1])>>1))$$

$$\text{with } x=0\ldots nTbS-1, y=0 \quad (3)$$

For example, the filtering process is performed on a pixel p in B of FIG. 2 by referring to the values of peripheral pixels p0 to p2, as indicated in the following equation (4).

$$p=(p2+(p1-p0))>>1 \quad (4)$$

C of FIG. 2 illustrates an example of how the boundary filtering process is performed in the case of the vertical prediction. In the case of the vertical prediction, the filtering process is performed on the pixels in the diagonal line pattern, as indicated in the following equation (5).

$$predSamples[x][y]=Clip1_Y(p[x][-1]+((p[-1][y]-p[-1][-1])>>1))$$

$$\text{with } x=0, y=0\ldots nTbS-1 \quad (5)$$

For example, the filtering process is performed on a pixel p in C of FIG. 2 by referring to the values of peripheral pixels p0 to p2, as indicated in the following equation (6).

$$p=(p1+(P2-P0))>>1 \quad (6)$$

<Deblocking Filter>

Next, deblocking filters will be described. Deblocking filters are smoothing processes using pixels in the vicinity of the block boundary lines and applied along the block boundary lines (vertical boundary and horizontal boundary). In HEVC, there are two types of filters available: a weak filter and a strong filter. Either one is selected depending on the change in pixel values at the boundary. In the case of the strong filter, pixel values of three pixels on both sides of the boundary are changed. In the case of the weak filter, a pixel value(s) of one pixel or two pixels of both sides of the boundary is (are) changed.

Figure 3:
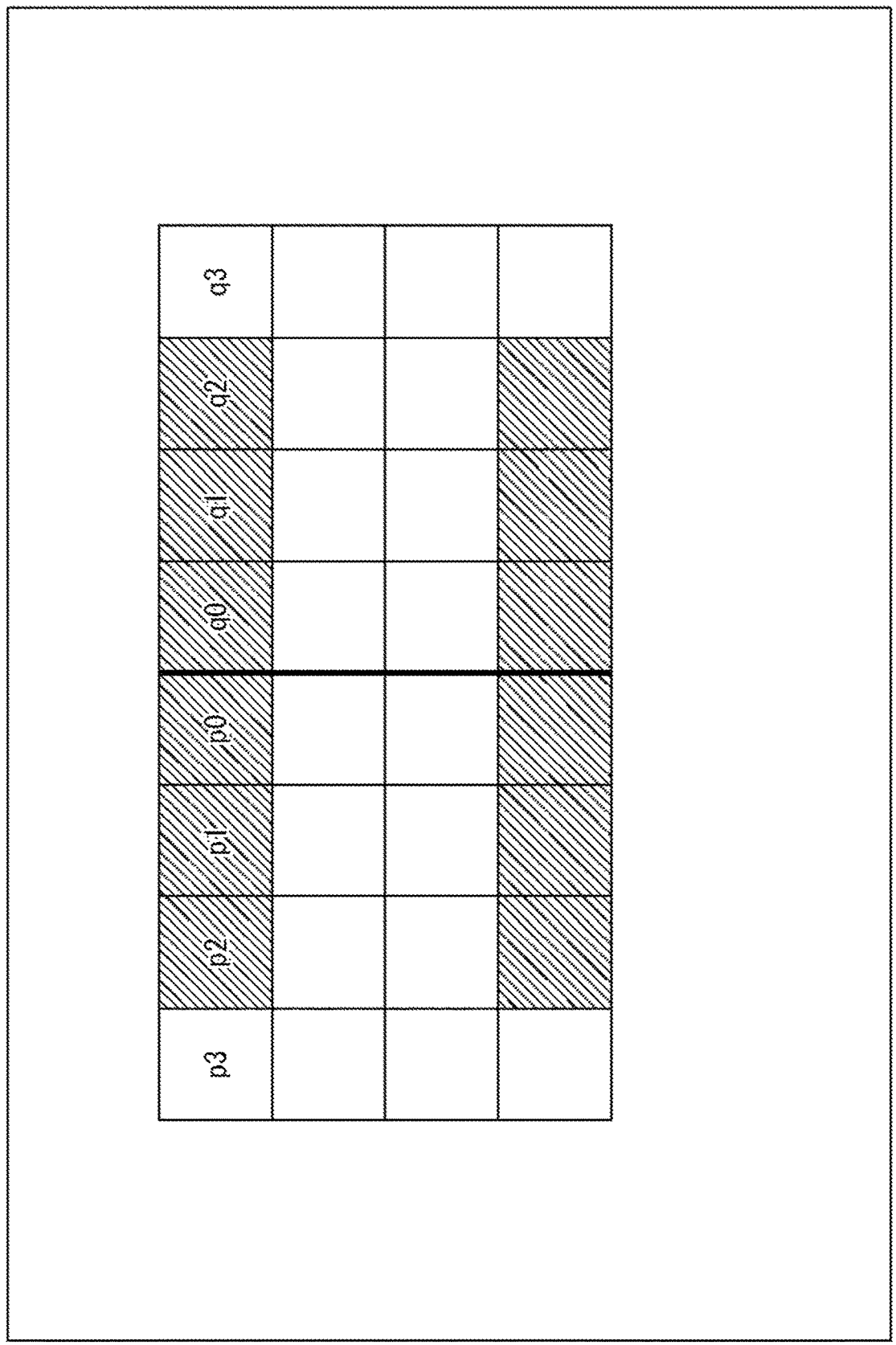
FIG. 3 is a diagram illustrating an example of a deblocking filtering process.

For example, FIG. 3 illustrates an example of the deblocking filter in a case where the boundary is in the vertical direction (in the case of the vertical boundary) In FIG. 3, each square represents a pixel, and a bold line in the vertical direction represents a boundary (vertical boundary). In the case of the weak filter, when the deblocking filter is applied, pixel values p0 and p1 and pixel values q0 and q1 in the vicinity of the boundary are respectively changed to pixel values p0' and p1' and pixel values q0' and q1', as indicated in the following equation (7). Further, in the case of the strong filter, the pixel values p0 to p2 and the pixel values q0 to q2 in the vicinity of the boundary are respectively changed to the pixel values p0' to p2' and the pixel values q0' to q2', as indicated in the following equation (8).

weak filter $$\Delta = (9*(q0-p0) - 3*(q1-p1) + 8) >> 4$$

$$p0' = \text{Clip1}_Y(p0+\Delta)$$

$$q0' = \text{Clip1}_Y(q0-\Delta)$$

$$\Delta p = (((p2+p0+1)>>1) - p1 - \Delta) >> 1)$$

$$\Delta q = (((q2+q0+1)>>1) - q1 - \Delta) >> 1)$$

$$p1' = \text{Clip1}_Y(p1+\Delta p)$$

$$q1' = \text{Clip1}_Y(q1+\Delta q) \quad (7)$$

Strong filter $$p0' = \text{Clip3}(p0-2*tc, p0+2*tc, (p2+2*p1+2*p0+2*q0+q1+4)>>3)$$

$$p1' = \text{Clip3}(p1-2*tc, p1+2*tc, (p2+p1+p0+q0+2)>>2)$$

$$p2' = \text{Clip3}(p2-2*tc, p2+2*tc, (2*p3+3*p2+p1+p0+q0+4)>>3)$$

$$q0' = \text{Clip3}(q0-2*tc, q0+2*tc, (p1+2*p0+2*q0+2*q1+q2+4)>>3)$$

$$q1' = \text{Clip3}(q1-2*tc, q1+2*tc, (p0+q0+q1+q2+2)>>2)$$

$$q2' = \text{Clip3}(q2-2*tc, q2+2*tc, (p0+q0+q1+3*q2+2*q3+4)>>3) \quad (8)$$

<Deterioration in Subjective Image Quality>

Figure 4:
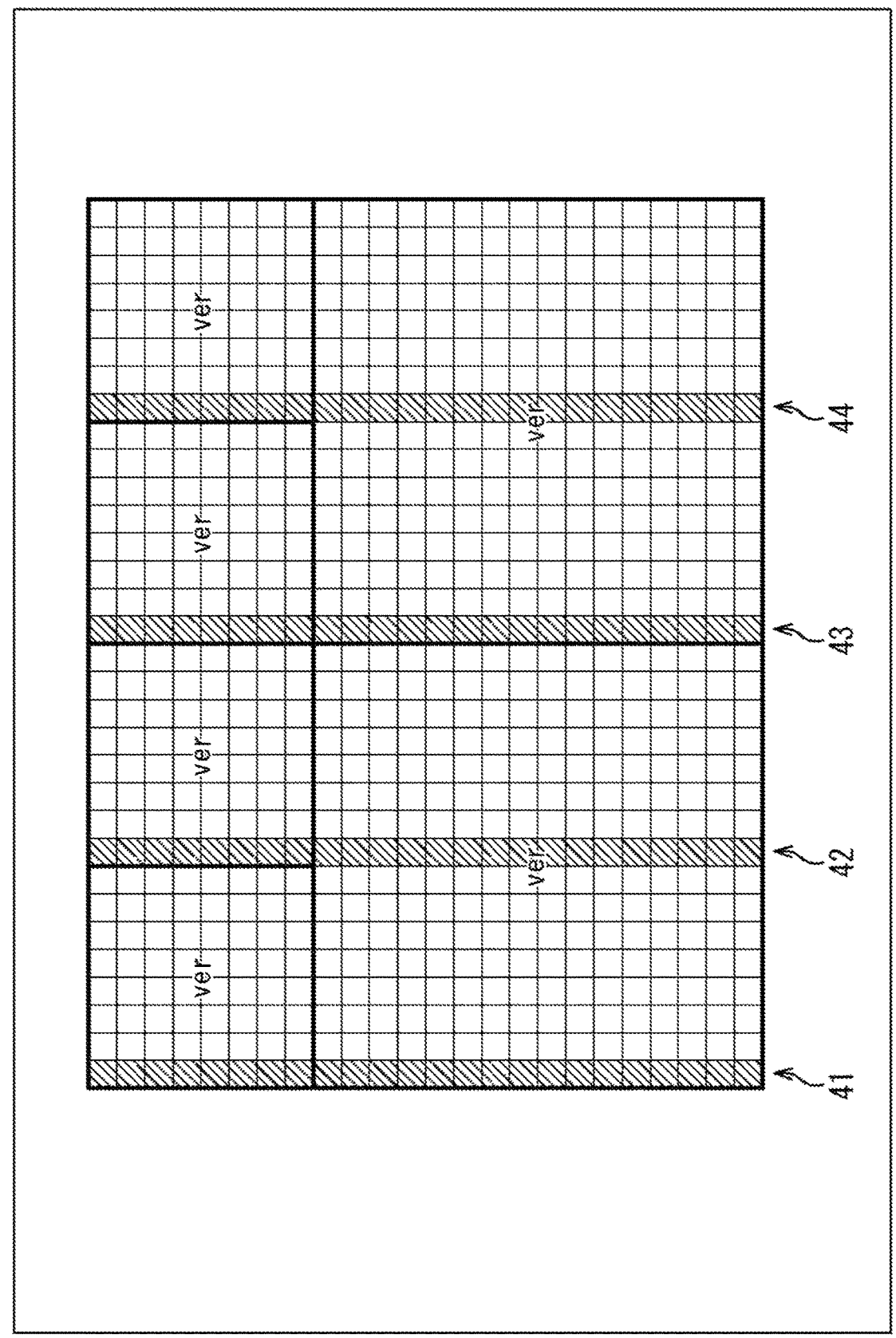
FIG. 4 is a diagram illustrating an example of how subjective image quality is decreased.

In FIG. 4, each square represents a pixel, and bold lines represent block boundaries. Specifically, in FIG. 4, blocks of 8×8 pixels (also referred to as 8×8 blocks) are illustrated on the upper side, while blocks of 16×16 pixels (also referred to as 16×16 blocks) are illustrated on the lower side. In FIG. 4, for example, when the vertical prediction is applied to each 8×8 block, pixel values of the pixels adjacent to the boundary (pixels in the diagonal line pattern in the figure) in the vertical direction of each 8×8 block are changed (that is, deteriorated) through the boundary filtering process.

Next, when the vertical prediction is applied to each 16×16 block, the pixel values of each 8×8 block are copied to the corresponding 16×16 block. That is, as indicated in the diagonal line pattern in the figure, the deteriorated pixel values of the 8×8 blocks are also reflected in the 16×16 blocks, deteriorating pixel columns 41 to 44.

Of these pixel columns, the pixel column 41 and the pixel column 43 are pixel columns in the vicinity of the boundaries of the 16×16 blocks. Thus, deterioration is suppressed through the above-described deblocking filter. However, since the pixel column 42 and the pixel column 44 are not the pixel columns in the vicinity of the boundaries, it is not possible to apply the deblocking filter. Consequently, deterioration remains. By using such an image as a reference image, the deterioration of the pixel values further propagates. Such a deterioration in image quality may cause a decrease in subjective image quality of a decoded image.

Figure 5:
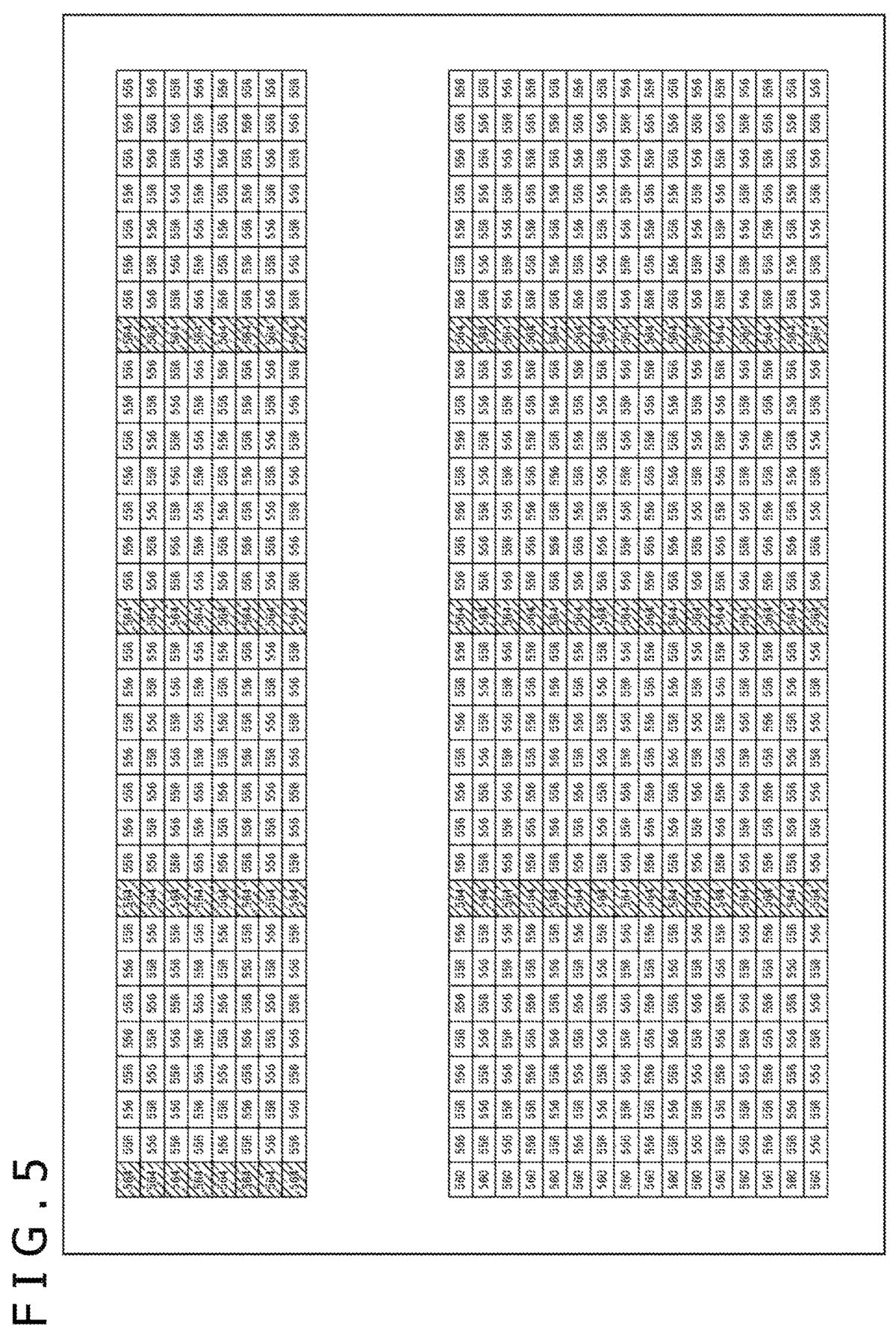
Figure 6:
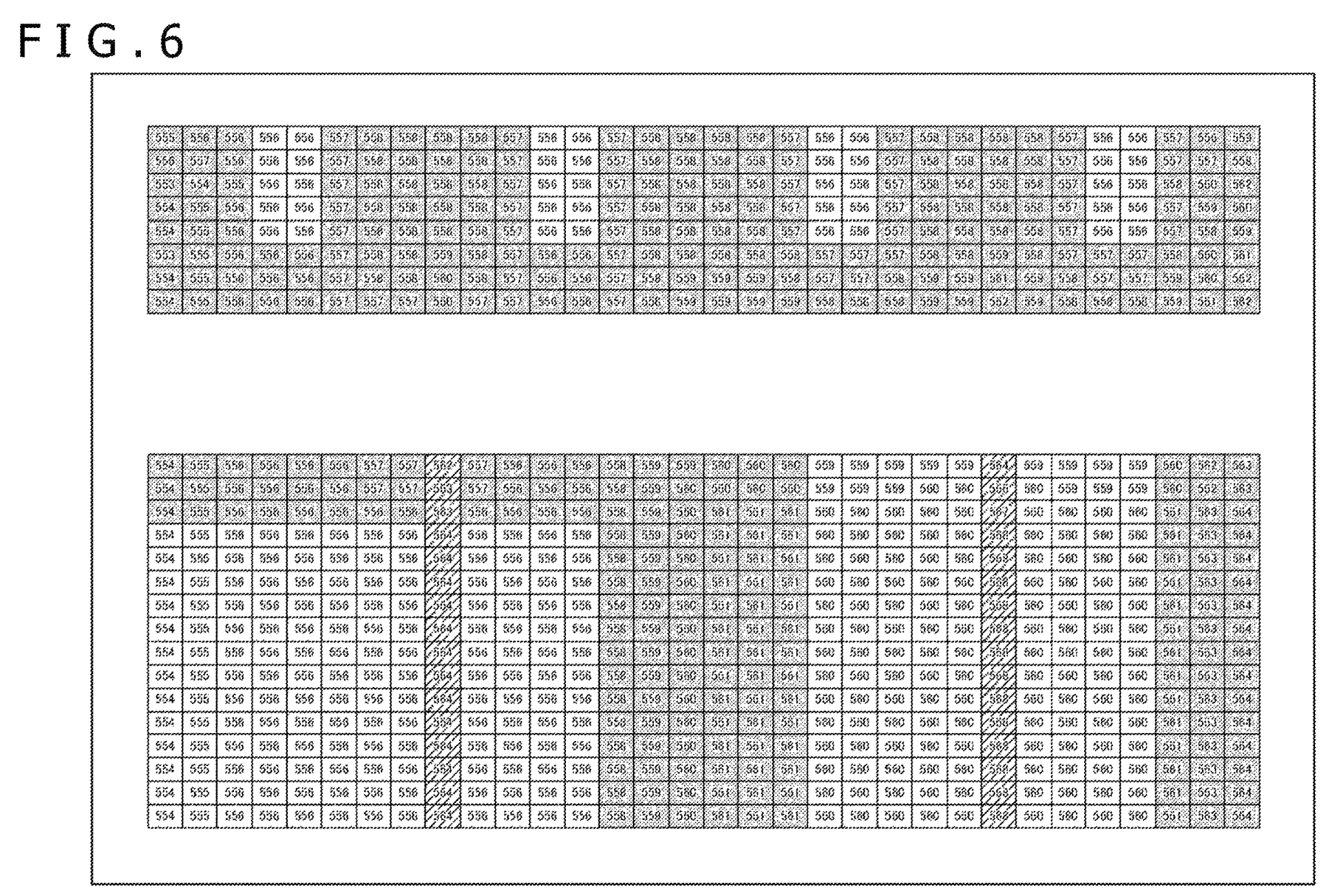

FIGS. 5 and 6 illustrate concrete examples of the pixel values in the configuration in FIG. 4. Each square in the upper side of FIGS. 5 and 6 corresponds to each pixel of the 8×8 blocks in FIG. 4, and each numeral represents the corresponding pixel value. Similarly, each square in the lower side of FIGS. 5 and 6 corresponds to each pixel of the 16×16 blocks in FIG. 4, and each numeral represents the corresponding pixel value.

FIG. 5 illustrates an example of how the pixel values have been changed through the boundary filter. In FIG. 5, the pixel values of the pixels in the diagonal line pattern in the figure that are adjacent to the boundaries of the 8×8 blocks have been changed to values different from the pixel values of the other pixels. Further, these changes in pixel values also have propagated to the 16×16 blocks.

FIG. 6 illustrates the pixel values after the deblocking filter has been applied. In FIG. 6, pixels in grey represent pixels to which the deblocking filter has been applied. As illustrated in FIG. 6, the deblocking filter is applied to approximately all the pixels of the 8×8 blocks. Thus, the changes in pixel values are alleviated. By contrast, in the case of the 16×16 blocks, the deblocking filter is not applied to the pixels that are not in the vicinity of the boundaries. Thus, the changes in pixel values of the pixels in the diagonal line pattern (that is, deterioration in image quality) approximately remain.

Particularly, as described above, in the case of an artificial image, there are a few noise components, and the change is a little or the regularity of the change is strong. Therefore, the deterioration in pixel values that do not conform to the regularity is subjectively noticeable. Further, in other words, it is highly likely that due to such characteristics of the artificial image, the image is flat or there is a monotonic increase or a monotonic decrease in the horizontal direction or the vertical direction. Therefore, there is a high possibility that the above-described DC prediction, horizontal prediction, or vertical prediction is applied. Thus, the above-described deterioration in pixel values is likely to occur.

<Limitation to Block Size>

In light of the circumstances, the size of a current block for a prediction process is set according to the size of a peripheral block situated on the periphery of the current block. The prediction process is to generate a predicted image of an image to be encoded. In this manner, a decrease in subjective image quality of a decoded image can be suppressed.

<Block Division>

Incidentally, in conventional image encoding methods such as Moving Picture Experts Group 2 (MPEG2) (ISO/IEC 13818-2) and MPEG-4 Part10 (Advanced Video Coding, hereinafter referred to AVC), an encoding process is executed per unit of processing called a macroblock. A macroblock is an equally sized block having 16×16 pixels. By contrast, in High Efficiency Video Coding (HEVC), an encoding process is executed per unit of processing (units of encoding) called a Coding Unit (CU). A CU is a block having a variable size and is formed by recursively dividing a Largest Coding Unit (LCU). The LCU is the maximum unit of encoding. The selectable maximum CU size is 64×64 pixels. The selectable minimum CU size is 8×8 pixels. The minimum size of a CU is called a Smallest Coding Unit (SCU). It is noted that the maximum CU size is not limited to 64×64 pixels, and may be a greater block size such as 128×128 pixels and 256×256 pixels.

As a result of adopting the CU having a variable size in this manner, HEVC is capable of adaptively adjusting the image quality and encoding efficiency according to the contents of the image. A prediction process for prediction encoding is executed per unit of processing (units of prediction) called a Prediction Unit (PU). A PU is formed by dividing a CU using one of several division patterns. Further, the PU is made up of units of processing (prediction blocks) called Prediction Blocks (PBs) each serving for luminance (Y) and color difference (Cb, Cr). In addition, an orthogonal transform process is executed per unit of processing (units of transform) called a Transform Unit (TU). A TU is formed by dividing a CU or a PU to a certain depth. Further, the TU is made up of units of processing (transform blocks) called Transform Blocks (TBs) each serving for each luminance (Y) and color difference (Cb, Cr).

<Recursive Block Division>

Figure 7:
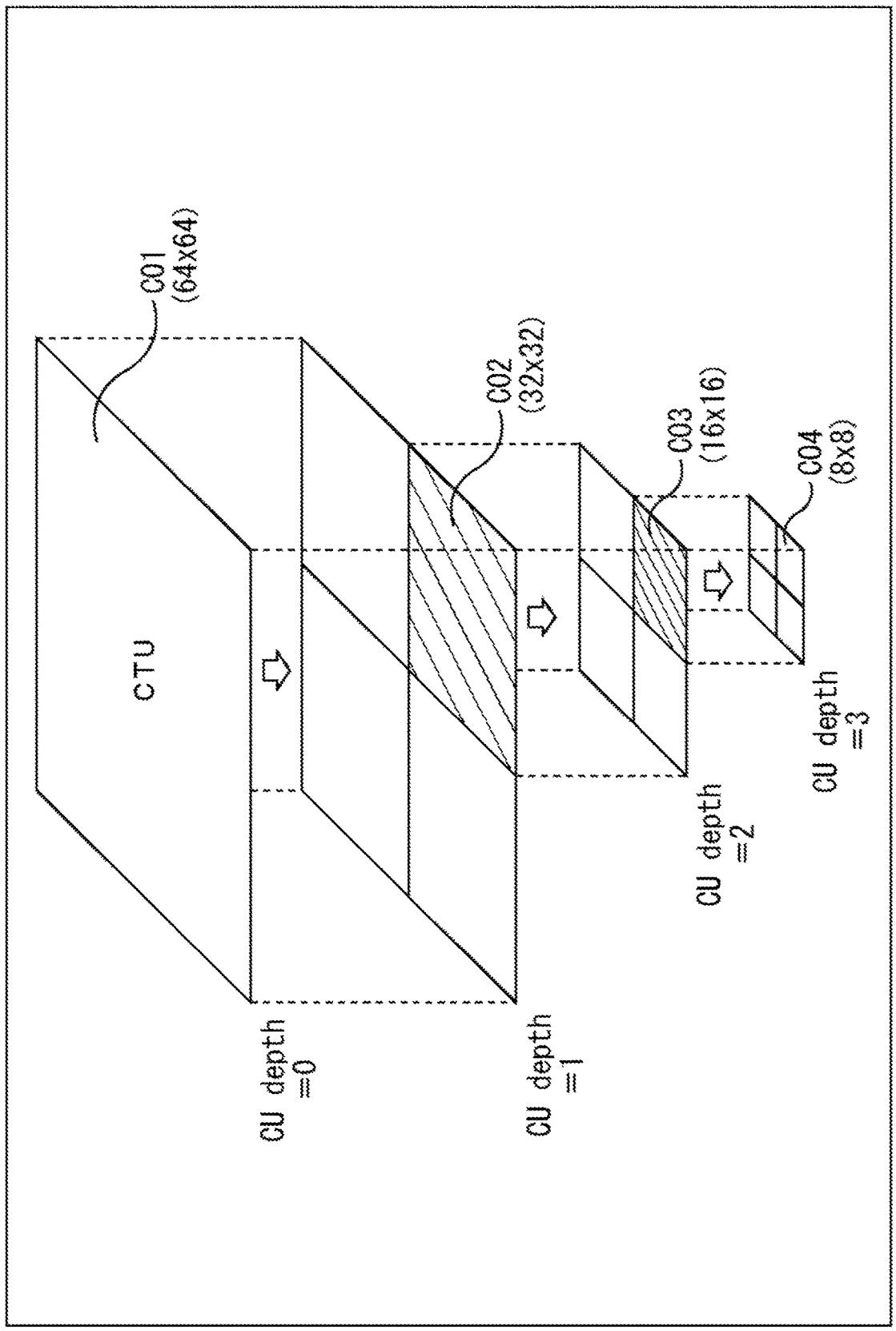
FIG. 7 is an explanatory diagram for describing an overview of recursive block division of a CU.

FIG. 7 is an explanatory diagram for describing an overview of recursive block division of a CU in HEVC. The CU block division is performed by recursively dividing one block into four (=2×2) sub-blocks. Repeating this division, as a result, forms a tree structure in quad-tree form. One entire quad-tree is called a Coding Tree Block (CTB). A logical unit corresponding to the CTB is called a Coding Tree Unit (CTU).

As an example, a C01 is illustrated in the upper part of FIG. 7. The C01 is a CU having a size of 64×64 pixels. The depth of the C01 division is equal to zero. This means that the C01 is the root of the CTU and corresponds to the LCU. The size of the LCU can be specified by a parameter encoded in a Sequence Parameter Set (SPS) or a Picture Parameter Set (PPS). A C02, which is a CU, is one of four CUs divided from the C01 and has a size of 32×32 pixels. The depth of the C02 division is equal to 1. A C03, which is a CU, is one of four CUs divided from the C02 and has a size of 16×16 pixels. The depth of the C03 division is equal to 2. A C04, which is a CU, is one of four CUs divided from the C03 and has a size of 8×8 pixels. The depth of the C04 division is equal to 3. In this manner, a CU is formed by recursively dividing an image to be encoded. The depth of division is variable. For example, for a flat image area such as a blue sky, a CU having a larger size (that is, a smaller depth) can be set. On the other hand, for a steep image area including many edges, a CU having a smaller size (that is, a greater depth) can be set. Then, each of the CUs that have been set serves as a unit of processing in the encoding process.

<Setting PU to CU>

Figure 8:
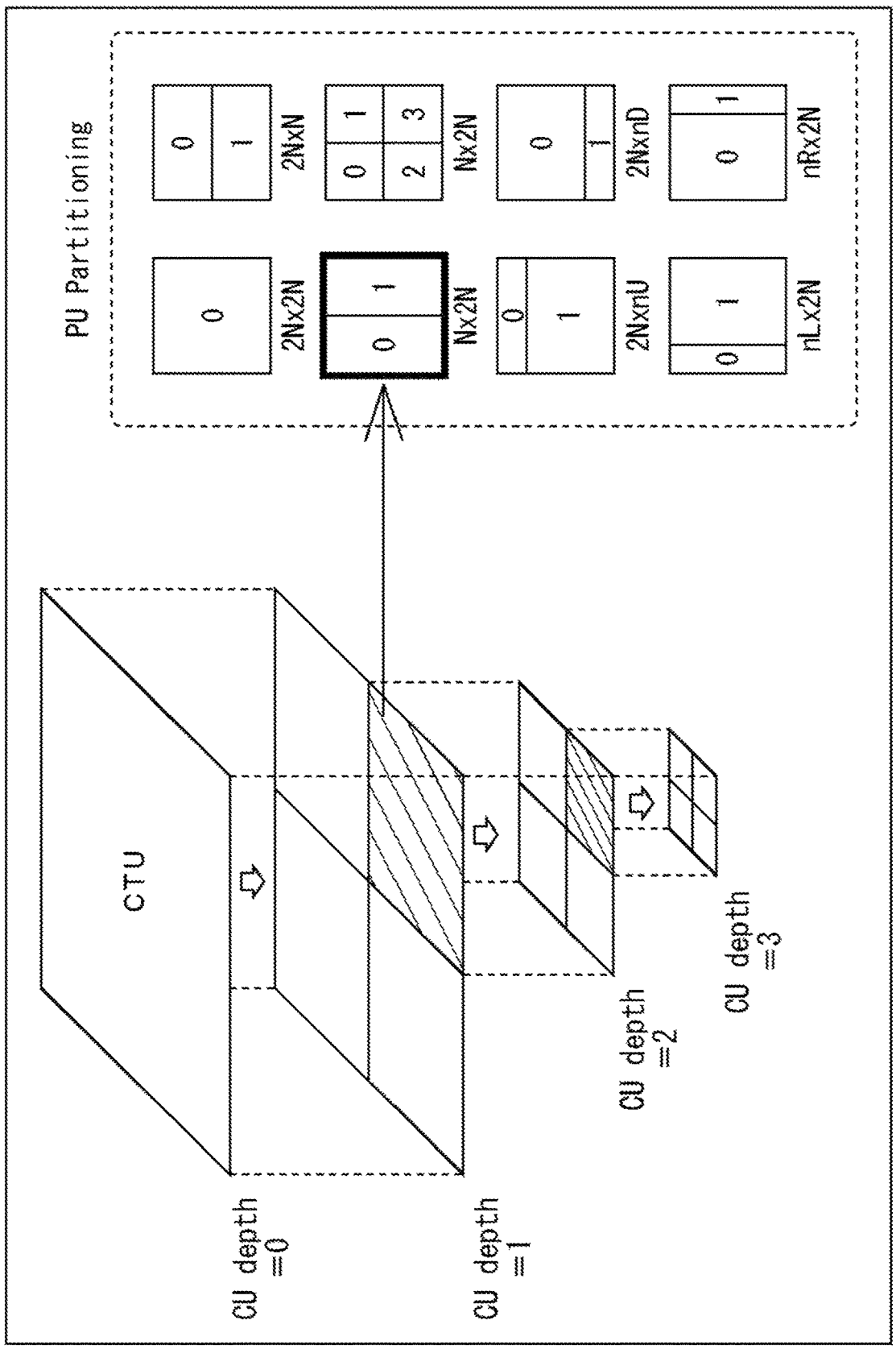
FIG. 8 is an explanatory diagram for describing the setting of a PU to the CU illustrated in FIG. 7.

A PU is a unit of processing for prediction processes including intra prediction and inter prediction. A PU is formed by dividing a CU using one of several division patterns. FIG. 8 is an explanatory diagram for describing the setting of a PU to the CU illustrated in FIG. 7. On the right of FIG. 8, eight division patterns of 2N×2N, 2N×N, N×2N, N×N, 2N×nU, 2N×nD, nL×2N, and nR×2N are illustrated. Of these division patterns, the two patterns, 2N×2N and N×N, are selectable for the intra prediction (N×N is selectable only in the SCU). By contrast, in the case of the inter prediction, all the eight division patterns are selectable in a case where asymmetric motion partition is enabled.

<Setting TU to CU>

Figure 9:
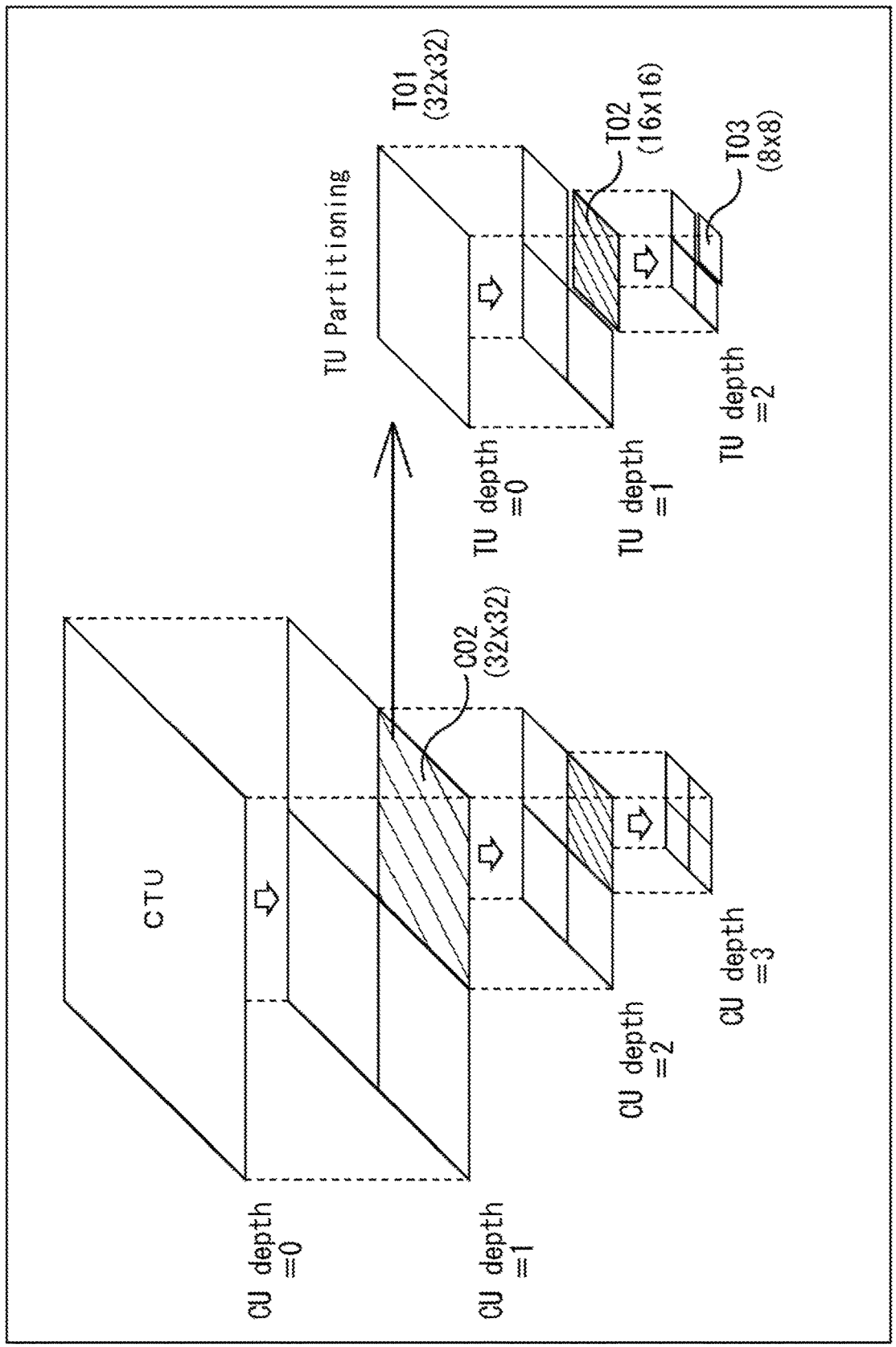
FIG. 9 is an explanatory diagram for describing the setting of a TU to the CU illustrated in FIG. 7.

A TU is a unit of processing for the orthogonal transform process. A TU is formed by dividing a CU (each PU in the CU for the intra CU) to a certain depth. FIG. 9 is an explanatory diagram for describing the setting of a TU to the CU illustrated in FIG. 8. On the right of FIG. 9, more than one TU that can be set to the C02 are illustrated. For example, a T01, which is a TU, has a size of 32×32 pixels, and its TU division depth is equal to zero. A T02, which is a TU, has a size of 16×16 pixels, and its TU division depth is equal to 1. A T03, which is a TU, has a size of 8×8 pixels, and its TU division depth is equal to 2.

Typically, what block division is performed is determined on the basis of comparison of costs that affect the encoding efficiency, so that the above-described blocks such as CUs, PUs, and TUs are set to an image. For example, an encoder compares costs between one CU with 2M×2M pixels and four CUs with M×M pixels. In a case where setting the four CUs with M×M pixels achieves higher encoding efficiency, the encoder determines that the CU with 2M×2M pixels is divided into the four CUs with M×M pixels.

<Scan Order of CUs and PUs>

Figure 10:
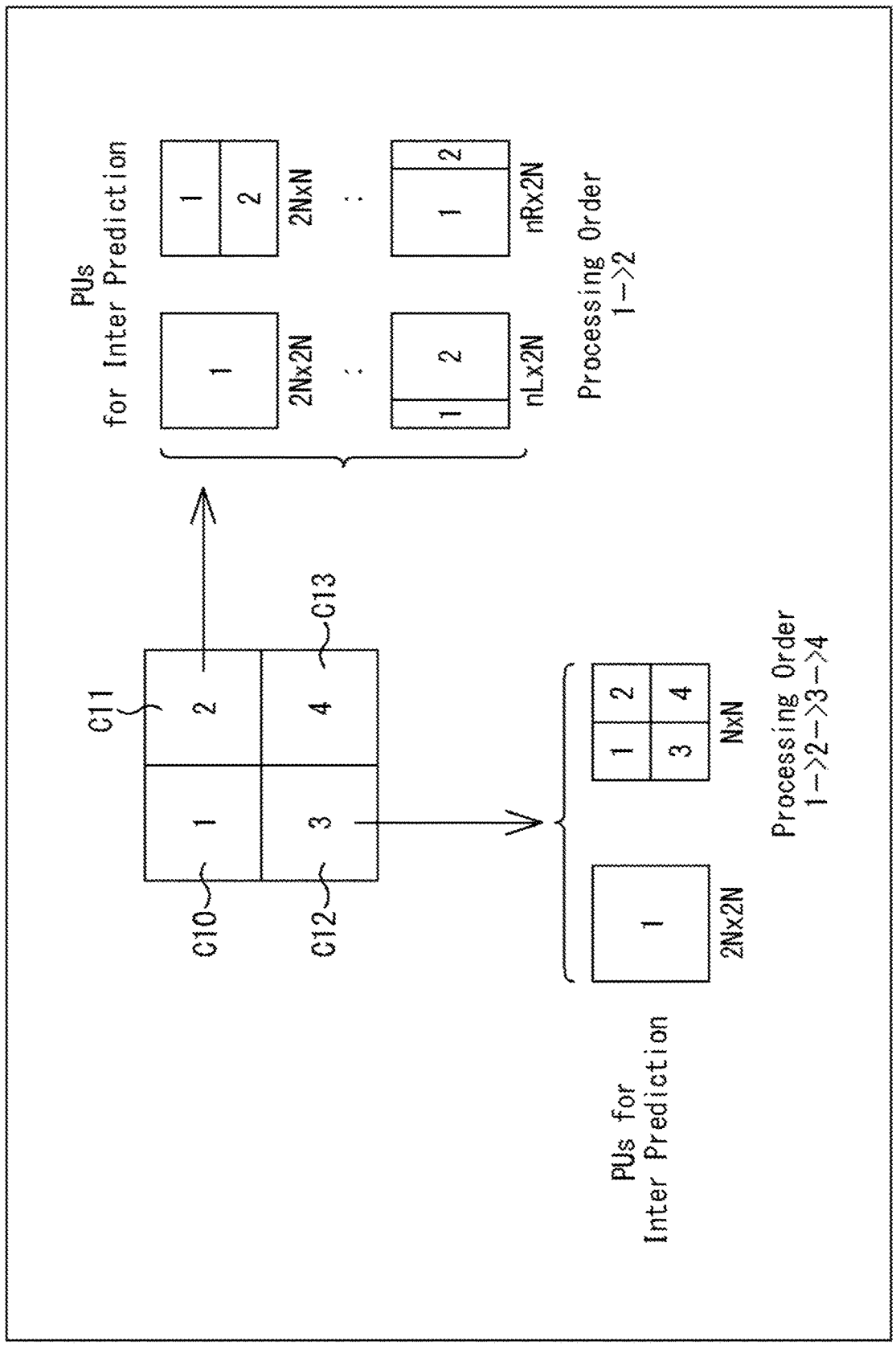
FIG. 10 is an explanatory diagram for describing a CU/PU scan order.

When an image is encoded, CTBs (or LCUs) are scanned in raster scan order. The CTBs (or LCUs) are set in a latticed pattern in the image (or slice or tile). In one CTB, CUs are scanned in such a manner that the quad-tree is traced from left to right and from top to bottom. When the current block is processed, information associated with adjacent blocks above and to the left thereof is used as input information. FIG. 10 is an explanatory diagram for describing the scan order of CUs and PUs. In the top left of FIG. 10, four CUs, namely, a C10, a C11, a C12, and a C13, that can be included in one CTB are illustrated. The number in the frame of each CU represents the processing order. The encoding process is executed in order of the C10, which is a CU at the top left, the C11, which is a CU at the top right, the C12, which is a CU at the bottom left, and the C13, which is a CU at the bottom right. On the right of FIG. 10, more than one PU for inter prediction that can be set to the C11, which is a CU, are illustrated. At the bottom of FIG. 10, more than one PU for intra prediction that can be set to the C12, which is a CU, are illustrated. As indicated in the numbers in the frames of these PUs, the PUs are also scanned so as to be traced from left to right and from top to bottom.

Hereinafter, description may occasionally be given using "block" as a partial area or a unit of processing of an image (picture) ("block" does not refer to a block of processing units). "Block" in this case indicates an arbitrary partial area within a picture, and there is no limitation to the size, shape, characteristics, and the like of the block. That is, "block" in this case includes an arbitrary partial area (units of processing) such as, for example, TBs, TUs, PBs, PUs, SCUs, CUs, LCUs (CTBs), sub-blocks, macroblocks, tiles, and slices.

<Image Encoding Device>

Figure 11:
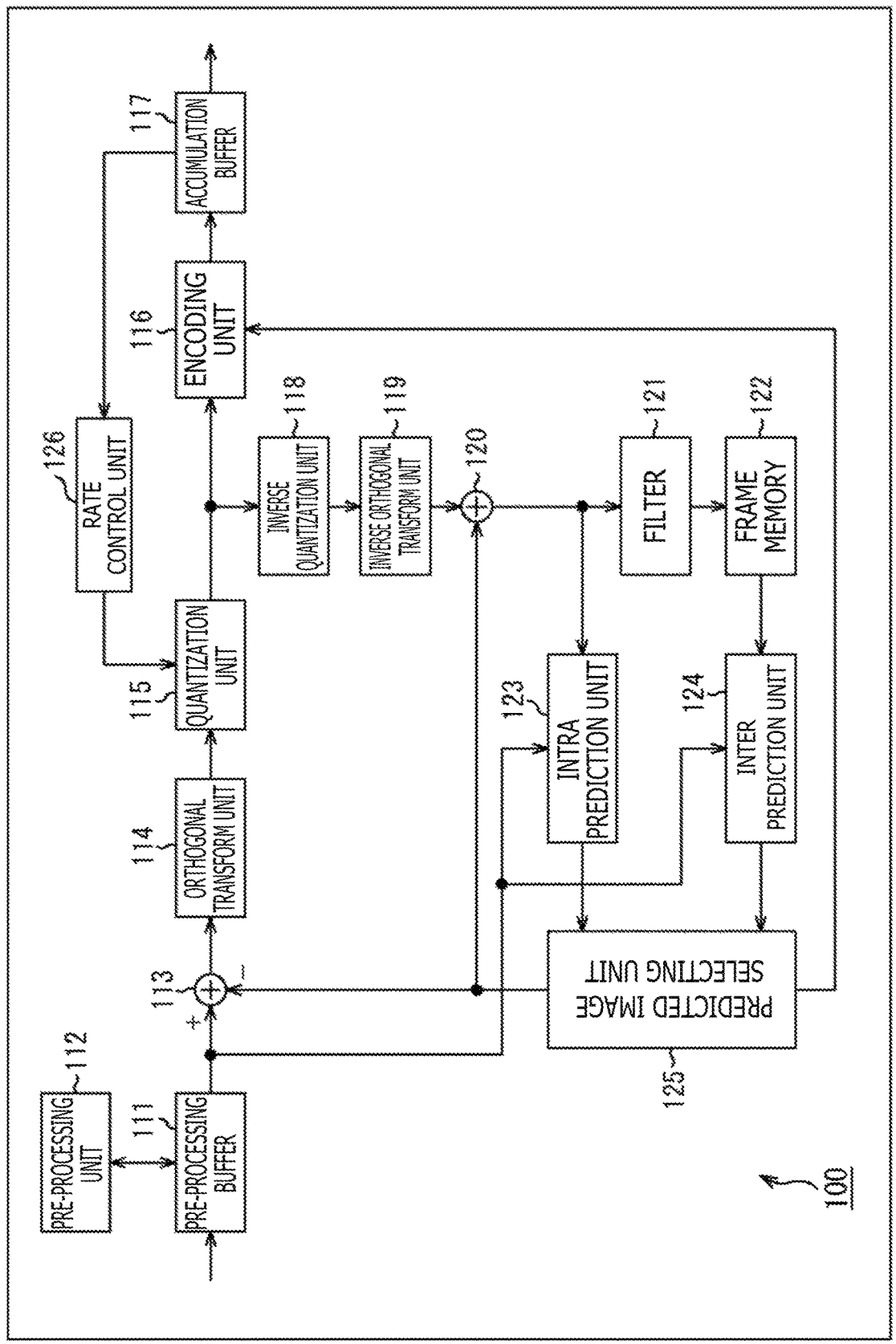
FIG. 11 is a block diagram illustrating an example of a main configuration of an image encoding device.

FIG. 11 is a block diagram illustrating an example of a configuration of an image encoding device according to an aspect of an image processing device to which the present technology is applied. An image encoding device 100 illustrated FIG. 11 is a device that encodes image data of a moving image using a method conforming to ITU-T H.265|ISO/IEC 23008-2 High Efficiency Video Coding (HEVC). It is noted that FIG. 11 illustrates main processing units and data flows; and the processing units and data flows illustrated in FIG. 11 are not necessarily all. That is, the image encoding device 100 may include a processing unit that is not illustrated as a block in FIG. 11 and/or may include a process or data flow that is not illustrated as an arrow or the like in FIG. 11.

As illustrated in FIG. 11, the image encoding device 100 includes a pre-processing buffer 111, a pre-processing unit 112, a computing unit 113, an orthogonal transform unit 114, a quantization unit 115, an encoding unit 116, and an accumulation buffer 117. Further, the image encoding device 100 includes an inverse quantization unit 118, an inverse orthogonal transform unit 119, a computing unit 120, a filter 121, a frame memory 122, an intra prediction unit 123, an inter prediction unit 124, a predicted image selecting unit 125, and a rate control unit 126.

In the image encoding device 100 in this case, an artificial image is input as an input image. The pre-processing buffer 111 stores each frame of image data of the input artificial image in display order. The pre-processing unit 112 performs processes on the image data stored in the pre-processing buffer 111. The processes include rearrangement of the frames, generation of metadata, setting of blocks, and the like. When the pre-processing ends, the image data and various pieces of information associated with encoding are supplied to various processing units. For example, the image data is supplied to the computing unit 113, the intra prediction unit 123, and the inter prediction unit 124. Further, the metadata and the like are supplied to the encoding unit 116 and other processing units.

The computing unit 113 subtracts a predicted image from the image read from the pre-processing buffer 111. The predicted image has been supplied from the intra prediction unit 123 or the inter prediction unit 124 through the predicted image selecting unit 125. The computing unit 113 then obtains residual information (also referred to as residual data), which is the difference between the image and the predicted image. For example, in the case of the image on which intra encoding is performed, the computing unit 113 subtracts the predicted image, which has been supplied from the intra prediction unit 123, from the image read from the pre-processing buffer 111. Further, for example, in the case of the image on which inter encoding is performed, the computing unit 113 subtracts the predicted image, which has been supplied from the inter prediction unit 124, from the image read from the pre-processing buffer 111. The computing unit 113 supplies the obtained residual data to the orthogonal transform unit 114.

Using a predetermined method, the orthogonal transform unit 114 performs orthogonal transform on the residual data supplied from the computing unit 113. The orthogonal transform unit 114 supplies, to the quantization unit 115, the residual data (also referred to as an orthogonal transform coefficient) on which the orthogonal transform has been performed.

The quantization unit 115 quantizes the orthogonal transform coefficient using a predetermined method. The quantization unit 115 sets a quantization parameter according to the target value (target_bitrate) of the amount of codes supplied from the rate control unit 126, and performs quantization. The quantization unit 115 supplies the quantized residual data (also referred to as quantized data) to the encoding unit 116 and the inverse quantization unit 118.

The encoding unit 116 encodes the quantized data supplied from the quantization unit 115. Further, the encoding unit 116 obtains information associated with an optimal prediction mode from the predicted image selecting unit 125. In addition, the encoding unit 116 is capable of obtaining arbitrary information from arbitrary processing units. The encoding unit 116 encodes these various pieces of information. In this manner, the encoding unit 116 encodes the information associated with the image and generates encoded data. The encoding unit 116 supplies the obtained encoded data to the accumulation buffer 117, causing the accumulation buffer 117 to accumulate the encoded data.

The accumulation buffer 117 temporarily stores the encoded data supplied from the encoding unit 116. The accumulation buffer 117 outputs the stored encoded data to the outside of the image encoding device 100 as a bitstream, for example, at a predetermined timing. For example, this encoded data is transmitted to a decoding side through an arbitrary recording medium, an arbitrary transmission medium, an arbitrary information processing device, or the like. In other words, the accumulation buffer 117 also serves as a transmission unit that transmits the encoded data.

The inverse quantization unit 118 performs inverse quantization on the quantized data using a method corresponding to the quantization performed by the quantization unit 115. The inverse quantization unit 118 supplies, to the inverse orthogonal transform unit 119, the quantized data (also referred to as an orthogonal transform coefficient) on which the inverse quantization has been performed.

The inverse orthogonal transform unit 119 performs inverse orthogonal transform on the orthogonal transform coefficient using a method corresponding to the orthogonal transform process performed by the orthogonal transform unit 114. The inverse orthogonal transform unit 119 supplies, to the computing unit 120, the orthogonal transform coefficient (also referred to as a restored residual data) on which the inverse orthogonal transform has been performed.

The computing unit 120 adds, to the restored residual data, the predicted image supplied from the intra prediction unit 123 or the inter prediction unit 124 through the predicted image selecting unit 125. The computing unit 120 then obtains a locally reconstructed image (also referred to as a reconstructed image). For example, in the case of the image on which intra encoding is performed, the computing unit 120 adds the predicted image supplied from the intra prediction unit 123 to the restored residual data. Further, for example, in the case of the image on which inter encoding is performed, the computing unit 120 adds the predicted image supplied from the inter prediction unit 124 to the restored residual data. The computing unit 120 supplies the obtained reconstructed image to the filter 121 and intra prediction unit 123.

The filter 121 performs a filtering process such as, for example, the deblocking filter, on the reconstructed image as appropriate. The filter 121 supplies the result of the filtering process (referred to as a decoded image) to the frame memory 122.

The frame memory 122 stores the decoded image in a storage area of the frame memory 122 itself. Further, the frame memory 122 supplies the stored decoded image to the inter prediction unit 124 as a reference image at a predetermined timing.

The intra prediction unit 123 performs the intra prediction (intra-screen prediction) that generates a predicted image using pixel values in the picture to be processed. The picture to be processed is the reconstructed image supplied from the computing unit 120 as the reference image. For example, the intra prediction unit 123 performs such intra prediction in a plurality of intra prediction modes (e.g., DC prediction, horizontal prediction, vertical prediction) provided in advance. The intra prediction unit 123 generates predicted images in all the candidate intra prediction modes to select an optimal mode. After the intra prediction unit 123 selects the optimal intra prediction mode, the intra prediction unit 123 supplies the predicted image generated in the optimal intra prediction mode, intra prediction mode information, and the like to the predicted image selecting unit 125 as the information associated with the prediction result. The intra prediction mode information is information associated with the intra prediction such as an index indicating the optimal intra prediction mode.

The inter prediction unit 124 performs the inter prediction process (a motion prediction process and a compensation process) using the input image supplied from the pre-processing buffer 111 and the reference image supplied from the frame memory 122. More specifically, as the inter prediction process, the inter prediction unit 124 performs the motion compensation process according to a motion vector detected by performing the motion prediction. The inter prediction unit 124 then generates a predicted image (inter predicted image information). For example, the inter prediction unit 124 performs such inter prediction in a plurality of inter prediction modes provided in advance. The inter prediction unit 124 generates predicted images in all the candidate inter prediction modes to select an optimal mode. After the inter prediction unit 124 selects the optimal inter prediction mode, the inter prediction unit 124 supplies the predicted image generated in the optimal inter prediction mode, inter prediction mode information, and the like to the predicted image selecting unit 125 as the information associated with the prediction result. The inter prediction mode information is information associated with the inter prediction such as an index indicating the optimal inter prediction mode and motion information.

The predicted image selecting unit 125 obtains the above-described pieces of information associated with the prediction results from the intra prediction unit 123 and the inter prediction unit 124. The predicted image selecting unit 125 selects either one of the pieces of information associated with the prediction results to select the prediction mode in the area. Specifically, the predicted image selecting unit 125 selects either one of the (optimal) intra prediction mode and the (optimal) inter prediction mode as the optimal prediction mode. The predicted image selecting unit 125 supplies the predicted image in the selected mode to the computing unit 113 and the computing unit 120. Further, the predicted image selecting unit 125 supplies part or all of the pieces of the information associated with the prediction result that has been selected to the encoding unit 116 as the information associated with the optimal prediction mode, causing the encoding unit 116 to store the information in the encoded data.

In order to prevent overflow or underflow from occurring, the rate control unit 126 controls the rate of the quantization operation being performed by the quantization unit 115 on the basis of the amount of codes of the encoded data accumulated in the accumulation buffer 117.

<Pre-Processing Unit>

Figure 12:
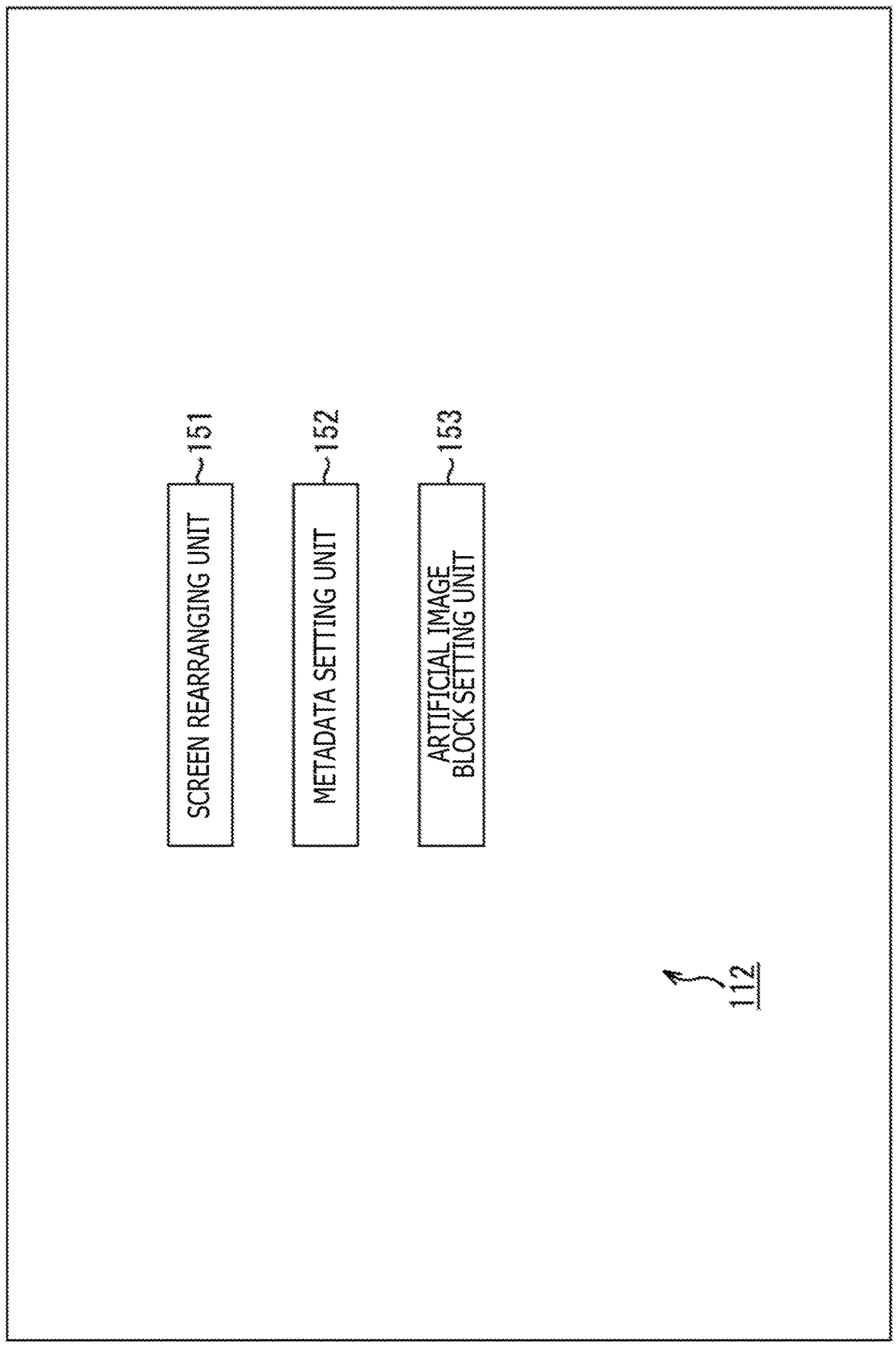
FIG. 12 is a block diagram illustrating an example of a main configuration of a pre-processing unit.

FIG. 12 is a block diagram illustrating an example of a main configuration of the pre-processing unit 112. As illustrated in FIG. 12, the pre-processing unit 112 includes a screen rearranging unit 151, a metadata setting unit 152, and an artificial image block setting unit 153.

The screen rearranging unit 151 rearranges the order of each frame of the image data stored in display order in the pre-processing buffer 111 into the encoding order on the basis of the Group Of Pictures (GOP). The metadata setting unit 152 generates metadata such as, for example, a Video Parameter Set (VPS), a Sequence Parameter Set (SPS), a Picture Parameter Set (PPS), and a slice header. It is noted that the metadata set by the metadata setting unit 152 is arbitrary and is not limited to these examples. The metadata setting unit 152 supplies the set metadata to an arbitrary processing unit such as, for example, the encoding unit 116.

In an artificial image mode, the artificial image block setting unit 153 performs the block setting on a current picture, which is a process target of the image data of the artificial image stored in the pre-processing buffer 111. The artificial image is different from a normal image such as a natural image. For example, as the artificial image mode, the artificial image block setting unit 153 sets the size of the current block for the prediction process according to the size of a peripheral block situated on the periphery of the current block. The prediction process is to generate a predicted image of the image to be encoded. For example, the artificial image block setting unit 153 regards the upper block adjacent to the top of the current block and the left block adjacent to the left of the current block as the peripheral blocks of the current block, and sets the size of the current block according to the size of the upper block and the size of the left block.

Figure 13:
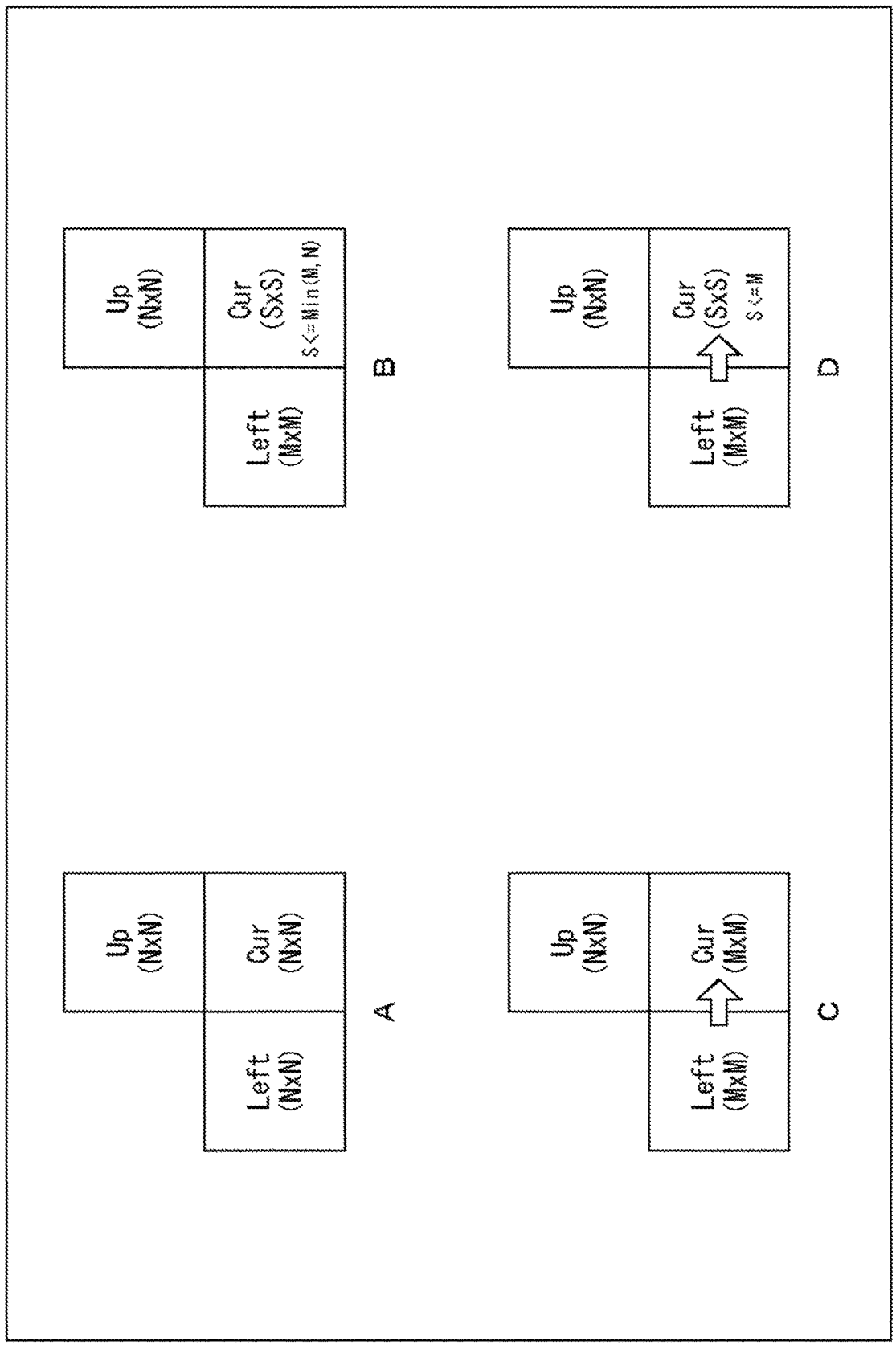
FIG. 13 is a diagram illustrating examples of how a block setting is made.

For example, as illustrated in A of FIG. 13, in a case where the size (N×N) of the upper block (Up) adjacent to the top of the current block (Cur) and the size (N×N) of the left block (Left) adjacent to the left of the current block (Cur) are identical to each other, the artificial image block setting unit 153 may set the size of the current block (Cur) to be identical to the size (N×N) of each of the upper block (Up) and the left block (Left) (that is, N×N).

Further, as illustrated in B of FIG. 13, for example, in a case where the size (N×N) of the upper block (Up) and the size (M×M) of the left block (Left) are not identical to each other, the artificial image block setting unit 153 may set the size (S×S) of the current block (Cur) to be equal to or smaller than the size of one of these blocks that is smaller in size than the other of these blocks (that is, S<=Min(M, N)).

Further, for example, the artificial image block setting unit 153 may set the size of the current block (Cur) to be identical to the size of a reference block whose pixel values are referred to. For example, as illustrated in C of FIG. 13, in a case where the left block (Left) is the reference block, the artificial image block setting unit 153 may set the size of the current block (Cur) to be identical to the size (M×M) of the left block (Left) (that is, M×M).

Further, as illustrated in D of FIG. 13, for example, in a case where the left block (Left) is the reference block, the artificial image block setting unit 153 may set the size (S×S) of the current block (Cur) to be equal to or smaller than the size (M×M) of the left block (Left) (that is, S<=M).

The block setting method in the artificial image mode is arbitrary as long as the block setting method is based on the size of the peripheral block. One of the four exemplary methods described above may be applied, or a method other than the above-described four exemplary methods may be applied. Further, a plurality of methods may be set as candidates and one of these methods may be selected and applied according to the situation. The selection may be made on the basis of, for example, the block size or the reference direction. It is noted that as long as the peripheral block is a block that has been processed (encoded), the peripheral block may be a block other than the upper block and the left block described above. For example, the peripheral block may be a block adjacent to the current block in the diagonal direction or may be a block that is not adjacent to the current block.

In the case of the HEVC standard, the block setting is performed on the basis of the numerical performance such as RD costs. In the case of the image encoding device 100 illustrated in FIG. 11, the artificial image block setting unit 153 sets the size of the current block on the basis of the size of the peripheral block, as described above. By aligning the size of the block to the size of the peripheral block, for example, the image encoding device 100 is capable of preventing the change in pixel values (deterioration in image quality) from propagating, thereby suppressing a decrease in subjective image quality of the decoded image.

<Flow of Image Encoding Process>

Next, processes executed by the image encoding device 100 will be described. First, an example of the flow of the image encoding process will be described with reference to the flowchart in FIG. 14. The image encoding process is executed when the image encoding device 100 encodes an artificial image.

When the image encoding process starts, in step S101, the pre-processing unit 112 performs pre-processing on image data of an artificial image that has been input in the image encoding device 100 and stored in the pre-processing buffer 111.

In step S102, the intra prediction unit 123, the inter prediction unit 124, and the predicted image selecting unit 125 perform the respective prediction processes to generate a predicted image and the like in an optimal prediction mode. Specifically, in this prediction process, the intra prediction unit 123 performs intra prediction to generate a predicted image and the like in an optimal intra prediction mode. The inter prediction unit 124 performs inter prediction to generate a predicted image and the like in an optimal inter prediction mode. Of these prediction modes, the predicted image selecting unit 125 selects a more optimal prediction mode than the other.

In step S103, the computing unit 113 calculates the difference between the artificial image, which is the input image, and the predicted image in the optimal mode selected by the prediction process in step S102. That is, the computing unit 113 generates residual data between the input image and the predicted image. Compared to the original image data, the residual data obtained in this manner has decreased amount of data. This can achieve, therefore, compression of the amount of data compared to the case where the image is encoded as it is.

In step S104, the orthogonal transform unit 114 performs orthogonal transform on the residual data generated through the process in step S103.

In step S105, using the quantization parameter and the like calculated by the rate control unit 126, the quantization unit 115 quantizes the orthogonal transform coefficient obtained through the process in step S104.

In step S106, using the characteristics corresponding to the characteristics of the quantization performed in step S105, the inverse quantization unit 118 performs inverse quantization on the quantized data generated through the process in step S105.

In step S107, using a method corresponding to the orthogonal transform performed in step S104, the inverse orthogonal transform unit 119 performs inverse orthogonal transform on the orthogonal transform coefficient obtained through the process in step S106.

In step S108, the computing unit 120 adds the predicted image obtained through the prediction process in step S102 to the residual data restored through the process in step S107 to generate image data of a reconstructed image.

In step S109, the filter 121 performs a filtering process such as a deblocking filter on the image data of the reconstructed image that has been generated through the process in step S108.

In step S110, the frame memory 122 stores the decoded image that has been locally decoded and obtained through the process in step S109.

In step S111, the encoding unit 116 encodes the quantized residual data obtained through the process in step S105. For example, the encoding unit 116 performs Context-based Adaptive Binary Arithmetic Code (CABAC) on the quantized residual data to generate encoded data. Further, the encoding unit 116 encodes the metadata generated through the process in step S101 and adds the metadata to the encoded data. In addition, the encoding unit 116 encodes information associated with the quantization, information associated with the prediction, and the like, as appropriate, and adds these pieces of information to the encoded data.

In step S112, the accumulation buffer 117 accumulates the encoded data and the like obtained through the process in step S111. The encoded data and the like accumulated in the accumulation buffer 117 are read as, for example, a bitstream, as appropriate, and transmitted to a decoding side through a transmission path or a recording medium.

In step S113, the rate control unit 126 controls the rate of the quantization process in step S105 on the basis of the amount of codes of the encoded data (the amount of codes generated) and the like accumulated in the accumulation buffer 117 through the process in step S112. This is to prevent overflow or underflow from occurring.

When the process in step S113 ends, the image encoding process ends.

It is noted that the unit of processing for each of these processes is arbitrary and not necessarily identical among the processes. Therefore, the process at each step can be executed in parallel with the process at another step or can be executed in different process order, as appropriate.

<Flow of Pre-Processing>

Figure 14:
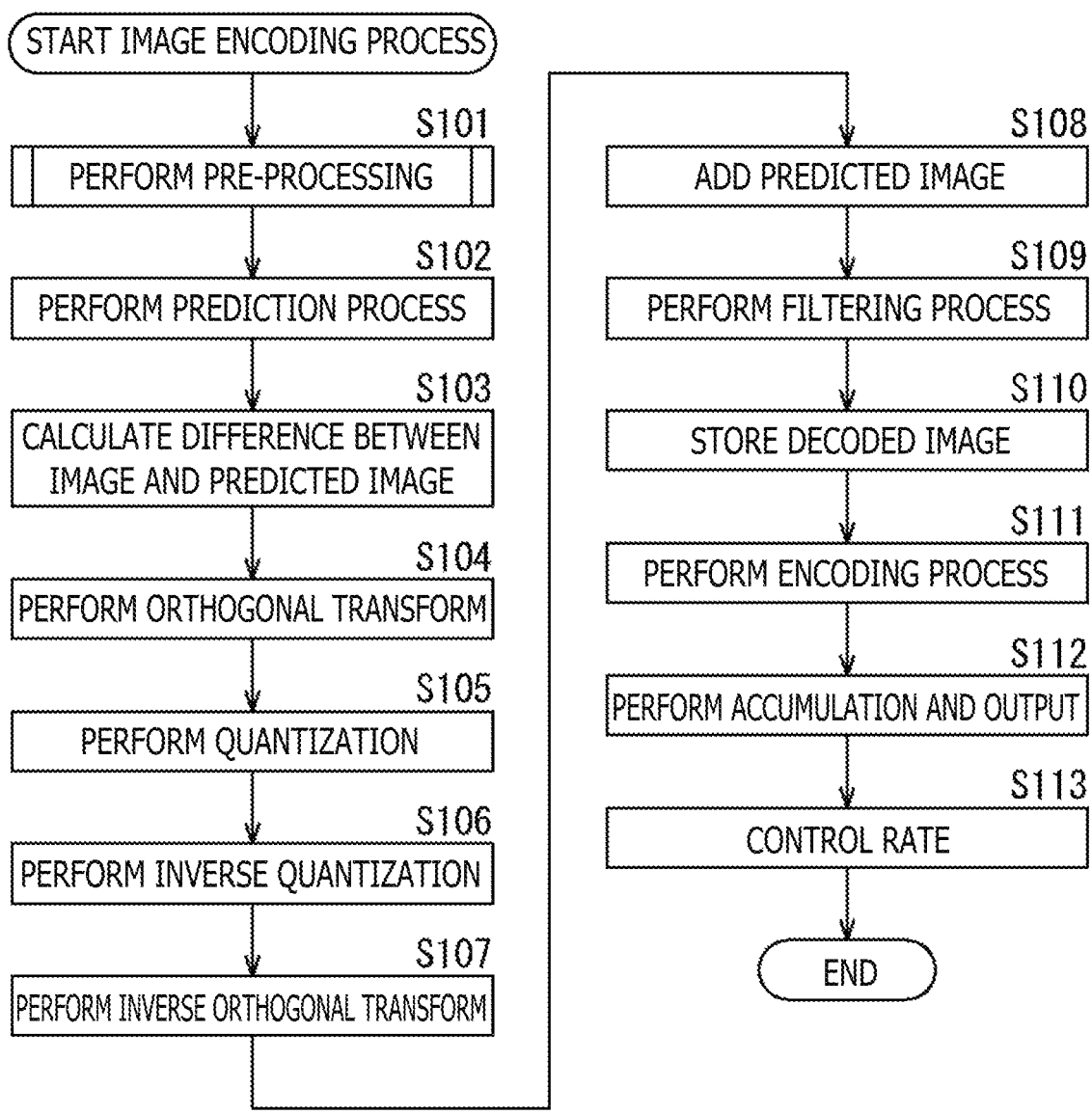
FIG. 14 is a flowchart describing an example of a flow of an image encoding process.
Figure 15:
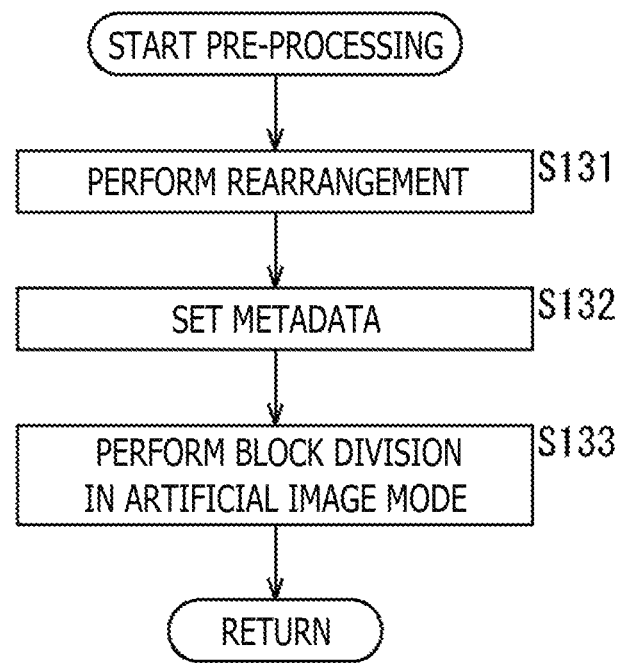
FIG. 15 is a flowchart describing an example of a pre-processing flow.

Next, an example of the flow of the pre-processing executed in step S101 in FIG. 14 will be described with reference to the flowchart of FIG. 15. When the pre-processing starts, in step S131, the screen rearranging unit 151 rearranges the frames of the image data stored in the pre-processing buffer 111 from the display order into the encoding order.

In step S132, the metadata setting unit 152 sets various metadata.

In step S133, the artificial image block setting unit 153 performs block division in the artificial image mode. Information associated with each divided block is supplied to arbitrary processing units, as appropriate. The processing units supplied with the information perform the respective processes on the basis of the block division.

When the process in step S133 ends, the pre-processing ends. The process returns to the processes in FIG. 14.

By performing each process as described above, the image encoding device 100 is capable of encoding the artificial image so as to suppress propagation of deterioration in image quality caused by the boundary filtering process. In other words, the image encoding device 100 is capable of suppressing a decrease in subjective image quality of the decoded image.

2. Second Embodiment

<Determination of Artificial Image>

While in the first embodiment, it is assumed that an artificial image is input into the image encoding device 100, the image encoding device 100 may identify the artificial image.

<Pre-Processing Unit>

Figure 16:
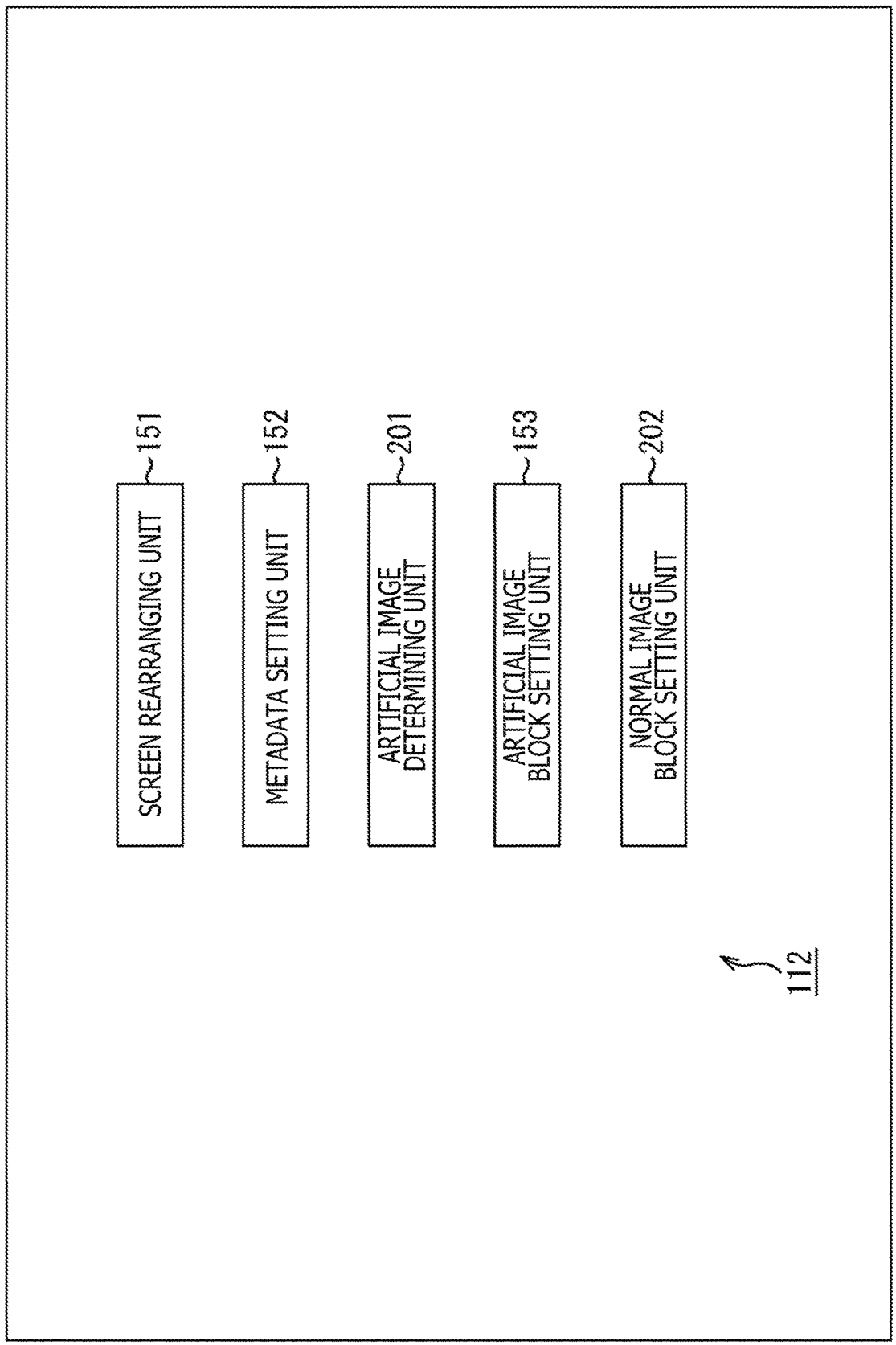
FIG. 16 is a block diagram illustrating an example of a main configuration of a pre-processing unit.

In this case as well, the configuration of the image encoding device 100 is basically similar to the configuration (FIG. 11) in the first embodiment. However, an example of the main configuration of a pre-processing unit 112 for this case is illustrated in FIG. 16. In this case, the pre-processing unit 112 further includes an artificial image determining unit 201 and a normal image block setting unit 202, in addition to the configuration (FIG. 12) described in the first embodiment.

The artificial image determining unit 201 determines whether or not the input image is an artificial image. This determination method is arbitrary. For example, the artificial image determination may be made on the basis of, for example, user specification. Specifically, in a case where the user or the like specifies that "the input image is an artificial image," the artificial image determining unit 201 may determine that the input image is an artificial image. In a case where there is no user specification or the like, the artificial image determining unit 201 may determine that the input image is a normal image such as a natural image.

Further, the artificial image determination may be made on the basis of, for example, whether or not a monotonic increase or a monotonic decrease in pixel values occurs in the horizontal direction or the vertical direction. Specifically, the artificial image determining unit 201 may calculate the difference in pixel values between adjacent pixels in each of the horizontal direction (i.e., pixel rows) and the vertical direction (i.e., pixel columns), and determine whether or not the monotonic increase or the monotonic decrease in pixel values occurs on the basis of the difference. On the basis of the result of the determination, the artificial image determining unit 201 may make the artificial image determination. For example, in a case where the artificial image determining unit 201 determines that the monotonic increase or the monotonic decrease in pixel values occurs, the artificial image determining unit 201 may determine that the input image is an artificial image. In a case where the artificial image determining unit 201 determines that the monotonic increase or the monotonic decrease in pixel values does not occur, the artificial image determining unit 201 may determine that the input image is a normal image. It is noted that the determination criterion is not necessarily the monotonic increase or the monotonic decrease in pixel values. For example, in a case where a predetermined repetition pattern is observed in the pixel values in the pixel columns or the pixel rows, the artificial image determining unit 201 may determine that the input image is an artificial image.

In addition, for example, the artificial image determination may be made on the basis of high-frequency components in the orthogonal transform coefficient obtained through the orthogonal transform such as the Discrete Cosine Transform (DCT) or the Hadamard Transform that has been performed on the input image (residual data). For example, in a case where the number of high-frequency components in the orthogonal transform coefficient is smaller than a predetermined criterion (e.g., a predetermined threshold), the artificial image determining unit 201 may determine that the input image is an artificial image. In a case where the number of high-frequency components in the orthogonal transform coefficient is equal to or greater than the predetermined criterion, the artificial image determining unit 201 may determine that the input image is a normal image.

Further, for example, dispersion of the pixel values of the input image may be calculated, and the artificial image determination may be made on the basis of the level of the variation. For example, in a case where the variation of the pixel values of the input image is less than a predetermined criterion (e.g., a predetermined threshold), the artificial image determining unit 201 may determine that the input image is an artificial image. In a case where the variation of the pixel values of the input image is equal to or greater than the predetermined criterion, the artificial image determining unit 201 may determine that the input image is a normal image.

Needless to say, a method other than these methods may be used to determine the input image. Further, a plurality of methods may be used in combination. For example, in a case where even one of the plurality of methods determines that the input image is an artificial image, the input image may be determined to be an artificial image. Further, in a case where a predetermined number or more of the plurality of methods determine that the input image is an artificial image, the input image may be determined to be an artificial image. In addition, each method may be weighted. Further, the weights may be variable. For example, the weights may be updated according to the situation or may be updated on the basis of, for example, the history of the determination.

On the basis of the numerical performance such as RD costs, the normal image block setting unit 202 performs the block setting on the input image determined to be a normal image. That is, the normal image block setting unit 202 sets blocks using a method similar to the HEVC standard.

<Flow of Pre-Processing>

Figure 17:
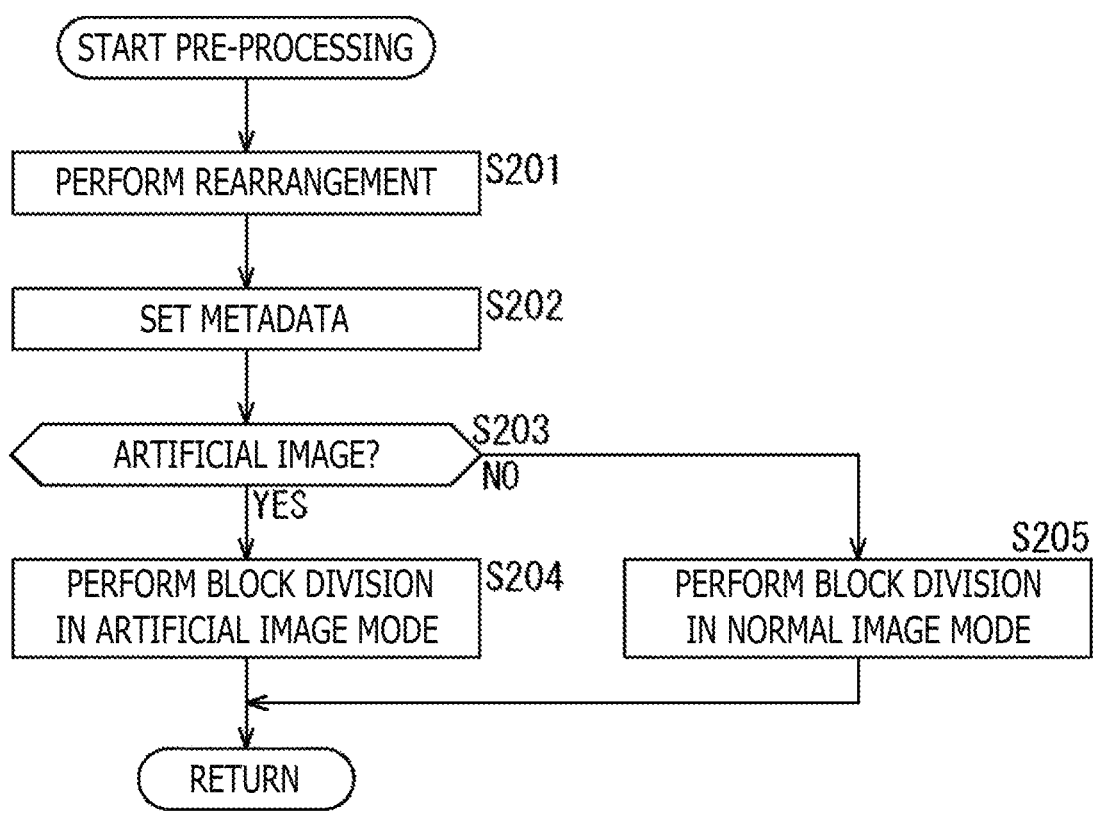
FIG. 17 is a flowchart describing an example of a pre-processing flow.

In this case as well, the image encoding device 100 performs the image encoding process (FIG. 14) in a similar manner to the first embodiment. An example of the flow of the pre-processing executed in step S101 in FIG. 14 for this case will be described with reference to the flowchart in FIG. 17. When the pre-processing starts, the processes in step S201 and step S202 are executed in a similar manner to the processes in step S131 and step S132 in FIG. 15, respectively.

In step S203, the artificial image determining unit 201 determines whether or not the input image is an artificial image. In a case where the input image is determined to be an artificial image, the process proceeds to step S204.

In step S204, the artificial image block setting unit 153 divides the input image, which has been determined to be an artificial image, into blocks in the artificial image mode. Information associated with each divided block is supplied to arbitrary processing units, as appropriate. The processing units supplied with the information perform the respective processes on the basis of the block division. When the process in step S204 ends, the pre-processing ends. The process returns to the processes in FIG. 14.

Further, in a case where the input image is determined to be a normal image in step S203, the process proceeds to step S205.

In step S205, the normal image block setting unit 202 divides the input image, which has been determined to be a normal image, into blocks in the normal image mode. That is, the blocks are set on the basis of the numerical performance such as RD costs. Information associated with each divided block is supplied to arbitrary processing units, as appropriate. The processing units supplied with the information perform the respective processes on the basis of the block division. When the process in step S205 ends, the pre-processing ends. The process returns to the processes in FIG. 14.

By performing each process as described above, the image encoding device 100 is capable of appropriately performing block division depending on whether or not the input image is an artificial image. Therefore, in a case where the input image is an artificial image, the image encoding device 100 is capable of suppressing a decrease in subjective image quality of the decoded image. In a case where the input image is a normal image, the image encoding device 100 is capable of suppressing an unnecessary decrease in encoding efficiency.

3. Third Embodiment

<Determination of Artificial Image Area>

In the description given in the second embodiment, the image encoding device 100 determines whether or not an input image is an artificial image. However, it is also possible that a part of the input image is an artificial image. Specifically, the image encoding device 100 may be capable of detecting an artificial image area included in the input image and performing block division corresponding to the characteristics of the image for each detected area.

<Pre-Processing Unit>

Figure 18:
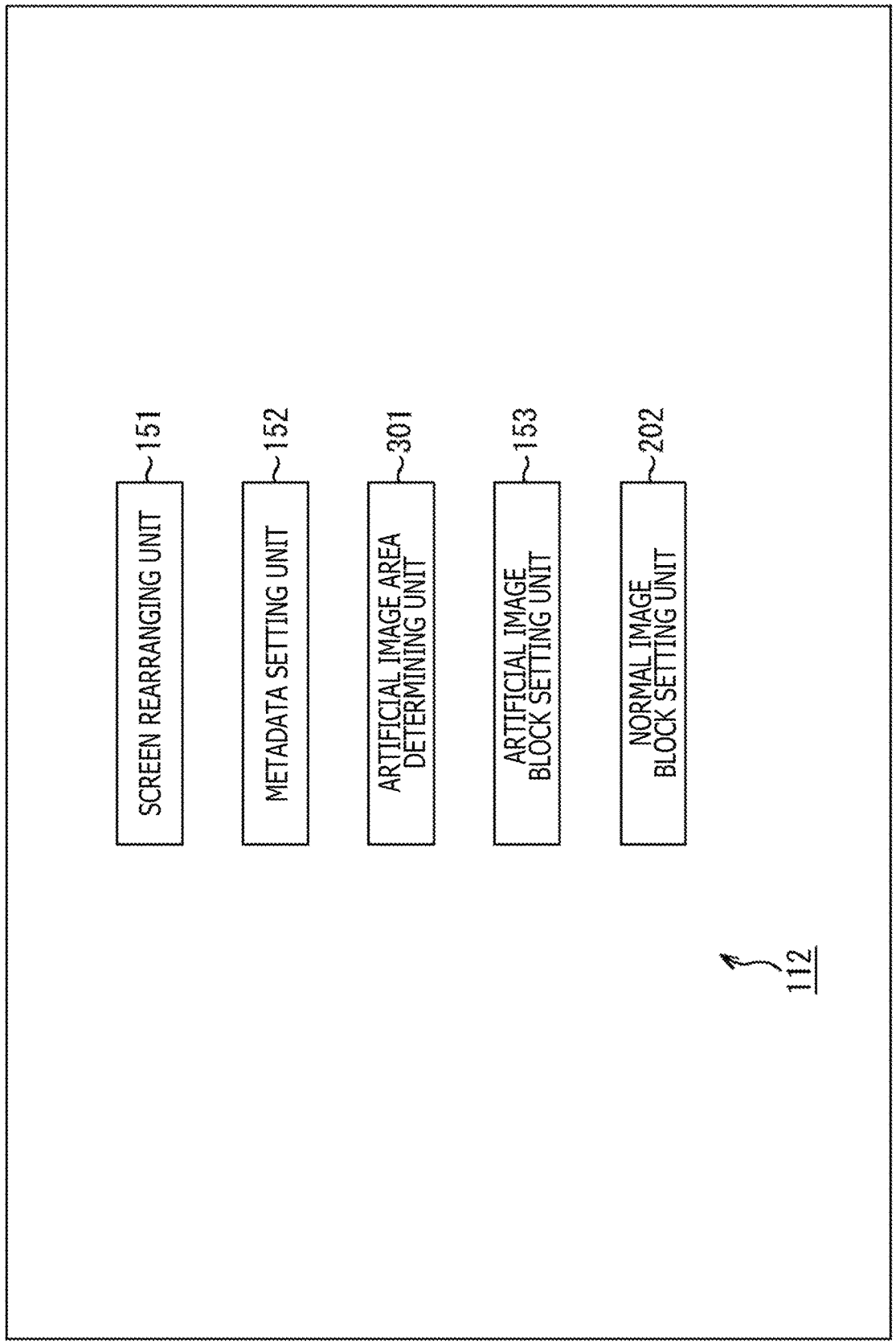
FIG. 18 is a block diagram illustrating an example of a main configuration of a pre-processing unit.

In this case as well, the configuration of the image encoding device 100 is basically similar to the configuration (FIG. 11) in the first embodiment. However, an example of the main configuration of a pre-processing unit 112 for this case is illustrated in FIG. 18. In this case, the pre-processing unit 112 includes an artificial image area determining unit 301, instead of the artificial image determining unit 201 in the configuration (FIG. 16) described in the second embodiment.

The artificial image area determining unit 301 detects a partial area (also referred to as an artificial image area) constituted by an artificial image in the input image (each frame). The method of determining (detecting) the artificial image area is arbitrary. For example, the artificial image area may be determined on the basis of, for example, user specification. Specifically, the artificial image area determining unit 301 may determine that the partial area specified by the user or like as "artificial image area" is the artificial image area, and determine that the other area is an area (normal image area) constituted by a normal image such as a natural image.

Further, the artificial image area may be determined on the basis of, for example, whether or not a monotonic increase or a monotonic decrease in pixel values occurs in the horizontal direction or the vertical direction. For example, the artificial image area determining unit 301 may calculate the difference in pixel values between adjacent pixels in each of the horizontal direction (i.e., pixel rows) and the vertical direction (i.e., pixel columns), and determine the artificial image area on the basis of the difference, that is, whether or not the monotonic increase or the monotonic decrease in pixel values occurs. That is, the artificial image area determining unit 301 may determine that the area having being determined that the monotonic increase or the monotonic decrease in pixel values occurs therein is the artificial image area, and determine that the area having been determined that the monotonic increase or the monotonic decrease in pixel values does not occur therein is a normal image. It is noted that the determination criterion is not necessarily the monotonic increase or the monotonic decrease in pixel values. For example, in a case where a predetermined repetition pattern is observed in the pixel values in the pixel columns or the pixel rows, the artificial image area determining unit 301 may determine that the area is the artificial image area.

In addition, for example, the artificial image area may be determined on the basis of high-frequency components in the orthogonal transform coefficient obtained through the orthogonal transform such as the Discrete Cosine Transform (DCT) or the Hadamard Transform that has been performed on the input image (residual data). For example, the artificial image area determining unit 301 may determine that the area in which the number of high-frequency components in the orthogonal transform coefficient is smaller than a predetermined criterion (e.g., a predetermined threshold) is an artificial image, and determine that the area in which the number of high-frequency components in the orthogonal transform coefficient is equal to or greater than the predetermined criterion is a normal image.

Further, for example, the dispersion of the pixel values of the input image may be calculated, and the artificial image area may be determined on the basis of the level of the variation. For example, the artificial image area determining unit 301 may determine that the area in which the variation of the pixel values is less than a predetermined criterion (e.g., a predetermined threshold) is an artificial image, and determine that the area in which the variation of the pixel values is equal to or greater than the predetermined criterion is a normal image.

Needless to say, a method other than these methods may be used to determine the input image. Further, a plurality of methods may be used in combination. For example, the area determined to be the artificial image area by even one of the plurality of methods may be determined to be an artificial image area. Further, the area determined to be the artificial image area by a predetermined number or more of the plurality of methods may be determined to be the artificial image area. In addition, each method may be weighted. Further, the weights may be variable. For example, the weights may be updated according to the situation or may be updated on the basis of, for example, the history of the determination.

It is noted that the area determination may be made for each partial area in a predetermined size that has been determined in advance. That is, the artificial image area determining unit 301 may determine whether or not each partial area is the artificial image area. Further, the area determination may be made for each pixel. That is, the artificial image area determining unit 301 may identify whether each pixel belongs to the artificial image area or the normal image area. It is noted that for example, the areas of the current frame to be processed may be determined using the area determination result of a frame processed in the past such as a previous frame (also referred to as a past frame). For example, the area determination result of the past frame may be used as an initial value for the area determination.

<Flow of Pre-Processing>

Figure 19:
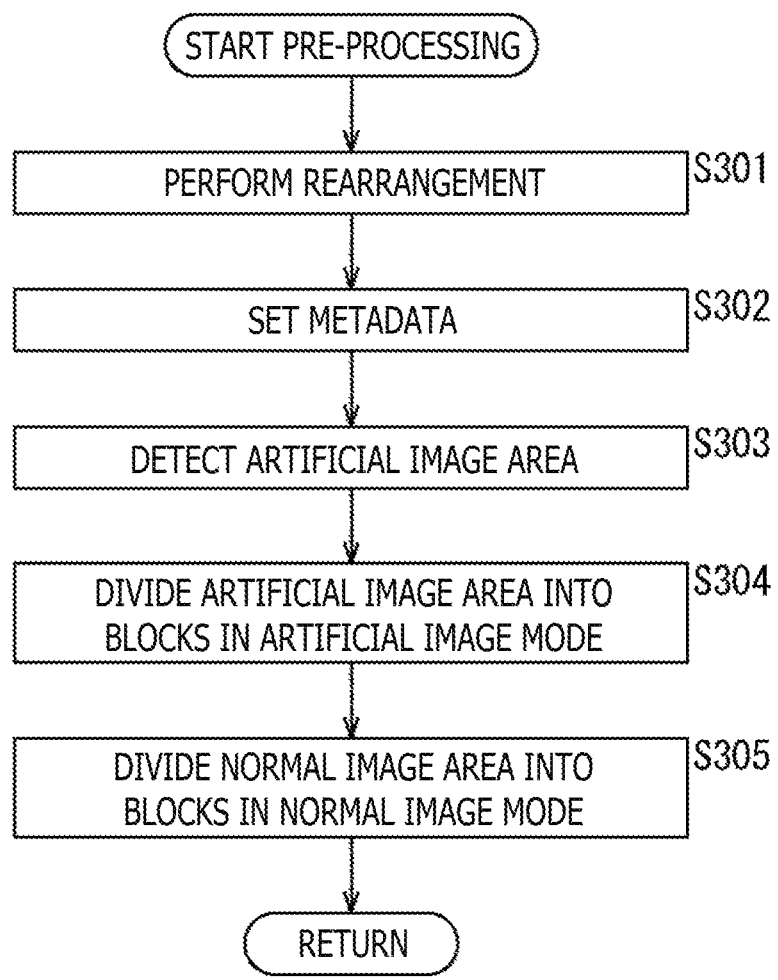
FIG. 19 is a flowchart describing an example of a pre-processing flow.

In this case as well, the image encoding device 100 performs the image encoding process (FIG. 14) in a similar manner to the first embodiment. An example of the flow of the pre-processing executed in step S101 in FIG. 14 for this case will be described with reference to the flowchart in FIG. 19. When the pre-processing starts, the processes in step S301 and step S302 are executed in a similar manner to the processes in step S131 and step S132 in FIG. 15, respectively.

In step S303, the artificial image area determining unit 301 detects the artificial image area in the current frame of the input image. That is, the artificial image area determining unit 301 divides the current frame into the artificial image area and the area (normal image area) other than the artificial image area.

In step S304, the artificial image block setting unit 153 divides the area determined to be the artificial image area into blocks in the artificial image mode. Specifically, the artificial image block setting unit 153 sets the size of the current block in the artificial image area included in the current frame of the input image according to the size of the peripheral block.

In step S305, the normal image block setting unit 202 divides the area determined to be the normal image area into blocks in the normal image mode. Specifically, the artificial image block setting unit 153 sets the size of the current block in the normal image area included in the current frame of the input image on the basis of the numerical performance such as RD costs.

When the process in step S305 ends, the pre-processing ends. The process returns to the processes in FIG. 14.

By performing each process as described above, even in a case where the frame of the input image is a mixture of the artificial image (area) and the normal image (area), the image encoding device 100 is capable of appropriately dividing each area into blocks. Therefore, the image encoding device 100 is capable of suppressing a decrease in subjective image quality of the decoded image, while suppressing a decrease in encoding efficiency.

4. Fourth Embodiment

<Units of Data of Information>

Units of data in which the information associated with the image and the information associated with image encoding/decoding described above are set (or units of data of target data) are each arbitrary and not limited to the examples described above. For example, each of these pieces of information may be set per TU, TB, PU, PB, CU, LCU, sub-block, block, tile, slice, picture, sequence, or component, or the data in these units of data may be targeted. Needless to say, the unit of data is set for each pieces of information. In other words, all the pieces of information may not necessarily be set (or targeted) per identical unit of data. It is noted that these pieces of information may be stored in arbitrary places, and may be stored in headers, parameter sets, or the like of the respective units of data described above. Further, these pieces of information may be stored in a plurality of places.

<Encoding>

The present technology can be applied to arbitrary image encoding in which intra prediction is performed. That is, the specifications of the transform (inverse transform), quantization (inverse quantization), encoding, inter prediction, filtering process, and the like are arbitrary and are not limited to the examples described above. Further, part or all of these processes may be omitted.

<Fields of Application of Present Technology>

Systems, devices, processing units, and the like to which the present technology is applied can be used in arbitrary fields such as, for example, traffic, medical care, crime prevention, agriculture, livestock industry, mining industry, beauty, factories, home electronics, weather, and natural surveillance.

For example, the present technology can also be applied to systems and devices for transmitting images provided for viewing. Further, for example, the present technology can also be applied to systems and devices used for traffic. In addition, for example, the present technology can also be applied to systems and devices used for security. Further, for example, the present technology can also be applied to systems and devices used for sports. In addition, for example, the present technology can also be applied to systems and devices used for agriculture. Further, for example, the present technology can also be applied to systems and devices used for the livestock industry. In addition, for example, the present technology can also be applied to systems and devices used for monitoring the state of nature such as volcanoes, forests, and oceans. Further, for example, the present technology can also be applied to weather observation systems and weather observation devices used for observing weather, temperature, humidity, wind speed, daylight hours, and the like. In addition, for example, the present technology can also be applied to systems, devices, and the like used for observing the ecology of wildlife such as birds, fish, reptiles, amphibians, mammals, insects, and plants.

<Application to Multi-View Image Encoding System>

The series of processes described above can be applied to multi-view image encoding systems for encoding multi-view images including images with a plurality of viewpoints (views). In this case, the present technology may be applied to encoding of each viewpoint (view).

<Application to Hierarchical Image Encoding System>

Further, the series of processes described above can be applied to hierarchical image encoding (scalable encoding) systems for encoding hierarchical images. The hierarchical images are multi-layered (hierarchized) so as to have a scalability function for predetermined parameters. In this case, the present technology may be applied to encoding of each hierarchy (layer).

<Computer>

The series of processes described above can be executed by hardware or software. In a case where the series of processes is to be executed by software, a program constituting the software is installed in a computer. Here, examples of the computer include a computer incorporated into dedicated hardware and a general-purpose personal computer capable of executing various kinds of functions with various kinds of programs installed therein.

Figure 20:
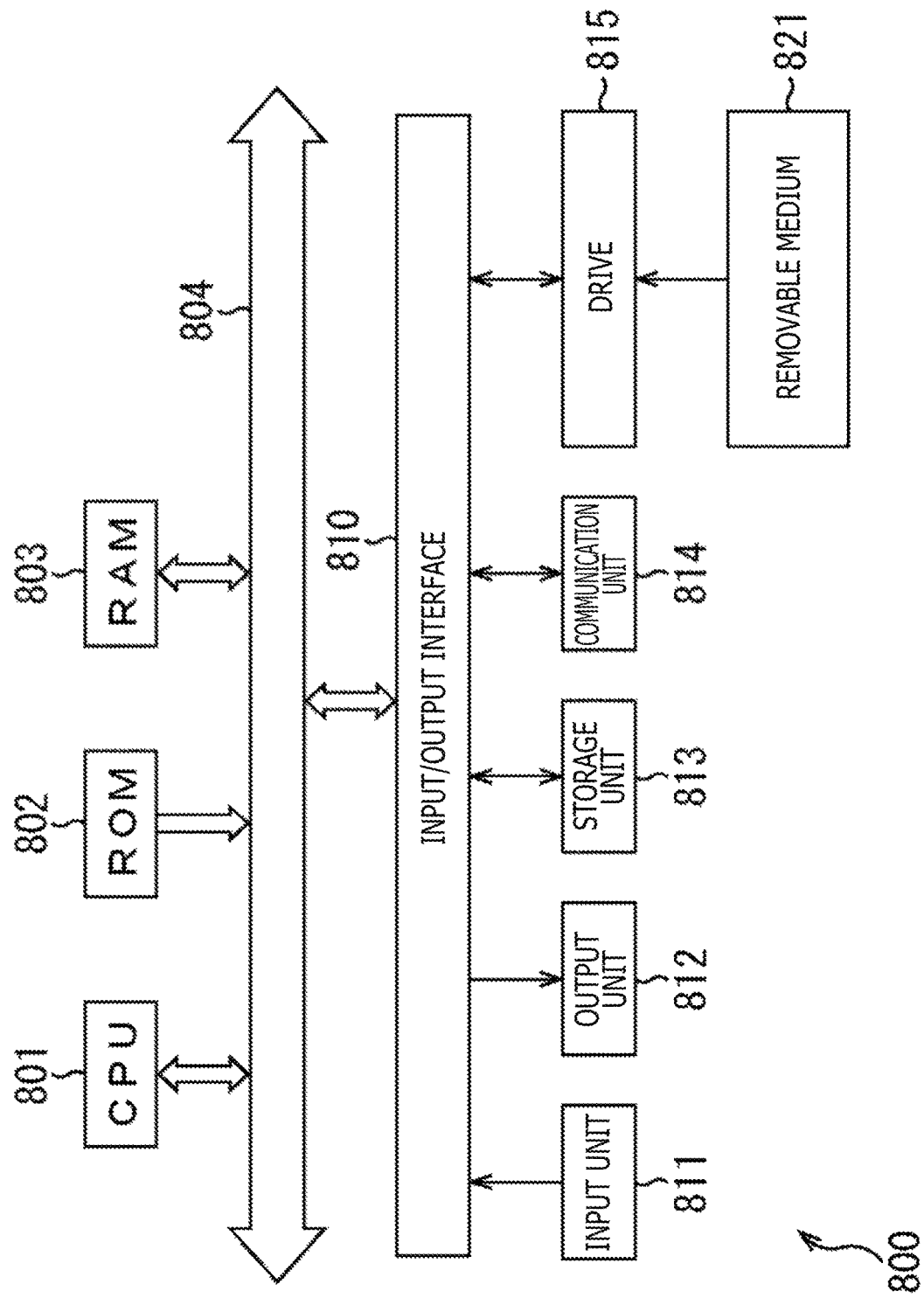
FIG. 20 is a block diagram illustrating an example of a main configuration of a computer.

FIG. 20 is a block diagram illustrating an example of the hardware configuration of the computer in which the program executes the series of processes described above.

In a computer 800 illustrated in FIG. 20, a Central Processing Unit (CPU) 801, a Read Only Memory (ROM) 802, and a Random Access Memory (RAM) 803 are connected to each other through a bus 804.

An input/output interface 810 is also connected to the bus 804. An input unit 811, an output unit 812, a storage unit 813, a communication unit 814, and a drive 815 are connected to the input/output interface 810.

The input unit 811 includes, for example, a keyboard, a mouse, a microphone, a touch panel, and an input terminal. The output unit 812 includes, for example, a display, a speaker, and an output terminal. The storage unit 813 includes, for example, a hard disk, a RAM disk, and a non-volatile memory. The communication unit 814 includes, for example, a network interface. The drive 815 drives a removable medium 821 such as a magnetic disk, an optical disk, a magneto-optical disk, and a semiconductor memory.

In the computer configured as above, for example, the CPU 801 loads the program stored in the storage unit 813 into the RAM 803 via the input/output interface 810 and the bus 804 and executes the program, through which the above-described series of processes is performed. The RAM 803 also stores data and the like necessary for the CPU 801 to execute various kinds of processes, as appropriate.

The program to be executed by the computer (CPU 801) may be recorded in, for example, the removable medium 821 serving as a package medium or the like, and applied. In this case, the program can be installed in the storage unit 813 via the input/output interface 810 by attaching the removable medium 821 to the drive 815.

Further, the program can also be provided via a wired or wireless transmission medium such as a local area network, the Internet, and digital satellite broadcasting. In this case, the program can be received by the communication unit 814 and installed in the storage unit 813.

Additionally, the program can be installed in advance in the ROM 802 or the storage unit 813.

<Application of Present Technology>

The image encoding device 100 according to the embodiments described above can be applied to various electronic devices such as, for example, transmitters and receivers, recording devices, and playback devices. The transmitters and receivers are used for, for example, satellite broadcasting, cable broadcasting such as cable TV, distribution on the Internet, and distribution to terminals via cellular communication. The recording devices record images onto a medium such as an optical disk, a magnetic disk, and a flash memory. The playback devices reproduce images from these storage media.

<First Application Example: Television Receiver>

Figure 21:
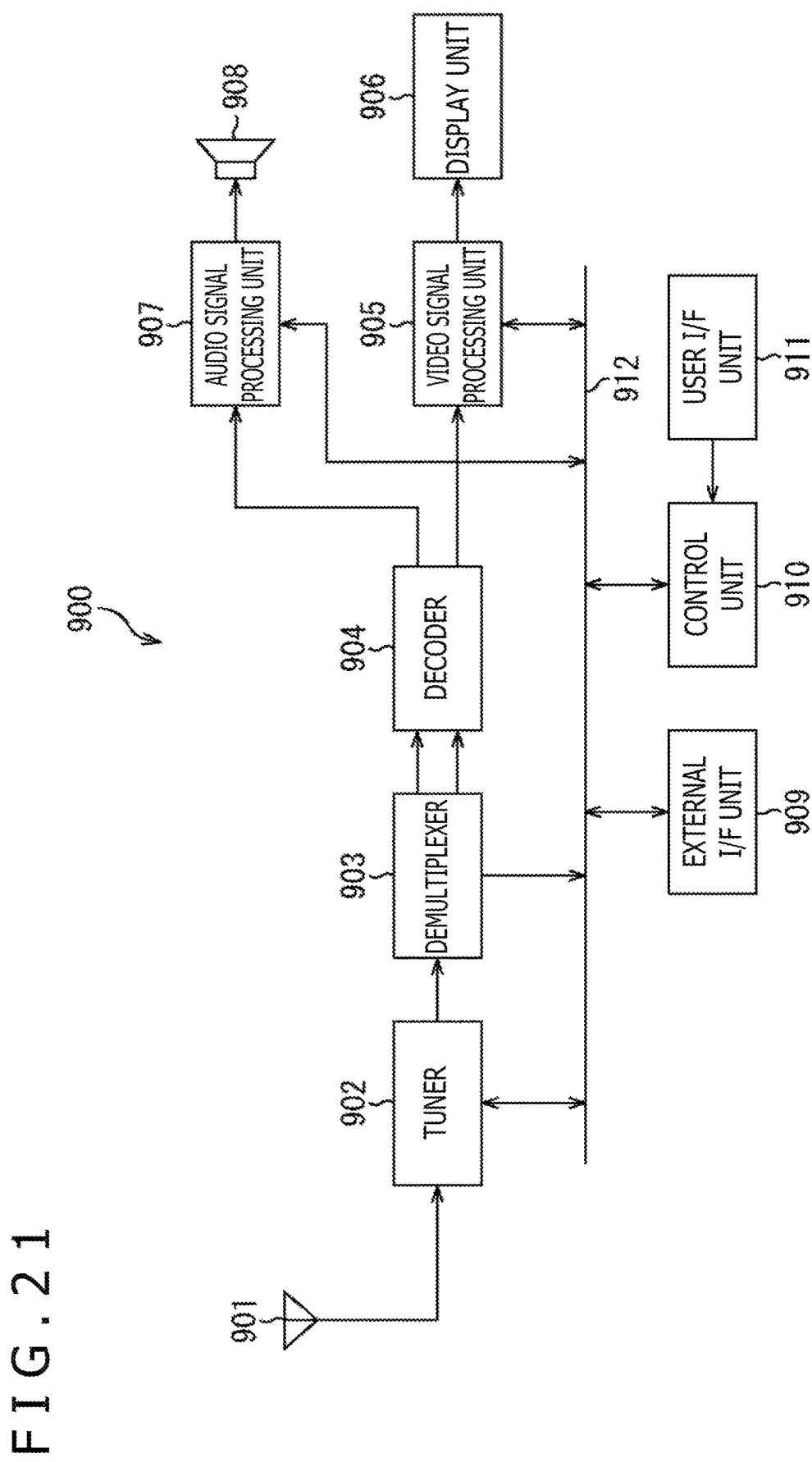
FIG. 21 is a block diagram illustrating an example of a schematic configuration of a television device.

FIG. 21 illustrates an example of the schematic configuration of a television device to which the above-described embodiments described are applied. A television device 900 includes an antenna 901, a tuner 902, a demultiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from broadcast signals received via the antenna 901, and demodulates the extracted signal. Then, the tuner 902 outputs an encoded bitstream obtained by demodulation to the demultiplexer 903. That is, in the television device 900, the tuner 902 serves as a transmission unit that receives an encoded stream in which an image is encoded.

The demultiplexer 903 separates a video stream and an audio stream of a program to be viewed from the encoded bitstream, and outputs each of the separated streams to the decoder 904. Further, the demultiplexer 903 extracts auxiliary data such as an Electronic Program Guide (EPG) from the encoded bitstream, and supplies the extracted data to the control unit 910. It is noted that in a case where the encoded bitstream is scrambled, the demultiplexer 903 may perform descrambling.

The decoder 904 decodes the video stream and the audio stream input from the demultiplexer 903. Then, the decoder 904 outputs video data generated by a decoding process to the video signal processing unit 905. Further, the decoder 904 outputs audio data generated by the decoding process to the audio signal processing unit 907.

The video signal processing unit 905 plays back the video data input from the decoder 904, and causes the display unit 906 to display the video. Further, the video signal processing unit 905 may also cause the display unit 906 to display an application screen supplied via a network. Further, the video signal processing unit 905 may perform additional processes such as noise removal, for example, on the video data according to settings. In addition, the video signal processing unit 905 may generate Graphical User Interface (GUI) images such as, for example, menus, buttons, and a cursor and superimpose the generated images onto an output image.

The display unit 906 is driven by a drive signal supplied by the video signal processing unit 905, and displays a video or an image on a video screen of a display device (e.g., a liquid crystal display, a plasma display, or an Organic ElectroLuminescence Display (OELD display)).

The audio signal processing unit 907 performs reproducing processes such as D/A conversion and amplification on the audio data input from the decoder 904, and outputs audio from the speaker 908. Further, the audio signal processing unit 907 may perform additional processes such as noise removal on the audio data.

The external interface unit 909 is an interface for connecting the television device 900 to an external device or a network. For example, a video stream or an audio stream received via the external interface unit 909 may be decoded by the decoder 904. That is, in the television device 900, the external interface unit 909 also serves as a transmission unit that receives an encoded stream in which an image is encoded.

The control unit 910 includes: a processor such as a CPU; and a memory such as RAM and ROM. The memory stores, for example, a program to be executed by the CPU, program data, EPG data, data obtained via a network. The program stored in the memory is read and executed by the CPU when, for example, the television device 900 is activated. By executing the program, the CPU controls the operation of the television device 900 according to, for example, an operation signal input from the user interface unit 911.

The user interface unit 911 is connected to the control unit 910. The user interface unit 911 includes: buttons and switches used by a user to operate the television device 900; and a remote control signal receiving unit, for example. The user interface unit 911 detects the operation by the user via these structural elements, generates an operation signal, and outputs the generated operation signal to the control unit 910.

The bus 912 interconnects the tuner 902, the demultiplexer 903, the decoder 904, the video signal processing unit 905, the audio signal processing unit 907, the external interface unit 909, and the control unit 910 with each other.

In the television device 900 configured in this manner, the video signal processing unit 905 may be capable of, for example, encoding image data supplied from the decoder 904, and outputting the obtained encoded data to the outside of the television device 900 via the external interface unit 909. Additionally, the video signal processing unit 905 may have the functions of the image encoding device 100 described above. That is, the video signal processing unit 905 may encode the image data supplied from the decoder 904 using the method described in each of the above embodiments. In this manner, the television device 900 can obtain similar effects to the effects of each of the embodiments described above with reference to FIGS. 1 to 19.

<Second Application Example: Mobile Phone>

Figure 22:
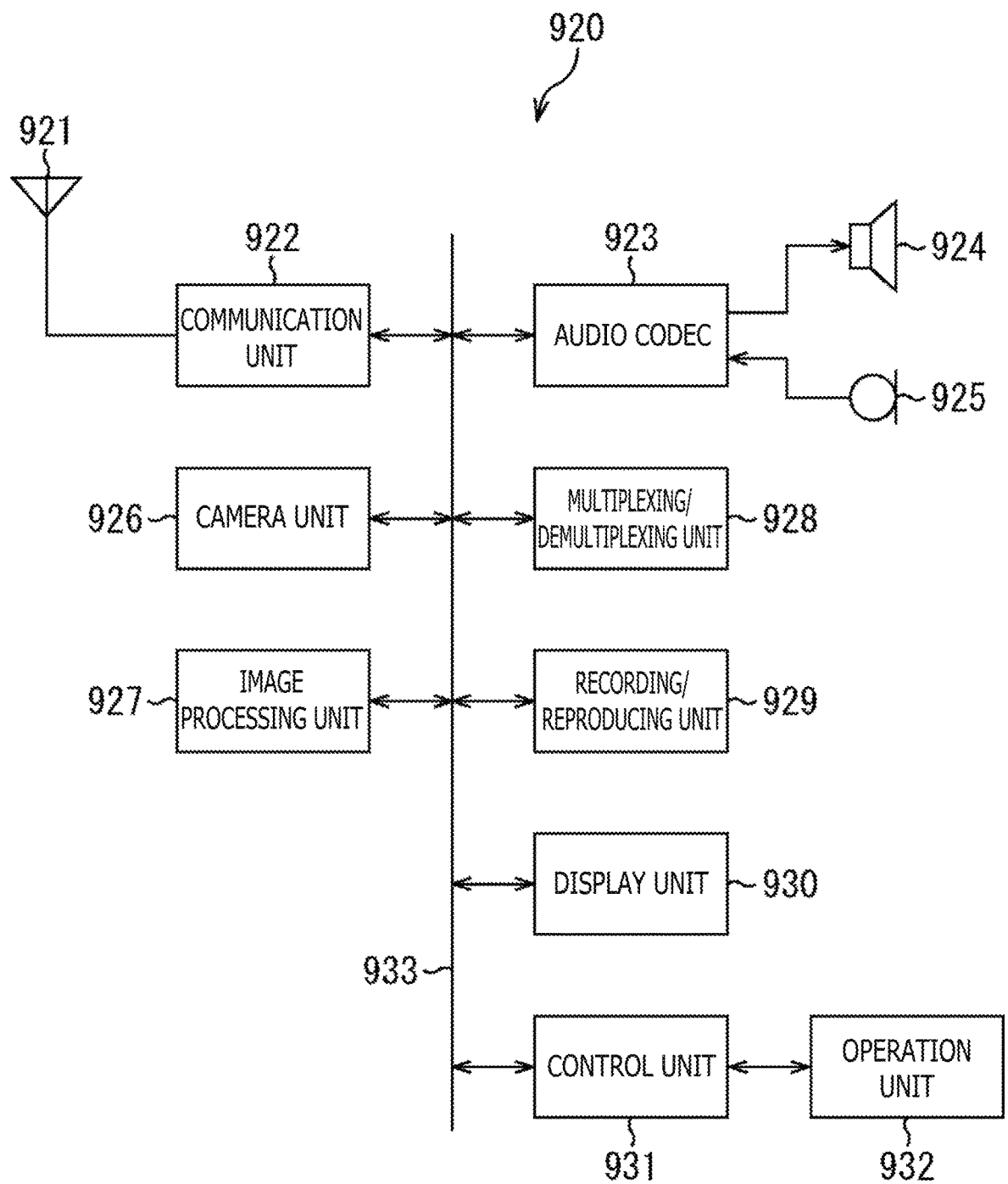
FIG. 22 is a block diagram illustrating an example of a schematic configuration of a mobile phone.

FIG. 22 illustrates an example of the schematic configuration of a mobile phone to which the above-described embodiments are applied. A mobile phone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 interconnects the communication unit 922, the audio codec 923, the camera unit 926, the image processing unit 927, the multiplexing/demultiplexing unit 928, the recording/reproducing unit 929, the display unit 930, and the control unit 931 with each other.

The mobile phone 920 performs operations such as transmitting and receiving audio signals, transmitting and receiving emails or image data, capturing images, and recording data in various operating modes including an audio communication mode, a data communication mode, an imaging mode, and a videophone mode.

In the audio communication mode, an analog audio signal generated by the microphone 925 is supplied to the audio codec 923. The audio codec 923 converts the analog audio signal into audio data, performs A/D conversion on the converted audio data, and compresses the converted audio data. Then, the audio codec 923 outputs the compressed audio data to the communication unit 922. The communication unit 922 encodes and modulates the audio data to generate a transmission signal. Then, the communication unit 922 transmits the generated transmission signal to a base station (not illustrated) via the antenna 921. Further, the communication unit 922 amplifies a wireless signal received via the antenna 921 and converts the frequency of the wireless signal to obtain the received signal. Then, the communication unit 922 demodulates and decodes the received signal to generate audio data, and outputs the generated audio data to the audio codec 923. The audio codec 923 decompresses the audio data and performs D/A conversion on the audio data to generate an analog audio signal. Then, the audio codec 923 supplies the generated audio signal to the speaker 924, causing the speaker 924 to output audio.

Further, according to operations by a user via the operation unit 932, the control unit 931 generates, for example, text data that makes up an email in the data communication mode. Further, the control unit 931 causes the text to be displayed on the display unit 930. Further, the control unit 931 generates email data and outputs the generated email data to the communication unit 922 in response to transmission instructions from the user via the operation unit 932. The communication unit 922 encodes and modulates the email data to generate a transmission signal. Then, the communication unit 922 transmits the generated transmission signal to the base station (not illustrated) via the antenna 921. Further, the communication unit 922 amplifies a wireless signal received via the antenna 921 and converts the frequency of the wireless signal to obtain the received signal. Then, the communication unit 922 demodulates and decodes the received signal, restores the email data, and outputs the restored email data to the control unit 931. The control unit 931 causes the display unit 930 to display the contents of the email, while supplying the email data to the recording/reproducing unit 929 to cause the email data to be written in a storage medium of the recording/reproducing unit 929.

The recording/reproducing unit 929 includes an arbitrary readable and writable storage medium. For example, the storage medium may be a built-in storage medium such as RAM and a flash memory or may be an externally mounted storage medium such as a hard disk, a magnetic disk, a magneto-optical disk, an optical disk, a Universal Serial Bus (USB) memory, and a memory card.

Further, in the imaging mode, the camera unit 926 captures an image of a subject, generates image data, and outputs the generated image data to the image processing unit 927, for example. The image processing unit 927 encodes the image data input from the camera unit 926, and supplies the encoded stream to the recording/reproducing unit 929 to cause the encoded stream to be written in the storage medium of the recording/reproducing unit 929.

In addition, in the image display mode, the recording/reproducing unit 929 reads the encoded stream recorded in the storage medium and outputs the encoded stream to the image processing unit 927. The image processing unit 927 decodes the encoded stream input from the recording/reproducing unit 929, supplies the image data to the display unit 930 to cause the image to be displayed.

Further, in the videophone mode, the multiplexing/demultiplexing unit 928 multiplexes a video stream encoded by the image processing unit 927 and an audio stream input from the audio codec 923, and outputs the multiplexed stream to the communication unit 922, for example. The communication unit 922 encodes and modulates the stream, and generates a transmission signal. Then, the communication unit 922 transmits the generated transmission signal to the base station (not illustrated) via the antenna 921. Further, the communication unit 922 amplifies a wireless signal received via the antenna 921 and converts the frequency of the wireless signal to obtain the received signal. These transmission signal and received signal may include an encoded bitstream. Then, the communication unit 922 demodulates and decodes the received signal, restores the stream, and outputs the restored stream to the multiplexing/demultiplexing unit 928. The multiplexing/demultiplexing unit 928 separates a video stream and an audio stream from the input stream, and outputs the video stream to the image processing unit 927 and the audio stream to the audio codec 923. The image processing unit 927 decodes the video stream to generate video data. The video data is supplied to the display unit 930, and a series of images is displayed by the display unit 930. The audio codec 923 decompresses the audio stream and performs D/A conversion to generate an analog audio signal. Then, the audio codec 923 supplies the generated audio signal to the speaker 924, causing the speaker 924 to output audio.

In the mobile phone 920 configured in this manner, the image processing unit 927 may have the functions of the image encoding device 100 described above, for example. That is, the image processing unit 927 may encode the image data using the method described in each of the above embodiments. In this manner, the mobile phone 920 can obtain similar effects to the effects of each of the embodiments described above with reference to FIGS. 1 to 19.

<Third Application Example: Recording/Reproducing Device>

Figure 23:
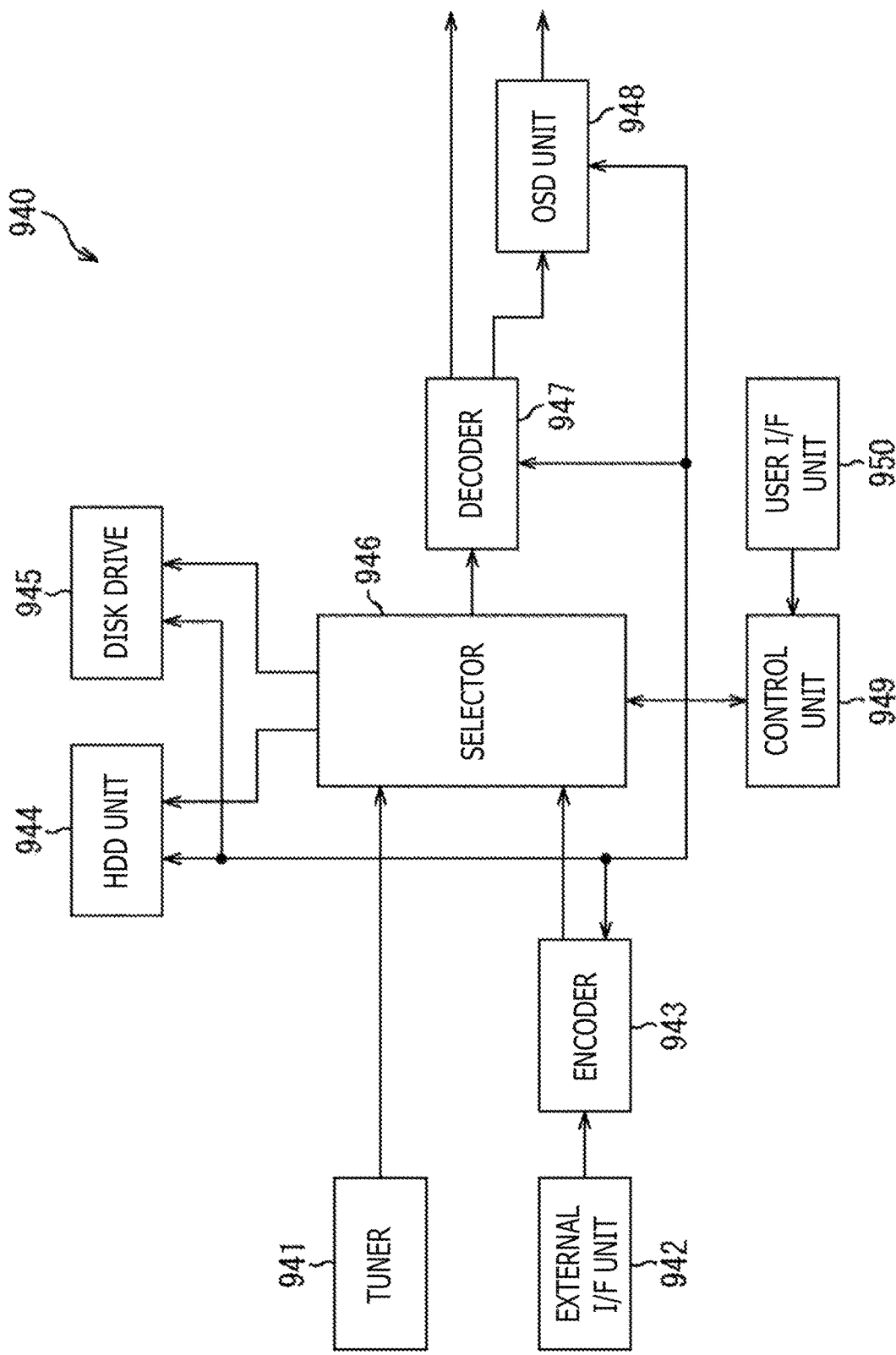
FIG. 23 is a block diagram illustrating an example of a schematic configuration of a recording/playback device.

FIG. 23 illustrates an example of the schematic configuration of a recording/reproducing device to which the above-described embodiments are applied. A recording/reproducing device 940 encodes audio data and video data of a received broadcast program and records the audio data and video data onto a recording medium, for example. Further, the recording/reproducing device 940 may also encode audio data and video data obtained from another device and record the audio data and video data onto the recording medium, for example. Further, the recording/reproducing device 940 plays back data recorded in the recording medium through a monitor and a speaker in response to instructions from a user, for example. At this time, the recording/reproducing device 940 decodes the audio data and the video data.

The recording/reproducing device 940 includes a tuner 941, an external interface (I/F) unit 942, an encoder 943, a Hard Disk Drive (HDD) unit 944, a disk drive 945, a selector 946, a decoder 947, an On-Screen Display (OSD) unit 948, a control unit 949, and a user interface (I/F) unit 950.

The tuner 941 extracts a signal of a desired channel from broadcast signals received via an antenna (not illustrated), and demodulates the extracted signal. Then, the tuner 941 outputs an encoded bitstream obtained by demodulation to the selector 946. That is, the tuner 941 serves as a transmission unit of the recording/reproducing device 940.

The external interface unit 942 is an interface for connecting the recording/reproducing device 940 to an external device or a network. For example, the external interface unit 942 may be an Institute of Electrical and Electronic Engineers (IEEE) 1394 interface, a network interface, a USB interface, a flash memory interface, or the like. For example, video data and audio data received via the external interface unit 942 are input into the encoder 943. That is, the external interface unit 942 serves as a transmission unit of the recording/reproducing device 940.

In a case where the video data and the audio data input from the external interface unit 942 are not encoded, the encoder 943 encodes the video data and the audio data. Then, the encoder 943 outputs the encoded bitstream to the selector 946.

The HDD unit 944 records an encoded bitstream with content data such as video and audio compressed, various programs, and other data onto an internal hard disk. Further, the HDD unit 944 reads such data from the hard disk when the video and audio are reproduced.

The disk drive 945 records and reads data onto and from an attached recording medium. The recording medium attached to the disk drive 945 may be, for example, a Digital Versatile Disc (DVD) disc (a DVD-Video, a DVD-Random Access Memory (DVD-RAM), a DVD-Recordable (DVD-R), a DVD-Rewritable (DVD-RW), a DVD+Recordable (DVD+R), a DVD+Rewritable (DVD+RW), or the like), a Blu-ray (registered trademark) disk, or the like.

When the video and audio are recorded, the selector 946 selects an encoded bitstream input from the tuner 941 or the encoder 943, and outputs the selected encoded bitstream to the HDD 944 or the disk drive 945. Further, when the video and audio are reproduced, the selector 946 outputs an encoded bitstream input from the HDD 944 or the disk drive 945 to the decoder 947.

The decoder 947 decodes the encoded bitstream to generate video data and audio data. Then, the decoder 947 outputs the generated video data to the OSD unit 948. Further, the decoder 947 outputs the generated audio data to an external speaker.

The OSD unit 948 plays back the video data input from the decoder 947 to display video. Further, the OSD unit 948 may superimpose GUI images such as, for example, menus, buttons, and a cursor onto the displayed video.

The control unit 949 includes: a processor such as a CPU; and a memory such as RAM and ROM. The memory stores a program to be executed by the CPU, program data, and the like. The program stored in the memory is read and executed by the CPU when, for example, the recording/reproducing device 940 is activated. By executing the program, the CPU controls the operation of the recording/reproducing device 940 according to, for example, an operation signal input from the user interface unit 950.

The user interface unit 950 is connected to the control unit 949. The user interface unit 950 includes: buttons and switches used by a user to operate the recording/reproducing device 940; and a remote control signal receiving unit, for example. The user interface unit 950 detects an operation by the user via these structural elements, generates an operation signal, and outputs the generated operation signal to the control unit 949.

In the recording/reproducing device 940 configured in this manner, the encoder 943 may have the functions of the image encoding device 100 described above, for example. That is, the encoder 943 may encode the image data using the method described in each of the above embodiments. In this manner, the recording/reproducing device 940 can obtain similar effects to the effects of each of the embodiments described above with reference to FIGS. 1 to 19.

<Fourth Application Example: Imaging Device>

Figure 24:
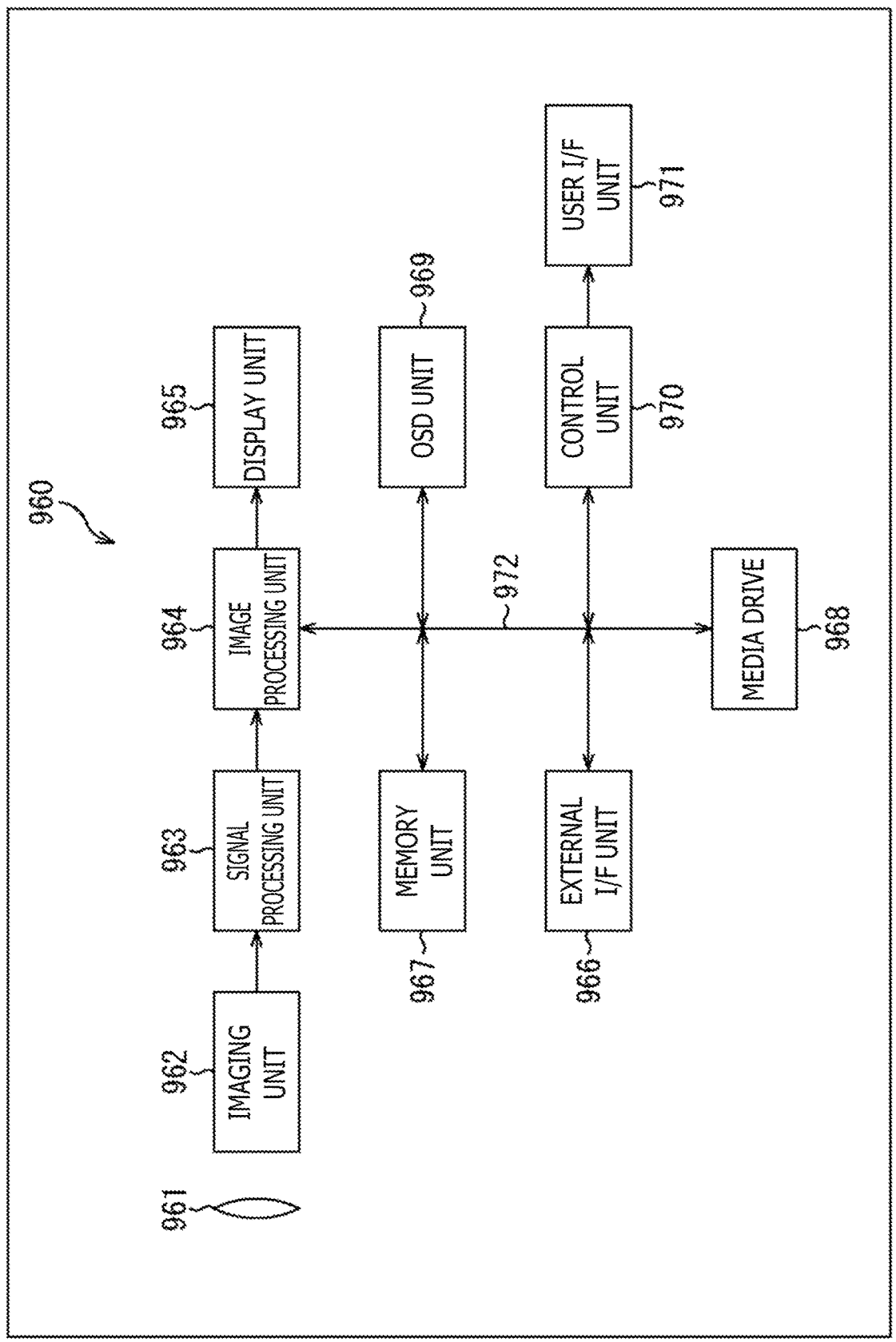
FIG. 24 is a block diagram illustrating an example of a schematic configuration of an imaging device.

FIG. 24 illustrates an example of the schematic configuration of an imaging device to which the above-described embodiments are applied. An imaging device 960 captures an image of a subject, generates an image, encodes image data, and records the image data onto a recording medium.

The imaging device 960 includes an optical block 961, an imaging unit 962, a signal processing unit 963, an image processing unit 964, a display unit 965, an external interface (I/F) unit 966, a memory unit 967, a media drive 968, an OSD unit 969, a control unit 970, a user interface (I/F) unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 972 interconnects the image processing unit 964, the external interface unit 966, the memory unit 967, the media drive 968, the OSD unit 969, and the control unit 970 with each other.

The optical block 961 includes a focus lens, a diaphragm mechanism, and the like. The optical block 961 forms an optical image of a subject on the imaging surface of the imaging unit 962. The imaging unit 962 includes an image sensor such as a Charge Coupled Device (CCD) and a Complementary Metal Oxide Semiconductor (CMOS). The imaging unit 962 photoelectrically converts the optical image formed on the imaging surface into an image signal that is an electric signal. Then, the imaging unit 962 outputs the image signal to the signal processing unit 963.

The signal processing unit 963 performs various camera signal processes such as knee correction, gamma correction, and color correction on the image signal input from the imaging unit 962. The signal processing unit 963 outputs, to the image processing unit 964, the image data on which the camera signal processes have been performed.

The image processing unit 964 encodes the image data input from the signal processing unit 963, and generates encoded data. Then, the image processing unit 964 outputs the generated encoded data to the external interface unit 966 or the media drive 968. Further, the image processing unit 964 decodes encoded data input from the external interface unit 966 or the media drive 968 to generate image data. Then, the image processing unit 964 outputs the generated image data to the display unit 965. Further, the image processing unit 964 may output the image data input from the signal processing unit 963 to the display unit 965, causing the display unit 965 to display the image. Further, the image processing unit 964 may superimpose display data obtained from the OSD unit 969 onto the image to be output to the display unit 965.

The OSD unit 969 generates GUI images such as, for example, menus, buttons, and a cursor, and outputs the generated images to the image processing unit 964.

The external interface unit 966 is configured as a USB input/output terminal, for example. The external interface unit 966 connects the imaging device 960 to a printer when an image is printed, for example. Further, a drive is connected to the external interface unit 966 as necessary. A removable medium such as, for example, a magnetic disk and an optical disk is mounted into the drive, and a program read from the removable medium can be installed into the imaging device 960. In addition, the external interface unit 966 may be configured as a network interface to be connected to a network such as a LAN and the Internet. That is, the external interface unit 966 serves as a transmission unit of the imaging device 960.

A recording medium to be mounted into the media drive 968 may be an arbitrary readable and writable removable medium such as, for example, a magnetic disk, a magneto-optical disk, an optical disk, and semiconductor memory. Further, a recording medium may be fixedly mounted in the media drive 968 to constitute a non-portable storage unit such as, for example, a built-in hard disk drive and a Solid State Drive (SSD).

The control unit 970 includes: a processor such as a CPU; and a memory such as RAM and ROM. The memory stores a program to be executed by the CPU, program data, and the like. The program stored in the memory is read and executed by the CPU when, for example, the imaging device 960 is activated. By executing the program, the CPU controls the operation of the imaging device 960 according to, for example, an operation signal input from the user interface unit 971.

The user interface unit 971 is connected to the control unit 970. The user interface unit 971 includes, for example, buttons and switches used by a user to operate the imaging device 960. The user interface unit 971 detects an operation by the user via these structural elements, generates an operation signal, and outputs the generated operation signal to the control unit 970.

In the imaging device 960 configured in this manner, the image processing unit 964 may have the functions of the image encoding device 100 described above, for example. That is, the image processing unit 964 may encode the image data using the method described in each of the above embodiments. In this manner, the imaging device 960 can obtain similar effects to the effects of each of the embodiments described above with reference to FIGS. 1 to 19.

<Fifth Application Example: Video Set>

Figure 25:
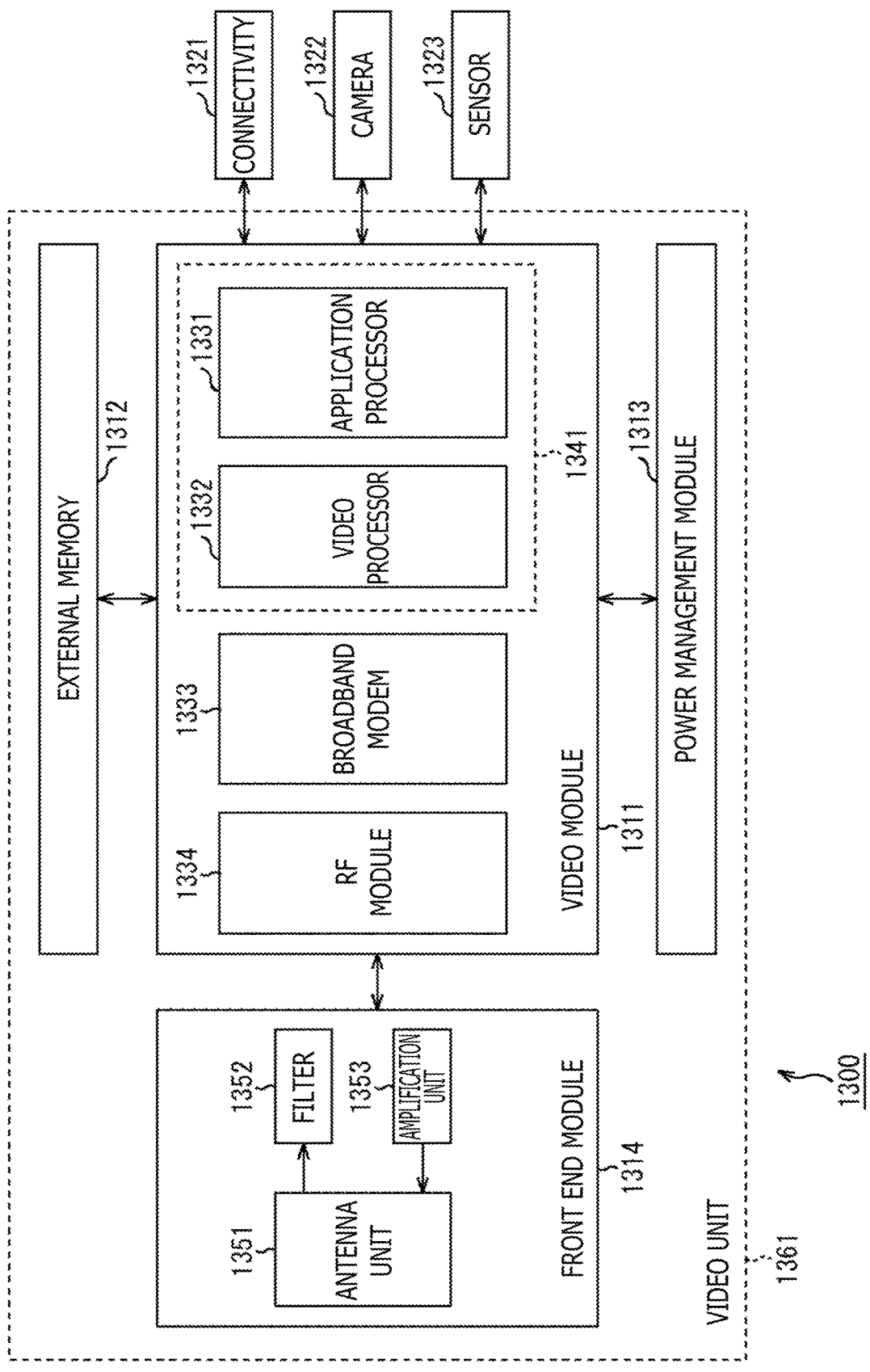
FIG. 25 is a block diagram illustrating an example of a schematic configuration of a video set.

Further, the present technology can also be implemented as any of the configurations mounted in an arbitrary device or an arbitrary device constituting a system (in other words, the present technology can be implemented as part of the configurations of the device). Examples of the configurations include: a processor serving as a system Large Scale Integration (LSI) or the like; a module using a plurality of processors and the like; a unit using a plurality of modules and the like; and a set including other functions added to the unit. FIG. 25 illustrates an example of the schematic configuration of a video set to which the present technology is applied.

In recent years, more and more electronic devices have become multifunctional. In the development or the manufacturing of such electronic devices, there are cases where part of the configuration is implemented for sale, provision, or the like. In such cases, the configuration having a single function may be implemented. However, there are more and more cases where a plurality of configurations having related functions are combined and implemented as a single set having a plurality of functions.

A video set 1300 illustrated in FIG. 25 has such a multi-functionalized configuration. The video set 1300 is a combination of a device having a function related to image encoding and decoding (either one or both are possible) and a device having other functions related to that function.

As illustrated in FIG. 25, the video set 1300 includes a group of modules and devices having related functions. The group of modules includes a video module 1311, an external memory 1312, a power management module 1313, and a front end module 1314. The devices include a connectivity 1321, a camera 1322, and a sensor 1323.

A module is a component having integrated functions in which several mutually related component functions are integrated. A specific physical configuration thereof is arbitrary. As one possible example, a plurality of processors having respective functions, electronic circuit components such as a resistor and a capacitor, other devices, and the like may be arranged and integrated on a wiring board or the like. Further, as another possible example, a combination of one module and another module, a processor, and the like may be provided as a new module.

In the case of the example in FIG. 25, the video module 1311 is a combination of configurations having functions related to image processing. The video module 1311 includes an application processor, a video processor, a broadband modem 1333, and an RF module 1334.

A processor is formed by integrating a configuration having predetermined functions onto a semiconductor chip as a System On a Chip (SoC). Some processors are called a system Large Scale Integration (LSI) or the like, for example. The configuration having these predetermined functions may be a logical circuit (hardware configuration), may be a CPU, a ROM, a RAM, and a program executed by using these CPU, ROM, and RAM (software configuration), or may be a configuration combining both thereof. For example, a processor may include a logical circuit, a CPU, a ROM, a RAM, and the like, and part of the functions may be implemented by the logical circuit (hardware configuration), while the other functions may be implemented by the program (software configuration) executed by the CPU.

An application processor 1331 in FIG. 25 is a processor that executes an application related to image processing. The application to be executed in this application processor 1331 is capable of not only performing a computing process to implement a predetermined function, but also capable of controlling the configurations inside and outside the video module 1311 such as, for example, a video processor 1332, as necessary.

The video processor 1332 is a processor having a function related to (either one or both of) image encoding and decoding.

The broadband modem 1333 converts transmission data (digital signal) into an analog signal through digital modulation or the like. The data is to be transmitted through wired or wireless (or both wired and wireless) broadband communication that is performed through broadband lines such as the Internet and a public telephone line network. The broadband modem 1333 also demodulates and converts an analog signal received through the broadband communication into data (digital signal). The broadband modem 1333 processes arbitrary information such as, for example, image data processed by the video processor 1332, a stream in which the image data has been encoded, an application program, and setting data.

The RF module 1334 is a module that performs frequency conversion, modulation/demodulation, amplification, filtering process, and the like on Radio Frequency (RF) signals to be transmitted and received via an antenna. For example, the RF module 1334 generates an RF signal by converting the frequency of a base band signal generated by the broadband modem 1333. Further, for example, the RF module 1334 generates a base band signal by converting the frequency of an RF signal received via the front end module 1314.

It is noted that as indicated by a dotted line 1341 in FIG. 25, the application processor 1331 and the video processor 1332 may be integrated and configured as one processor.

The external memory 1312 is a module including a storage device used by the video module 1311. The external memory 1312 is provided outside the video module 1311. This storage device of the external memory 1312 may be implemented by any physical configuration. In general, the storage device is often used for storing a large amount of data like image data in units of frames. Therefore, it is desirable that the storage device is implemented using a relatively inexpensive, large-capacity semiconductor memory such as, for example, a Dynamic Random Access Memory (DRAM).

The power management module 1313 manages and controls power supply to the video module 1311 (each configuration inside the video module 1311).

The front end module 1314 is a module that provides the RF module 1334 with front end functions (circuits at transmission and reception ends on an antenna side). As illustrated in FIG. 25, the front end module 1314 includes, for example, an antenna unit 1351, a filter 1352, and an amplification unit 1353.

The antenna unit 1351 includes an antenna and its peripheral configurations that transmit and receive wireless signals. The antenna unit 1351 transmits a signal supplied from the amplification unit 1353 as a wireless signal and supplies a received wireless signal to the filter 1352 as an electric signal (RF signal). The filter 1352 performs a filtering process and the like on the RF signal received via the antenna unit 1351 and supplies the processed RF signal to the RF module 1334. The amplification unit 1353 amplifies an RF signal supplied from the RF module 1334 and supplies the RF signal to the antenna unit 1351.

The connectivity 1321 is a module having a function related to external connection. The physical configuration of the connectivity 1321 is arbitrary. For example, the connectivity 1321 includes: a configuration having a communication function other than the communication standard supported by the broadband modem 1333; external input/output terminals; and the like.

For example, the connectivity 1321 may include: a module having a communication function conforming to a wireless communication standard such as Bluetooth (registered trademark), IEEE 802.11 (e.g., Wireless Fidelity (Wi-Fi), (registered trademark)), Near Field Communication (NFC), and InfraRed Data Association (IrDA); and an antenna that transmits and receives signals conforming to the standard. Further, for example, the connectivity 1321 may include: a module having a communication function conforming to a wired communication standard such as Universal Serial Bus (USB) and High-Definition Multimedia Interface (HDMI) (registered trademark); and a terminal that conforms to the standard. In addition, for example, the connectivity 1321 may have functions of transmitting other data (signals) such as analog input/output terminals.

It is noted that the connectivity 1321 may include a destination device to which data (signals) are transmitted. For example, the connectivity 1321 may include a drive that reads and writes data from and onto a recording medium such as a magnetic disk, an optical disk, a magneto-optical disk, and a semiconductor memory (the drive includes not only a drive of a removable medium, but also drives of a hard disk, a Solid State Drive (SSD), a Network Attached Storage (NAS), and the like.) Further, the connectivity 1321 may include devices that output images and audio (a monitor, a speaker, and the like).

The camera 1322 is a module having a function of imaging a subject and obtaining image data of the subject. The image data obtained by imaging of the camera 1322 is, for example, supplied to the video processor 1332, and then encoded.

The sensor 1323 is a module having a function of an arbitrary sensor such as, for example, an audio sensor, an ultrasonic sensor, an optical sensor, an illuminance sensor, an infrared sensor, an image sensor, a rotation sensor, an angle sensor, an angular velocity sensor, a speed sensor, an acceleration sensor, a tilt sensor, a magnetic identification sensor, a shock sensor, and a temperature sensor. Data detected by the sensor 1323 is, for example, supplied to the application processor 1331 and used by an application and the like.

The configurations described above as the modules may be implemented as processors. Conversely, the configurations described above as the processors may be implemented as modules.

In the video set 1300 configured as described above, the present technology can be applied to the video processor 1332, as described later. Therefore, the video set 1300 can be implemented as a set to which the present technology is applied.

<Configuration Example of Video Processor>

Figure 26:
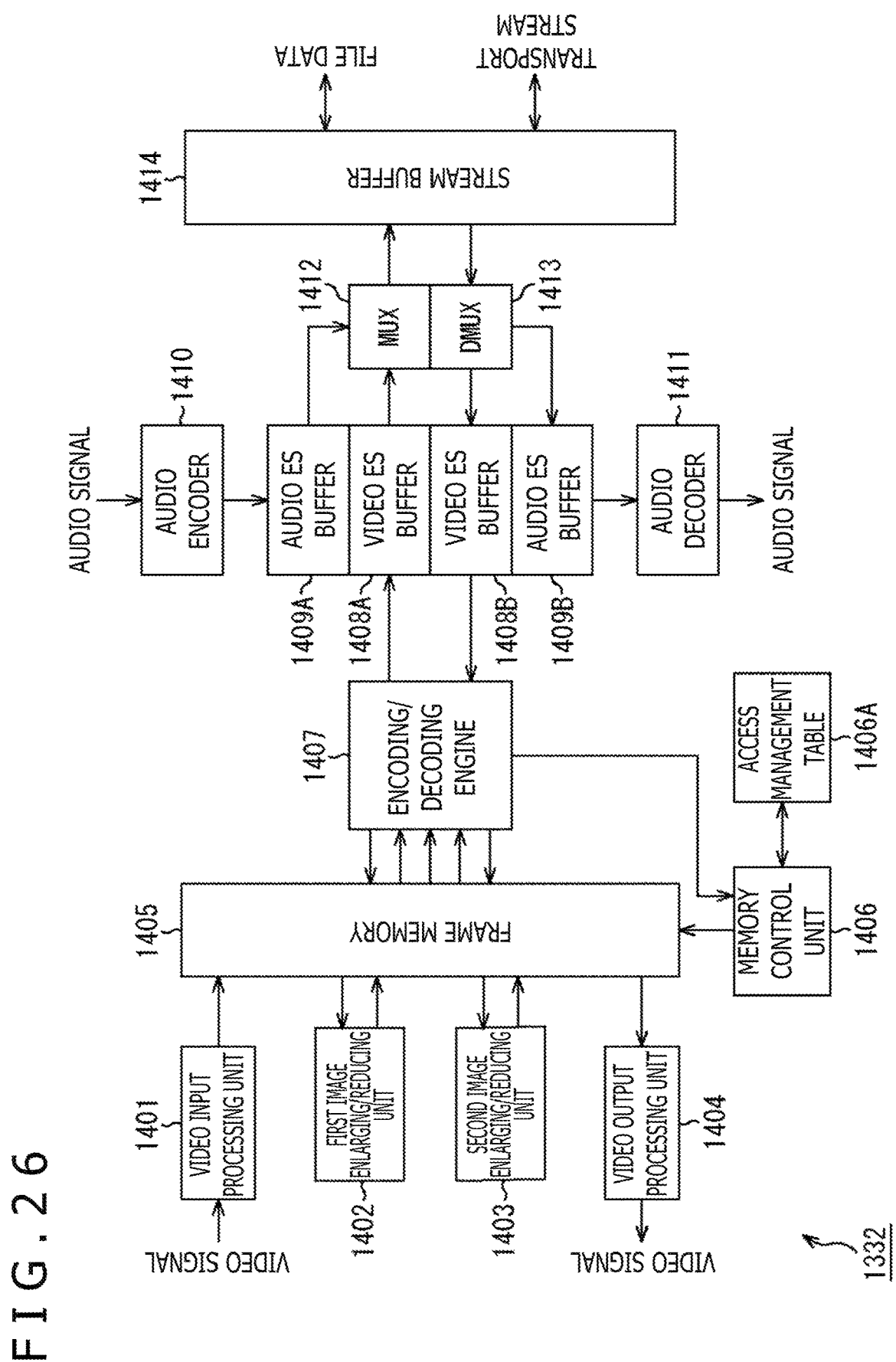
FIG. 26 is a block diagram illustrating an example of a schematic configuration of a video processor.

FIG. 26 illustrates an example of the schematic configuration of the video processor 1332 (FIG. 25) to which the present technology is applied.

In the case of the example in FIG. 26, the video processor 1332 has: a function of receiving input of a video signal and an audio signal and encoding the video signal and audio signal using a predetermined method; and a function of decoding encoded video data and audio data and reproducing and outputting a video signal and an audio signal.

As illustrated in FIG. 26, the video processor 1332 includes a video input processing unit 1401, a first image enlarging/reducing unit 1402, a second image enlarging/reducing unit 1403, a video output processing unit 1404, a frame memory 1405, and a memory control unit 1406. Further, the video processor 1332 includes an encoding/decoding engine 1407, video Elementary Stream (ES) buffers 1408A and 1408B, and audio ES buffers 1409A and 1409B. In addition, the video processor 1332 includes an audio encoder 1410, an audio decoder 1411, a multiplexing unit (Multiplexer (MUX)) 1412, a demultiplexing unit (Demultiplexer (DMUX)) 1413, and a stream buffer 1414.

The video input processing unit 1401 obtains a video signal input from, for example, the connectivity 1321 (FIG. 25) and converts the video signal into digital image data. The first image enlarging/reducing unit 1402 performs processes on the image data such as conversion of the format and enlargement or reduction of the image. The second image enlarging/reducing unit 1403 performs processes on the image data such as enlargement or reduction of the image in accordance with the format at the destination to which the image is output via the video output processing unit 1404. The second image enlarging/reducing unit 1403 also performs processes on the image data such as conversion of the format and enlargement or reduction of the image, similarly to the first image enlarging/reducing unit 1402. The video output processing unit 1404 converts the format of the image data and converts the image data into an analog signal, and the like. The video output processing unit 1404 then outputs the analog signal to, for example, the connectivity 1321 as a video signal that has been reproduced.

The frame memory 1405 is a memory for image data shared among the video input processing unit 1401, the first image enlarging/reducing unit 1402, the second image enlarging/reducing unit 1403, the video output processing unit 1404, and the encoding/decoding engine 1407. The frame memory 1405 is implemented as a semiconductor memory such as, for example, a DRAM.

The memory control unit 1406 receives a synchronization signal from the encoding/decoding engine 1407 and controls writing and reading access to the frame memory 1405 in accordance with a schedule of access to the frame memory 1405 written on an access management table 1406A. The access management table 1406A is updated by the memory control unit 1406 in accordance with the processes executed by the encoding/decoding engine 1407, the first image enlarging/reducing unit 1402, the second image enlarging/reducing unit 1403, and the like.

The encoding/decoding engine 1407 performs an encoding process on image data and performs a decoding process on a video stream. The video streams are data in which image data has been encoded. For example, the encoding/decoding engine 1407 encodes image data read from the frame memory 1405 and sequentially writes the encoded image data onto the video ES buffer 1408A as a video stream. Further, for example, the encoding/decoding engine 1407 decodes a video stream sequentially read from the video ES buffer 1408B and sequentially writes the decoded video stream onto the frame memory 1405 as image data. In these encoding and decoding processes, the encoding/decoding engine 1407 uses the frame memory 1405 as a work area. Further, the encoding/decoding engine 1407 outputs a synchronization signal to the memory control unit 1406 at a timing of, for example, starting a process for each macroblock.

The video ES buffer 1408A buffers a video stream generated by the encoding/decoding engine 1407 and supplies the video stream to the multiplexing unit (MUX) 1412. The video ES buffer 1408B buffers a video stream supplied from the demultiplexing unit (DMUX) 1413 and supplies the video stream to the encoding/decoding engine 1407.

The audio ES buffer 1409A buffers an audio stream generated by the audio encoder 1410 and supplies the audio stream to the multiplexing unit (MUX) 1412. The audio ES buffer 1409B buffers an audio stream supplied from the demultiplexing unit (DMUX) 1413 and supplies the audio stream to the audio decoder 1411.

The audio encoder 1410, for example, performs digital conversion on an audio signal input from, for example, the connectivity 1321, and encodes the audio signal using a predetermined method such as, for example, an MPEG audio method and an AudioCode number 3 (AC3) method. The audio encoder 1410 sequentially writes an audio stream onto the audio ES buffer 1409A. The audio stream is data in which the audio signal has been encoded. The audio decoder 1411 decodes an audio stream supplied from the audio ES buffer 1409B and converts the audio stream into an analog signal, for example. The audio decoder 1411 then supplies the analog signal to, for example, the connectivity 1321 as an audio signal that has been reproduced.

The multiplexing unit (MUX) 1412 multiplexes a video stream and an audio stream. A method of multiplexing (that is, the format of a bitstream generated by multiplexing) is arbitrary. Further, upon multiplexing, the multiplexing unit (MUX) 1412 is also capable of adding predetermined header information and the like to a bitstream. In other words, the multiplexing unit (MUX) 1412 is capable of converting the format of a stream through multiplexing. For example, the multiplexing unit (MUX) 1412 multiplexes a video stream and an audio stream to convert the video stream and the audio stream into a transport stream. The transport stream is a bitstream in a transfer format. Further, for example, the multiplexing unit (MUX) 1412 multiplexes the video stream and the audio stream to convert the video stream and the audio stream into data (file data) in a recording file format.

Using a method corresponding to multiplexing performed by the multiplexing unit (MUX) 1412, the demultiplexing unit (DMUX) 1413 demultiplexes a bitstream in which a video stream and an audio stream have been multiplexed. Specifically, the demultiplexing unit (DMUX) 1413 extracts the video stream and the audio stream from the bitstream read from the stream buffer 1414 (separates the video stream and the audio stream from each other). That is, the demultiplexing unit (DMUX) 1413 is capable of converting the format of the stream through demultiplexing (capable of performing inverse conversion of the conversion performed by the multiplexing unit (MUX) 1412). For example, the demultiplexing unit (DMUX) 1413 is capable of obtaining a transport stream supplied from, for example, the connectivity 1321, the broadband modem 1333, or the like via the stream buffer 1414, and demultiplexing the transport stream to convert the transport stream into a video stream and an audio stream. Further, for example, the demultiplexing unit (DMUX) 1413 is capable of obtaining file data read from various recording media by, for example, the connectivity 1321 via the stream buffer 1414 and demultiplexing the file data to convert the file data into a video stream and an audio stream.

The stream buffer 1414 buffers a bitstream. For example, the stream buffer 1414 buffers a transport stream supplied from the multiplexing unit (MUX) 1412 and supplies the transport stream to, for example, the connectivity 1321, the broadband modem 1333, or the like at a predetermined timing or on the basis of, for example, a request from the outside.

Further, for example, the stream buffer 1414 buffers file data supplied from the multiplexing unit (MUX) 1412 and supplies the file data to, for example, the connectivity 1321 at a predetermined timing or on the basis of a request or the like from the outside to cause the file data to be recorded onto various recording media.

In addition, the stream buffer 1414 buffers a transport stream obtained through, for example, the connectivity 1321, the broadband modem 1333, or the like and supplies the transport stream to the demultiplexing unit (DMUX) 1413 at a predetermined timing or on the basis of, for example, a request from the outside.

Further, the stream buffer 1414 buffers file data read from various recording media by, for example, the connectivity 1321, and supplies the file data to the demultiplexing unit (DMUX) 1413 at a predetermined timing or on the basis of, for example, a request from the outside.

Next, an example of the operation of the video processor 1332 configured as above will be described. For example, a video signal is input into the video processor 1332 from the connectivity 1321 or the like. The video input processing unit 1401 converts the video signal into digital image data in a predetermined method such as a 4:2:2Y/Cb/Cr method, and sequentially writes the digital image data onto the frame memory 1405. This digital image data is read by the first image enlarging/reducing unit 1402 or the second image enlarging/reducing unit 1403 to be converted into the format in a predetermined format such as a 4:2:0Y/Cb/Cr method and to be enlarged or reduced through the process. The digital image data is then written onto the frame memory 1405 again. This image data is encoded by the encoding/decoding engine 1407 and written onto the video ES buffer 1408A as a video stream.

Further, an audio signal input into the video processor 1332 from the connectivity 1321 or the like is encoded by the audio encoder 1410 and written onto the audio ES buffer 1409A as an audio stream.

The video stream in the video ES buffer 1408A and the audio stream in the audio ES buffer 1409A are read and multiplexed by the multiplexing unit (MUX) 1412 and converted into a transport stream, file data, or the like. The transport stream generated by the multiplexing unit (MUX) 1412 is buffered by the stream buffer 1414, and then output to an external network via, for example, the connectivity 1321, the broadband modem 1333, or the like. Further, the file data generated by the multiplexing unit (MUX) 1412 is buffered by the stream buffer 1414, and then output to, for example, the connectivity 1321 to be recorded onto various recording media.

Further, the transport stream input into the video processor 1332 from the external network via, for example, the connectivity 1321, the broadband modem 1333, or the like is buffered by the stream buffer 1414, and subsequently demultiplexed by the demultiplexing unit (DMUX) 1413. Further, the file data, which has been read from the various recording media by, for example, the connectivity 1321 and input into the video processor 1332, is buffered by the stream buffer 1414, and subsequently demultiplexed by the demultiplexing unit (DMUX) 1413. That is, the transport stream or the file data input into the video processor 1332 is separated into a video stream and an audio stream by the demultiplexing unit (DMUX) 1413.

The audio stream is supplied to the audio decoder 1411 via the audio ES buffer 1409B and decoded. Then, an audio signal is reproduced. Further, after the video stream is written onto the video ES buffer 1408B, the video stream is sequentially read and decoded by the encoding/decoding engine 1407 and then written onto the frame memory 1405. The decoded image data is enlarged or reduced through the process by the second image enlarging/reducing unit 1403 and written onto the frame memory 1405. Then, the decoded image data is read by the video output processing unit 1404, converted into a format in a predetermined method such as the 4:2:2Y/Cb/Cr method, and then converted into an analog signal. A video signal is then output to be reproduced.

In a case where the present technology is applied to the video processor 1332 configured in this manner, the present technology according to each embodiment described above may be applied to the encoding/decoding engine 1407. That is, the encoding/decoding engine 1407 may have the functions of the image encoding device 100 described above, for example. In this manner, the video processor 1332 can obtain similar effects to the effects of each of the embodiments described above with reference to FIGS. 1 to 19.

It is noted that in the encoding/decoding engine 1407, the present technology (i.e., the functions of the image encoding device 100) may be implemented by hardware such as a logical circuit or by software such as an incorporated program, or may be implemented by both thereof.

<Another Configuration Example of Video Processor>

Figure 27:
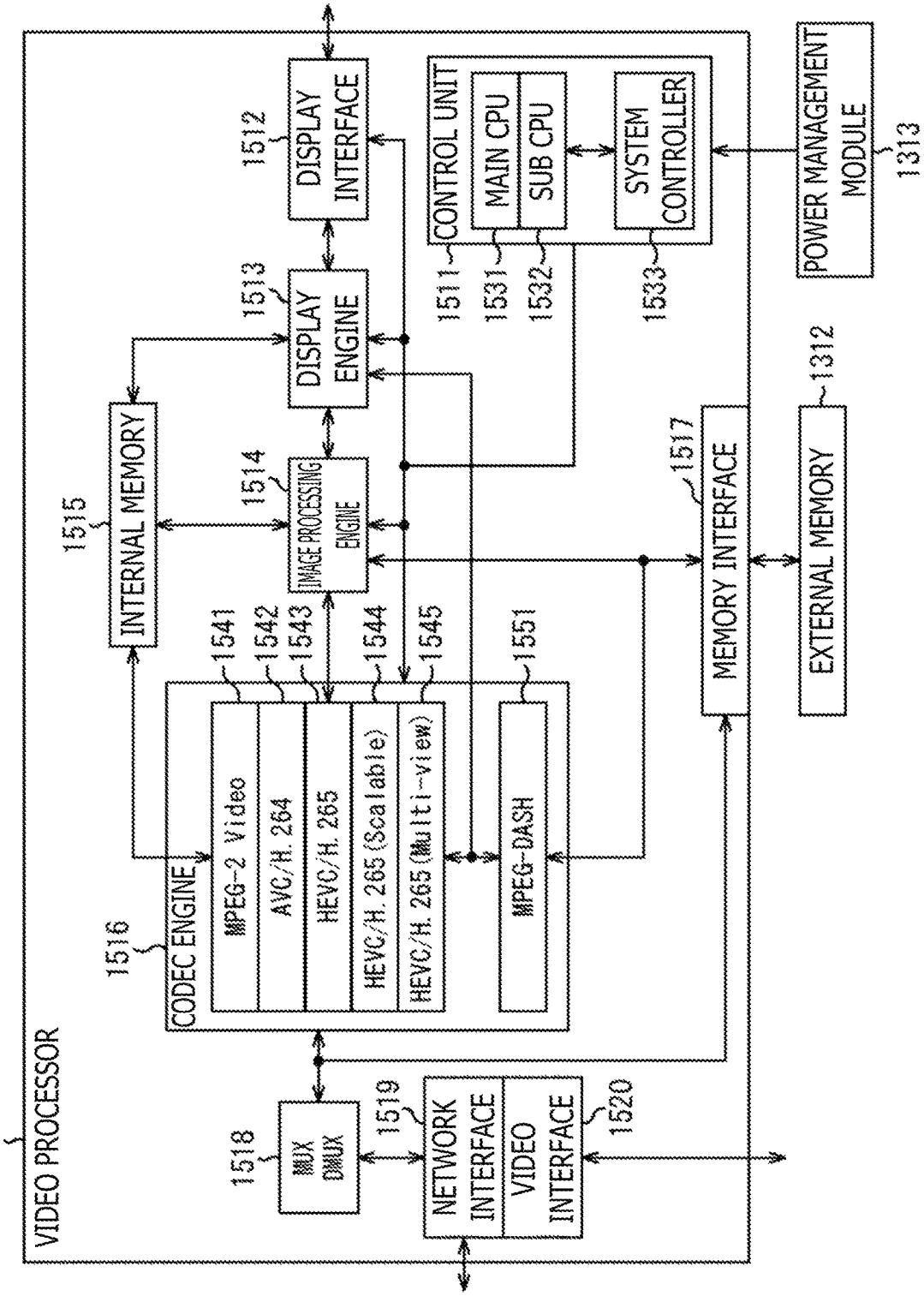
FIG. 27 is a block diagram illustrating another example of the schematic configuration of the video processor.

FIG. 27 illustrates another example of the schematic configuration of the video processor 1332 to which the present technology is applied. In the case of the example in FIG. 27, the video processor 1332 has a function of encoding and decoding video data using a predetermined method.

More specifically, as illustrated in FIG. 27, the video processor 1332 includes a control unit 1511, a display interface 1512, a display engine 1513, an image processing engine 1514, and an internal memory 1515. Further, the video processor 1332 includes a codec engine 1516, a memory interface 1517, a multiplexing/demultiplexing unit (MUX DMUX) 1518, a network interface 1519, and a video interface 1520.

The control unit 1511 controls the operation of each processing unit inside the video processor 1332, such as the display interface 1512, the display engine 1513, the image processing engine 1514, and the codec engine 1516.

As illustrated in FIG. 27, the control unit 1511 includes, for example, a main CPU 1531, a sub CPU 1532, and a system controller 1533. The main CPU 1531 executes a program and the like for controlling the operation of each processing unit inside the video processor 1332. The main CPU 1531 generates a control signal according to the program and the like and supplies the control signal to each processing unit (that is, the main CPU 1531 controls the operation of each processing unit). The sub CPU 1532 serves to assist the main CPU 1531. For example, the sub CPU 1532 executes a child process, a subroutine, and the like of the program and the like executed by the main CPU 1531. The system controller 1533 controls the operations of the main CPU 1531 and the sub CPU 1532 by, for example, specifying a program to be executed by the main CPU 1531 and the sub CPU 1532.

Under the control of the control unit 1511, the display interface 1512 outputs image data to, for example, the connectivity 1321. For example, the display interface 1512 converts image data, which is digital data, into an analog signal, and outputs the analog signal to a monitor device or the like of the connectivity 1321 as a video signal that has been reproduced. Alternatively, the display interface 1512 outputs the image data as it is, which is digital data, to the monitor device or the like of the connectivity 1321.

Under the control of the control unit 1511, the display engine 1513 performs various conversion processes such as format conversion, size conversion, and color gamut conversion on the image data so as to conform to the hardware specification of the monitor device or the like that displays that image.

Under the control of the control unit 1511, the image processing engine 1514 performs predetermined image processes on the image data such as, for example, a filtering process for improving the image quality.

The internal memory 1515 is a memory provided inside the video processor 1332, which is shared among the display engine 1513, the image processing engine 1514, and the codec engine 1516. The internal memory 1515 is, for example, used for transmitting and receiving data among the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as necessary (for example, on a request basis). The internal memory 1515 may be implemented by any storage device. In general, the internal memory 1515 is often used for storing a small amount of data such as image data in units of blocks and parameters. Therefore, it is desirable that the internal memory 1515 is implemented by a semiconductor memory such as, for example, a Static Random Access Memory (SRAM), which has a relatively smaller capacity but achieves a higher response speed (in comparison with, for example, the external memory 1312).

The codec engine 1516 performs processes related to encoding and decoding of image data. The encoding/decoding method supported by the codec engine 1516 is arbitrary. The codec engine 1516 may support a single method or a plurality of methods. For example, the codec engine 1516 may have a codec function with a plurality of encoding/decoding methods and may encode image data or decode encoded data using a method selected from the plurality of encoding/decoding methods.

In the example illustrated in FIG. 27, the codec engine 1516 includes, for example, an MPEG-2 Video 1541, an AVC/H.264 1542, an HEVC/H.265 1543, an HEVC/H.265 (Scalable) 1544, an HEVC/H.265 (Multi-view) 1545, and an MPEG-DASH 1551 as functional blocks for codec-related processes.

The MPEG-2 Video 1541 is a functional block that encodes and decodes image data using an MPEG-2 method. The AVC/H.264 1542 is a functional block that encodes and decodes image data using an AVC method. The HEVC/H.265 1543 is a functional block that encodes and decodes image data using an HEVC method. The HEVC/H.265 (Scalable) 1544 is a functional block that performs scalable encoding and scalable decoding on image data using the HEVC method. The HEVC/H.265 (Multi-view) 1545 is a functional block that performs multi-view encoding and multi-view decoding on image data using the HEVC method.

The MPEG-DASH 1551 is a functional block that transmits and receives image data using an MPEG-Dynamic Adaptive Streaming over HTTP (MPEG-DASH) method. The MPEG-DASH is technology for streaming a video using a HyperText Transfer Protocol (HTTP). One characteristic of the MPEG-DASH is that appropriate encoded data is selected and transmitted per unit of segment among a plurality of encoded data having mutually different resolutions and the like, which are prepared in advance. The MPEG-DASH 1551 generates a stream conforming to the standard and controls transmission of the stream, for example. The above-described MPEG-2 Video 1541 to HEVC/H.265 (Multi-view) 1545 are used to encode or decode image data.

The memory interface 1517 is an interface for the external memory 1312. Data supplied from the image processing engine 1514 or the codec engine 1516 is supplied to the external memory 1312 via the memory interface 1517. Further, the data read from the external memory 1312 is supplied to the video processor 1332 (the image processing engine 1514 or the codec engine 1516) via the memory interface 1517.

The multiplexing/demultiplexing unit (MUX DMUX) 1518 multiplexes and demultiplexes various data related to an image such as bitstreams, image data, and video signals of encoded data. The multiplexing/demultiplexing method is arbitrary. For example, upon multiplexing, the multiplexing/demultiplexing unit (MUX DMUX) 1518 is capable of not only combining a plurality of pieces of data into one, but also adding predetermined header information and the like to that data. Further, upon demultiplexing, the multiplexing/demultiplexing unit (MUX DMUX) 1518 is capable of not only dividing one piece of data into a plurality of pieces of data, but also adding predetermined header information and the like to each of the divided pieces of data. That is, the multiplexing/demultiplexing unit (MUX DMUX) 1518 is capable of converting the format of the data through multiplexing/demultiplexing. For example, the multiplexing/demultiplexing unit (MUX DMUX) 1518 is capable of converting bitstreams into a transport stream, which is a bitstream in the transfer format, or into data (file data) in the recording file format through multiplexing of bitstreams. Needless to say, inverse conversion thereof is possible through demultiplexing.

The network interface 1519 is an interface for, for example, the broadband modem 1333, the connectivity 1321, and the like. The video interface 1520 is an interface for, for example, the connectivity 1321, the camera 1322, and the like.

Next, an example of the operation of the video processor 1332 described as above will be described. For example, when a transport stream is received from the external network via the connectivity 1321, the broadband modem 1333, or the like, the transport stream is supplied to the multiplexing/demultiplexing unit (MUX DMUX) 1518 via the network interface 1519 and demultiplexed. Then, the transport stream is decoded by the codec engine 1516. For example, the image processing engine 1514 performs predetermined image processing on the image data obtained through decoding performed by the codec engine 1516. Then, the display engine 1513 performs a predetermined conversion on the image data. The image data is then supplied to, for example, the connectivity 1321 via the display interface 1512, and the image is displayed on the monitor. Further, for example, the image data obtained through decoding performed by the codec engine 1516 is re-encoded by the codec engine 1516 and multiplexed by the multiplexing/demultiplexing unit (MUX DMUX) 1518 to be converted into file data. The file data is output to, for example, the connectivity 1321 via the video interface 1520, and recorded onto the various recording media.

In addition, file data, which is encoded data including encoded image data, is read from a recording medium, not illustrated, by, for example, the connectivity 1321, and supplied to the multiplexing/demultiplexing unit (MUX DMUX) 1518 via the video interface 1520. The file data is then demultiplexed by the multiplexing/demultiplexing unit (MUX DMUX) 1518 and decoded by the codec engine 1516. The image processing engine 1514 performs predetermined image processing on the image data obtained through decoding performed by the codec engine 1516. Then, the display engine 1513 performs a predetermined conversion on the image data. The image data is then supplied to, for example, the connectivity 1321 via the display interface 1512, and the image is displayed on the monitor. Further, for example, the image data obtained through decoding performed by the codec engine 1516 is re-encoded by the codec engine 1516 and multiplexed by the multiplexing/demultiplexing unit (MUX DMUX) 1518 to be converted into a transport stream. The transport stream is supplied to, for example, the connectivity 1321, the broadband modem 1333, or the like via the network interface 1519, and transmitted to another device, not illustrated.

It is noted that the processing units inside the video processor 1332 transmit and receive image data and other data to and from each other using, for example, the internal memory 1515 and the external memory 1312. Further, the power management module 1313 controls power supply to, for example, the control unit 1511.

In a case where the present technology is applied to the video processor 1332 configured in this manner, the present technology according to each embodiment described above may be applied to the codec engine 1516. That is, the codec engine 1516 may have the functions of the image encoding device 100 described above, for example. In this manner, the video processor 1332 can obtain similar effects to the effects of each of the embodiments described above with reference to FIGS. 1 to 19.

It is noted that in the codec engine 1516, the present technology (i.e., the functions of the image encoding device 100) may be implemented by hardware such as a logical circuit or by software such as an incorporated program, or may be implemented by both thereof.

Hereinabove, the two examples have been described as the configuration of the video processor 1332. However, the configuration of the video processor 1332 is arbitrary and a configuration other than the above-described two examples may be used. Further, while the video processor 1332 may be configured as a single semiconductor chip, the video processor 1332 may be configured as a plurality of semiconductor chips. For example, the video processor 1332 may be a three-dimensional stacked LSI in which a plurality of semiconductors is stacked. Further, the video processor 1332 may be implemented by a plurality of LSIs.

<Example of Application to Device>

The video set 1300 can be incorporated in various devices that process image data. For example, the video set 1300 can be incorporated into the television device 900 (FIG. 21), the mobile phone 920 (FIG. 22), the recording/reproducing device 940 (FIG. 23), the imaging device 960 (FIG. 24), and the like. With the video set 1300 incorporated, the device can obtain similar effects to the effects of each of the embodiments described above with reference to FIGS. 1 to 19.

It is noted that as long as the video processor 1332 is included, even part of the configurations of the above-described video set 1300 can be implemented as a configuration to which the present technology is applied. For example, only the video processor 1332 can be implemented as a video processor to which the present technology is applied. Further, for example, the processors indicated by the dotted line 1341, the video module 1311, and the like can be implemented as processors, a module, and the like to which the present technology is applied, as described above. In addition, for example, the video module 1311, the external memory 1312, the power management module 1313, and the front end module 1314 can be combined and implemented as a video unit 1361 to which the present technology is applied. With any of the configurations, it is possible to obtain similar effects to the effects of each of the embodiments described above with reference to FIGS. 1 to 19.

That is, as in the case of the video set 1300, any configuration can be incorporated into various devices that process image data, as long as the configuration includes the video processor 1332. For example, the video processor 1332, the processors indicated by the dotted line 1341, the video module 1311, or the video unit 1361 can be incorporated into the television device 900 (FIG. 21), the mobile phone 920 (FIG. 22), the recording/reproducing device 940 (FIG. 23), the imaging device 960 (FIG. 24), and the like. By incorporating any of the configurations to which the present technology is applied, the device can obtain similar effects to the effects of each of the embodiments described above with reference to FIGS. 1 to 19, as in the case of the video set 1300.

<Sixth Application Example: Network System>

Further, the present technology can also be applied to a network system including a plurality of devices. FIG. 28 illustrates an example of the schematic configuration of a network system to which the present technology is applied.

A network system 1600 illustrated in FIG. 28 is a system in which devices transmit and receive information associated with images (moving images) via a network. A cloud service 1601 in the network system 1600 is a system that provides image (moving image)-related services to terminals such as a computer 1611, an Audio Visual (AV) device 1612, a portable information processing terminal 1613, and an Internet of Things (IoT) device 1614, which are communicably connected to the cloud service 1601 itself. For example, the cloud service 1601 provides the terminals with an image (moving image) content supply service such as so-called moving image distribution (on-demand or live distribution). Further, for example, the cloud service 1601 provides a backup service for storing image (moving image) content received from the terminals. Further, for example, the cloud service 1601 provides a service for mediating the transmission and reception of image (moving image) content among the terminals.

The physical configuration of the cloud service 1601 is arbitrary. For example, the cloud service 1601 may include various servers and arbitrary networks such as the Internet and LAN. Examples of the servers include: a server that stores and manages moving images; a server that distributes moving images to the terminals; a server that obtains moving images from the terminals; and a server that manages users (the terminals) and billing.

The computer 1611 includes information processing devices such as, for example, a personal computer, a server, and a workstation. The AV device 1612 includes image processing devices such as, for example, a television receiver, a hard disk recorder, a game device, and a camera. The portable information processing terminal 1613 includes portable information processing devices such as, for example, a notebook personal computer, a tablet terminal, a mobile phone, and a smartphone. The IoT device 1614 includes arbitrary objects that perform image-related processes such as, for example, a machine, home electronics, furniture, other objects, an IC tag, and a card-type device. Each of these terminals has a communication function, enabling the terminal to connect to the cloud service 1601 (establish a session) and transmit and receive information (that is, perform communication) to and from the cloud service 1601. Further, each terminal can also communicate with another terminal. Communication between the terminals may be performed via the cloud service 1601 or may be performed without the cloud service 1601.

In a case where the present technology is applied to the network system 1600 as described above and image (moving image) data is transmitted and received between the terminals or between the terminals and the cloud service 1601, the image data may be encoded in the manner described above in each embodiment. That is, each of the terminals (the computer 1611 to the IoT device 1614) and the cloud service 1601 may have the functions of the image encoding device 100 described above. In this manner, the terminals (the computer 1611 to the IoT device 1614) and the cloud service 1601 that transmit and receive image data can obtain similar effects to the effects of each of the embodiments described above with reference to FIGS. 1 to 19.

<Others>

It is noted that various types of information related to encoded data (bitstream) may be multiplexed in the encoded data and then transmitted or recorded, or may be transmitted or recorded as separate data associated with the encoded data without being multiplexed in the encoded data. The term "associated" herein means that for example, when one piece of data is processed, another piece of data can be used (can be linked). That is, the pieces of data associated with each other may be combined as one piece of data or may be separate pieces of data. For example, information associated with encoded data (image) may be transmitted on a transmission path different from the encoded data (image). Further, for example, the information associated with the encoded data (image) may be recorded onto a recording medium (or another recording area of an identical recording medium) different from the encoded data (image). It is noted that the "association" may be performed on part of the data, not entire data. For example, an image and information corresponding to the image may be associated with each other in arbitrary units such as a plurality of frames, one frame, or part within a frame.

Further, as described above, in the present specification, the terms such as "synthesize," "multiplex," "add," "integrate," "include," "store," "install," "embed," and "insert" mean that a plurality of objects is combined into one; for example, encoded data and metadata are combined into one piece of data. These terms mean one of the methods for the above-described "association."

Further, the embodiments of the present technology are not limited to the above-described embodiments and various modifications can be made without departing from the gist of the present technology.

For example, in the present specification, the system refers to a set of a plurality of structural elements (devices, modules (components), and the like), and it does not matter whether or not all the structural elements are within the same housing. Therefore, a plurality of devices stored in separate housings and connected via a network, and a single device storing a plurality of modules in a single housing are, in either case, the system.

Further, for example, the configuration described above as a single device (or processing unit) may be divided and configured as a plurality of devices (or processing units). Conversely, the configurations described above as a plurality of devices (or processing units) may be combined and configured as a single device (or processing unit). Further, needless to say, a configuration other than the above-described configurations may be added to the configuration of each device (or each processing unit). In addition, part of the configuration of one device (or processing unit) may be included in the configuration of another device (or another processing unit) as long as the configuration and operation as the entire system are substantially the same.

Further, for example, the present technology can be configured as cloud computing in which a single function is shared and processed collaboratively among a plurality of devices via a network.

Further, for example, the above-described programs can be executed by arbitrary devices. In this case, the devices only need to have necessary functions (functional blocks and the like) and be capable of obtaining necessary information.

Further, for example, each of the steps described in the flowcharts described above can be executed by a single device or by a plurality of devices in a shared manner. In addition, in a case where a single step includes a plurality of processes, the plurality of processes included in the single step can be executed by a single device or by a plurality of devices in a shared manner.

It is noted that in a program executed by the computer, the processes of steps describing the program may be executed in a chronological order in the order described in the present specification. Alternatively, the processes of steps may be executed in parallel, or may be executed individually at necessary timing on occasions of calls, for example. In addition, the processes of steps describing this program may be executed in parallel with the processes of another program or may be executed in combination with the processes of another program.

It is noted that each of the plurality of present technologies described in the present specification can be implemented independently as a single technology as long as there is no contradiction. Needless to say, the plurality of arbitrary present technologies can be implemented in combination. For example, the present technology described in one of the embodiments can be implemented in combination with the present technology described in another embodiment. Further, any of the present technologies described above can be implemented in combination with other technologies that are not described above.

It is noted that the present technology can also be configured as below.

(1) An image processing device including:
a block setting unit configured to set a size of a current block for a prediction process according to a size of a peripheral block situated on a periphery of the current block, the prediction process generating a predicted image of an image to be encoded;
an intra prediction unit configured to perform an intra prediction process on the current block set by the block setting unit and generate the predicted image; and
an encoding unit configured to encode the image to be encoded using the predicted image generated by the intra prediction unit.

(2) The image processing device according to (1),
in which a plurality of the peripheral blocks includes an upper block adjacent to an upper side of the current block and a left block adjacent to a left side of the current block, and
in a case where a size of the upper block and a size of the left block are identical to each other, the block setting unit sets the size of the current block to be identical to the size of the upper block and the size of the left block.

(3) The image processing device according to (1) or (2),
in which in a case where the size of the upper block and the size of the left block are not identical to each other, the block setting unit sets the size of the current block to be equal to or smaller than the size of one of the upper block and the left block that is smaller in size than the other of the upper block and the left block.

(4) The image processing device according to any one of (1) to (3),
in which the peripheral block is a reference block whose pixel value is referred to in the current block, and
the block setting unit sets the size of the current block to be identical to a size of the reference block.

(5) The image processing device according to any one of (1) to (4),
in which the peripheral block is a reference block whose pixel value is referred to in the current block, and
the block setting unit sets the size of the current block to be smaller than a size of the reference block.

(6) The image processing device according to any one of (1) to (5),
in which the image to be encoded is an artificial image generated artificially.

(7) The image processing device according to any one of (1) to (6), further including:
an artificial image determining unit configured to determine whether or not the image to be encoded is an artificial image generated artificially,
in which in a case where the artificial image determining unit determines that the image to be encoded is the artificial image, the block setting unit sets the size of the current block according to the size of the peripheral block.

(8) The image processing device according to any one of (1) to (7),
in which in a case where a user specifies that the image to be encoded is the artificial image, the artificial image determining unit determines that the image to be encoded is the artificial image.

(9) The image processing device according to any one of (1) to (8),
in which in a case where a monotonic increase or a monotonic decrease in pixel values occurs in a horizontal direction or a vertical direction, the artificial image determining unit determines that the image to be encoded is the artificial image.

(10) The image processing device according to any one of (1) to (9), in which in a case where a number of high-frequency components is smaller than a predetermined criterion, the artificial image determining unit determines that the image to be encoded is the artificial image.

(11) The image processing device according to any one of (1) to (10), in which in a case where a variation of pixel values is less than a predetermined criterion, the artificial image determining unit determines that the image to be encoded is the artificial image.

(12) The image processing device according to any one of (1) to (11), further including:

an area determining unit configured to determine whether or not the current block is an artificial image area constituted by an artificial image generated artificially, in which in a case where the area determining unit determines that the current block is the artificial image area, the block setting unit sets the size of the current block according to the size of the peripheral block.

(13) The image processing device according to any one of (1) to (12), in which in a case where a user specifies that the current block is the artificial image area, the area determining unit determines that the current block is the artificial image area.

(14) The image processing device according to any one of (1) to (13), in which in a case where a monotonic increase or a monotonic decrease in pixel values occurs in a horizontal direction or a vertical direction in the current block, the area determining unit determines that the current block is the artificial image area.

(15) The image processing device according to any one of (1) to (14), in which in a case where a number of high-frequency components in the current block is smaller than a predetermined criterion, the area determining unit determines that the current block is the artificial image area.

(16) The image processing device according to any one of (1) to (15), in which in a case where a variation of pixel values in the current block is less than a predetermined criterion, the area determining unit determines that the current block is the artificial image area.

(17) The image processing device according to any one of (1) to (16), further including:

a first computing unit configured to calculate a difference in the current block between the image to be encoded and the predicted image generated by the intra prediction unit and generate a residual image;

an orthogonal transform unit configured to perform an orthogonal transform on the residual image obtained by the first computing unit; and a quantization unit configured to quantize an orthogonal transform coefficient of the residual image obtained by the orthogonal transform unit, in which the encoding unit encodes a quantized coefficient of the orthogonal transform coefficient obtained by the quantization unit.

(18) The image processing device according to any one of (1) to (17), further including:

an inverse quantization unit configured to perform an inverse quantization on the quantized coefficient obtained by the quantization unit;

an inverse orthogonal transform unit configured to perform an inverse orthogonal transform on an orthogonal transform coefficient obtained by the inverse quantization unit;

a second computing unit configured to add the predicted image generated by the intra prediction unit to a residual image obtained by the inverse orthogonal transform unit and generate a local decoded image; and a deblocking filtering unit configured to apply a deblocking filter to the decoded image obtained by the second computing unit.

(19) The image processing device according to any one of (1) to (18), in which the intra prediction unit and the encoding unit perform respective processes using a method conforming to an ITU-T H.265|ISO/IEC 23008-2 High Efficiency Video Coding.

(20) An image processing method including:

setting a size of a current block for a prediction process according to a size of a peripheral block situated on a periphery of the current block, the prediction process generating a predicted image of an image to be encoded;

performing an intra prediction process on the current block that has been set and generating the predicted image; and encoding the image to be encoded using the predicted image that has been generated.

REFERENCE SIGNS LIST

100 Image encoding device
111 Pre-processing buffer
112 Pre-processing unit
113 Computing unit
114 Orthogonal transform unit
115 Quantization unit
116 Encoding unit
117 Accumulation buffer
118 Inverse quantization unit
119 Inverse orthogonal transform unit
120 Computing unit
121 Filter
122 Frame memory
123 Intra prediction unit
124 Inter prediction unit
125 Predicted image selecting unit
126 Rate control unit
151 Screen rearranging unit
152 Metadata setting unit
153 Artificial image block setting unit
201 Artificial image determining unit
202 Normal image block setting unit
301 Artificial image area determining unit

The invention claimed is:

1. An image processing device comprising:
a block setting unit configured to set a size of a current block for an intra prediction process according to a size of a peripheral block situated on a periphery of the current block, the prediction process generating a predicted image of an image to be encoded;

an intra prediction unit configured to perform the intra prediction process on the current block set by the block setting unit and generate the predicted image; and an encoding unit configured to encode the image to be encoded using the predicted image generated by the intra prediction unit, wherein the block setting unit sets the size of the current block for the prediction process according to a first block division mode set when the image to be encoded is an artificial image generated artificially and according to a second block division mode set when the image to be encoded is a normal image, wherein the first block division mode and the second block division mode are different, wherein, in the first block division mode, the block setting unit sets the size of the current block according to the size of the peripheral block, and wherein the block setting unit, the intra prediction unit, and the encoding unit are each implemented via at least one processor.

2. The image processing device according to claim 1,
wherein a plurality of the peripheral blocks includes an upper block adjacent to an upper side of the current block and a left block adjacent to a left side of the current block, and in a case where a size of the upper block and a size of the left block are identical to each other, the block setting unit sets the size of the current block to be identical to the size of the upper block and the size of the left block.

3. The image processing device according to claim 2,
wherein in a case where the size of the upper block and the size of the left block are not identical to each other, the block setting unit sets the size of the current block to be equal to or smaller than the size of one of the upper block and the left block that is smaller in size than the other of the upper block and the left block.

4. The image processing device according to claim 1,
wherein the peripheral block is a reference block whose pixel value is referred to in the current block, and the block setting unit sets the size of the current block to be identical to a size of the reference block.

5. The image processing device according to claim 1,
wherein the peripheral block is a reference block whose pixel value is referred to in the current block, and the block setting unit sets the size of the current block to be smaller than a size of the reference block.

6. The image processing device according to claim 1, further comprising:
an artificial image determining unit configured to determine whether or not the image to be encoded is the artificial image generated artificially, wherein the artificial image determining unit is implemented via at least one processor.

7. The image processing device according to claim 6,
wherein in a case where a user specifies that the image to be encoded is the artificial image, the artificial image determining unit determines that the image to be encoded is the artificial image.

8. The image processing device according to claim 6,
wherein in a case where a monotonic increase or a monotonic decrease in pixel values occurs in a horizontal direction or a vertical direction, the artificial image determining unit determines that the image to be encoded is the artificial image.

9. The image processing device according to claim 6,
wherein in a case where a number of high-frequency components is smaller than a predetermined criterion, the artificial image determining unit determines that the image to be encoded is the artificial image.

10. The image processing device according to claim 6,
wherein in a case where a variation of pixel values is less than a predetermined criterion, the artificial image determining unit determines that the image to be encoded is the artificial image.

11. The image processing device according to claim 1, further comprising:
an area determining unit configured to determine whether or not the current block is an artificial image area constituted by an artificial image generated artificially, wherein in a case where the area determining unit determines that the current block is the artificial image area, the block setting unit sets the size of the current block according to the size of the peripheral block, and wherein the area determining unit is implemented via at least one processor.

12. The image processing device according to claim 11,
wherein in a case where a user specifies that the current block is the artificial image area, the area determining unit determines that the current block is the artificial image area.

13. The image processing device according to claim 11,
wherein in a case where a monotonic increase or a monotonic decrease in pixel values occurs in a horizontal direction or a vertical direction in the current block, the area determining unit determines that the current block is the artificial image area.

14. The image processing device according to claim 11,
wherein in a case where a number of high-frequency components in the current block is smaller than a predetermined criterion, the area determining unit determines that the current block is the artificial image area.

15. The image processing device according to claim 11,
wherein in a case where a variation of pixel values in the current block is less than a predetermined criterion, the area determining unit determines that the current block is the artificial image area.

16. The image processing device according to claim 1, further comprising:
a first computing unit configured to calculate a difference in the current block between the image to be encoded and the predicted image generated by the intra prediction unit and generate a residual image;

an orthogonal transform unit configured to perform an orthogonal transform on the residual image obtained by the first computing unit; and a quantization unit configured to quantize an orthogonal transform coefficient of the residual image obtained by the orthogonal transform unit, wherein the encoding unit encodes a quantized coefficient of the orthogonal transform coefficient obtained by the quantization unit, and wherein the first computing unit, the orthogonal transform unit, and the quantization unit are each implemented via at least one processor.

17. The image processing device according to claim 16, further comprising:
an inverse quantization unit configured to perform an inverse quantization on the quantized coefficient obtained by the quantization unit;

an inverse orthogonal transform unit configured to perform an inverse orthogonal transform on an orthogonal transform coefficient obtained by the inverse quantization unit;

a second computing unit configured to add the predicted image generated by the intra prediction unit to a residual image obtained by the inverse orthogonal transform unit and generate a local decoded image; and a deblocking filtering unit configured to apply a deblocking filter to the decoded image obtained by the second computing unit, wherein the inverse quantization unit, the inverse orthogonal transform unit, the second computing unit, and the deblocking filtering unit are each implemented via at least one processor.

18. The image processing device according to claim 1, wherein the intra prediction unit and the encoding unit perform respective processes using a method conforming to an ITU-T H.265|ISO/IEC 23008-2 High Efficiency Video Coding.

19. The image processing device according to claim 1, wherein, in the second block division mode, the block setting unit sets the size of the current block based on a numerical performance related to encoding efficiency.

20. An image processing method comprising:

setting a size of a current block for an intra prediction process according to a size of a peripheral block situated on a periphery of the current block, the prediction process generating a predicted image of an image to be encoded;

performing the intra prediction process on the current block that has been set and generating the predicted image; and encoding the image to be encoded using the predicted image that has been generated, wherein the size of the current block is set for the prediction process according to a first block division mode set when the image to be encoded is an artificial image generated artificially and according to a second block division mode set when the image to be encoded is a normal image, wherein the first block division mode and the second block division mode are different, wherein, in the first block division mode, the size of the current block is set according to the size of the peripheral block.

* * * * *